(12) United States Patent
Hollis et al.

(10) Patent No.: US 11,084,839 B2
(45) Date of Patent: Aug. 10, 2021

(54) SYMMETRICAL CCC-NHC PINCER METAL COMPLEXES AND SYMMETRICAL BIMETALLIC COMPLEXES: BIO-ACTIVITY, AND APPLICATIONS TO ORGANIC TRANSFORMATIONS AND ENERGY-RELATED CATALYTIC METHODS

(71) Applicant: Mississippi State University, Starkville, MS (US)

(72) Inventors: Thedford Keith Hollis, Starkville, MS (US); Charles Edwin Webster, Starkville, MS (US); Jared H. Delcamp, Oxford, MS (US)

(73) Assignees: Mississippi State University, Starkville, MS (US); University of Mississippi, University, MS (US)

( * ) Notice: Subject to any disclaimer, the term of this patent is extended or adjusted under 35 U.S.C. 154(b) by 98 days.

(21) Appl. No.: 16/036,932

(22) Filed: Jul. 16, 2018

(65) Prior Publication Data

US 2019/0016741 A1    Jan. 17, 2019

Related U.S. Application Data

(60) Provisional application No. 62/532,694, filed on Jul. 14, 2017.

(51) Int. Cl.
| | |
|---|---|
| *C07F 15/04* | (2006.01) |
| *B01J 19/08* | (2006.01) |
| *C01B 13/02* | (2006.01) |
| *C07F 15/00* | (2006.01) |
| *C25B 1/00* | (2021.01) |

(52) U.S. Cl.
CPC ............ *C07F 15/04* (2013.01); *B01J 19/088* (2013.01); *C01B 13/0203* (2013.01); *C07F 15/006* (2013.01); *C07F 15/0086* (2013.01); *C25B 1/00* (2013.01); *B01J 2219/0805* (2013.01); *B01J 2219/0884* (2013.01); *B01J 2219/0892* (2013.01)

(58) Field of Classification Search
None
See application file for complete search history.

(56) References Cited

U.S. PATENT DOCUMENTS

2012/0205554 A1 * 8/2012 Hollis .................... H05B 33/10
250/459.1

OTHER PUBLICATIONS

Huckaba, A.J., Sharpe, E.A., Delcamp, J.H. Photocatalylic Reduction of CO$_2$ with Re-Pyridyl-NHCs (2016) Inorganic Chemistry, 55 (2), pp. 682-690.

Wong, W.-Y.; Ho, C.-L., Organometallic Photovoltaics: A New and Versatile Approach for Harvesting Solar Energy Using Conjugated Polymetallaynes. Acc. Chem. Res. 2010, 43, 1246-1256.

Wu, K.-L.; Huckaba, A. J.; Clifford, J. N.; Yang, Y.-W.; Yella, A.; Palomares, E.; Grätzel, M.; Chi, Y.; Nazeeruddin, M. K., Molecularly Engineered Ru(II) Sensitizers Compatible with Cobalt(II/III) Redox Mediators for Dye-Sensitized Solar Cells. Inorg. Chem. 2016, 55, 7388-7395.

Zall, C. M. , J. C. Linehan and A. M. Appel, ACS Catalysis, 2015, 5, 5301.

Zhang, C.; Trudell, M. L. Tetrahedron Letters 2000, 41, 595.

Zhang, C.; Zhao, X.-F. Synthesis 2007, 2007, 551.

(Continued)

*Primary Examiner* — Yun Qian
(74) *Attorney, Agent, or Firm* — Stites & Harbison PLLC; Sean P. Ritchie

(57) ABSTRACT

Provided herein are a symmetrical pincer metal and bimetallic complexes. The symmetrical pincer metal complex includes a structure according to Formula I:

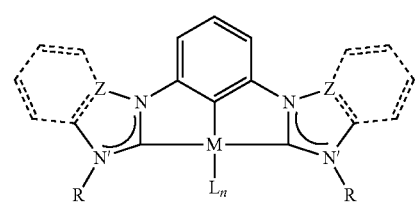

I wherein M is a metal; each N and N' is independently nitrogen or carbon; Z is selected from the group consisting of CH, C, and N; n is 0-3; each L is independently a neutral or charged ligand; and each R is independently an alkyl, Nx, CH$_2$TMS. The symmetrical bimetallic complex includes a structure according to Formula II:

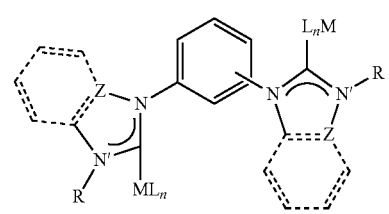

II wherein M is a metal; each N and N' is independently nitrogen or carbon; Z is selected from the group consisting of CH, C, and N; n is 0-3; each L is independently a neutral or charged ligand; and wherein each R is independently an alkyl, Nx, CH$_2$TMS. Also provided herein is a method of catalyzing a reaction including administering one or more of the compounds disclosed herein.

13 Claims, 12 Drawing Sheets

(56) References Cited

OTHER PUBLICATIONS

Zhang, L. Y.; Li, B.; Shi, L. F.; Li, W. L., Synthesis, structures, and photophysical properties of fluorine-functionalized yellow-emitting iridium complexes. Opt. Mater. 2009, 31, 905-911.
Zhang, X.; Cao, B.; Valente, E. J.; Hollis, T. K. Organometallics 2013, 32, 752.
Zhang, X.; Wright, A. M.; DeYonker, N. J.; Hollis, T. K.; Hammer, N. I.; Webster, C. E.; Valente, E. J., Synthesis, Air Stability, Photobleaching, and DFT Modeling of Blue Light Emitting Platinum CCC-N-Heterocyclic Carbene Pincer Complexes. Organometallics 2012, 31, 1664-1672.
Zhao, Q.; Li, F.; Huang, C., Phosphorescent chemosensors based on heavy-metal complexes. Chem. Soc. Rev. 2010, 39, 3007-3030.
Zhou, X., D. Micheroni, Z. Lin, C. Poon, Z. Li and W. Lin, ACS Appl Mater Interfaces, 2016, 8, 4192.
Zucca, A.; Doppiu, A.; Cinellu, M. A.; Stoccoro, S.; Minghetti, G.; Manassero, M., Multiple C—H bond activation. Threefold-deprotonated 6-phenyl-2,2'-bipyridine as a bridging ligand in dinuclear platinum(II) derivatives. Organometallics 2002, 21, 783-785.
Cope, J. D.; Liyanager N. P.; Kelley, P. J.; Denny, J. A.; Valente, E. J.; Webster, C. E.; Delcamp, J. H.; Hollis, T. K., "Electrocatalytic reduction of CO2 with CCC-NHC pincer nickel complexes". Chem. Commun. 2017, 53 (68), 9442-9445.
Denny, J.A., Lamb, R.W., Reilly, S.W., Donnadieu, B., Webster, C.E., Hollis, T.K.Investigation of metallation/transmetallation reactions to synthesize a series of CCC-NHC Co pincer complexes and their X-ray structures (2018) Polyhedron, 151, pp. 568-574.
Cope, J.D., Denny, J.A., Lamb, R.W., McNamara, L.E., Hammer, N.I., Webster, C.E., Hollis, T.K. Synthesis, characteiization, photophysics, and a ligand rearrangement of CCC-NHC pincer nickel complexes: Colors, polymorphs, emission, and Raman spectra (2017) Journal of Organometallic Chemistry, 845, pp. 258-265.
Helgert, T.R., Zhang, X., Box, H.K., Denny, J.A., Valle, H.U., Oliver, A.G., Akurathi, G., Webster, C.E., Hollis, T.K. Extreme πLoading as a Design Element for Accessing Imido Ligand Reactivity. A CCC-NHC Pincer Tantalum Bis (imido) Complex: Synthesis, Characterization, and Catalytic Oxidative Amination of Alkenes (2016) Organometallics, 35 (20), pp. 3452-3460.
Reilly, S.W., Webster, C.E., Hollis, T.K., Valle, H.U. Transmetallation from CCC-NHC pincer Zr complexes in the synthesis of air-stable CCC-NHC pincer Co(iii) complexes and initial hydroboration trials (2016) Dalton Transactions, 45 (7), pp. 2823-2828.
Howell, T.O., Huckaba, A.J., Hollis, T.K. An efficient synthesis of bis-1,3-(3'-aryl-N-heterocycl-1'-yl) arenes as CCC-NHC pincer ligand precursors (2014) Organic Letters, 16 (9), pp. 2570-2572.
Helgert, T.R., Hollis, T.K., Oliver, A.G., Valle, H.U., Wu, Y., Webster, C.E. Synthesis, characterization, and X-ray molecular structure of tantalum CCC-N-heterocyclic carbene (CCC-NHC) pincer complexes with imidazole- and triazole-based ligands (2014) Organometallics, 33 (4), pp. 952-958.
Huckaba, A.J., Hollis, T.K., Reilly, S.W. Homobimetallic rhodium NHC complexes as versatile catalysts for hydrosilylation of a multitude of substrates in the presence of ambient air (2013) Organometallics, 32 (21), pp. 6248-6256.
Huckaba, A.J., Cao, B., Hollis, T.K., Valle, H.U., Kelly, J.T., Hammer, N.I., Oliver, A.G., Webster, C.E. Platinum CCC-NHC benzimidazolyl pincer complexes: Synthesis, characterization, photostability, and theoretical investigation of a blue-green emitter (2013) Dalton Transactions, 42 (24), pp. 8820-8826.
Clark, W.D., Tyson, G.E., Keith Hollis, T., Valle, H.U., Valente, E.J., Oliver, A.G., Dukes, M.P. Toward molecular rotors: Tetra-N-heterocyclic carbene Ag(i)-halide cubane-type clusters (2013) Dalton Transactions, 42 (20), pp. 7338-7344.
Huckaba, A.J., Hollis, T.K., Howell, T.O., Valle, H.U., Wu, Y. Synthesis and characterization of a 1,3-phenylene-bridged N-alkyl bis(benzimidazole) CCC-NHC pincer ligand precursor: Homobimetallic silver and rhodium complexes and the catalytic hydrosilylation of phenylacetylene (2013) Organometallics, 32 (1), pp. 63-69.

Helgert, T.R., Hollis, T.K., Valente, E.J. Synthesis of titanium CCC-NHC pincer complexes and catalytic hydroamination of unactivated alkenes (2012) Organometallics, 31 (8), pp. 3002-3009.
Zhang, X., Wright, A.M., Deyonker, N.J., Hollis, T.K., Hammer, N.I., Webster, C.E., Valente, E.J. Synthesis, air stability, photobleaching, and DFT modeling of blue light emitting platinum CCC-N-heterocyclic carbene pincer complexes (2012) Organometallics, 31 (5), pp. 1664-1672.
Cho, J., Hollis, T.K., Valente, E.J., Trate, J.M. CCC-N-heterocyclic carbene pincer complexes: Synthesis, characterization and hydroamination activity of a hafnium complex (2011) Journal of Organometallic Chemistry, 696 (1), pp. 373-377.
Cho, J., Hollis, T.K., Helgert, T.R., Valente, E.J. An improved method for the synthesis of zirconium (CCC-N-heterocyclic carbene) pincer complexes and applications in hydroamination (2008) Chemical Communications, (40), p. 5001-5003.
Bauer, E.B., Andavan, G.T.S., Hollis, T.K., Rubio, R.J., Cho, J., Kuchenbeiser, G.R., Helgert, T.R., Letko, C.S., Tham, F.S. Air-and water-stable catalysts for hydroamination/cyclization. Synthesis and application of CCC-NHC pincer complexes of RH and Ir (2008) Organic Letters, 10 (6), pp. 1175-1178.
Andavan, G.T.S., Bauer, E.B., Letko, C.S., Hollis, T.K., Tham, F.S. Synthesis and characterization of a free phenylene bis(N-heterocyclic carbene) and its di-Rh complex: Catalytic activity of the di-Rh and CCC-NHC Rh pincer complexes in intermolecular hydrosilylation of alkynes (2005) Journal of Organometallic Chemistry, 690 (24-25), pp. 5938-5947.
Rubio, R.J., Andavan, G.T.S., Bauer, E.B., Hollis, T.K., Cho, J., Tham, F.S., Donnadieu, B. Toward a general method for CCC N-heterocyclic carbene pincer synthesis: Metallation and transmetallation strategies for concurrent activation of three C—H bonds (2005) Journal of Organometallic Chemistry, 690 (23), pp. 5353-5364.
Carpenter, C.A., Brogdon, P., McNamara, L.E., Tschumper, G.S., Hammer, N.I., Delcamp, J.H. A robust pyridyl-NHC-ligated rhenium pholocalatyst for CO2 reduction in the presence of water and oxygen (2018) Inorganics, 6 (1), art. No. 22.
Burks, D.B., Davis, S., Lamb, R.W., Liu, X., Rodrigues, R.R., Liyanage, N.P., Sun, Y., Webster, C.E., Delcamp, J.H., Papish, E.T. Nickel(ii) pincer complexes demonstrate that the remote substituent controls catalytic carbon dioxide reduction (2018) Chemical Communications, 54 (31), pp. 3819-3822.
Boudreaux, C.M., Liyanage, N.P., Shirley, H., Siek, S., Gerlach, D.L., Qu, F., Delcamp, J.H., Papish, E.T. Ruthenium (II) complexes of pyridinol and N-heterocyclic carbene derived pincers as robust catalysts for selective carbon dioxide reduction (2017) Chemical Communications, 53 (81), pp. 11217-11220.
Liyanage, N.P., Dulaney, H.A., Huckaba, A.J., Jurss, J.W., Delcamp, J.H. Electrocatalytic Reduction of CO2 to CO with Re-Pyridyl-NHCs: Proton Source Influence on Rates and Product Selectivities (2016) Inorganic Chemistry, 55 (12), pp. 6085-6094.
Naziruddin, A. R.; Galstyan, A.; Iordache, A.; Daniliuc, C. G.; Strassert, C. A.; De Cola, L. Dalton transactions 2015, 44, 8467.
Omrani, H.; Cavagnat, R.; Sourisseau, C., A vibrational study of various K2PdCl4-xBrx solid solutions. Spectrochimica Acta Part A: Molecular and Biomolecular Spectroscopy 2000, 56, 1645-1652.
Wadman, S. H.; Kroon, J. M.; Bakker, K.; Havenith, R. W. A.; van Klink, G. P. M.; van Koten, G., Cyclometalated Organoruthenium Complexes for Application in Dye-Sensitized Solar Cells. Organometallics 2010, 29, 1569-1579.
Pegis, M. L. , J. A. S. Roberts, D. J. Wasylenko, E. A. Mader, A. M. Appel and J. M. Mayer, Inorg. Chem., 2015, 54, 11883.
Weng Z. J. Jiang, Y. Wu, Z. Wu, X. Guo, K. L. Materna, W. Liu, V. S. Batista, G. W. Brudvig and H. Wang, J. Am. Chem. Soc., 2016, 138, 8076.
Peris, E.; Loch, J. A.; Mata, J.; Crabtree, R. H., A Pd complex of a tridentate pincer CNC bis-carbene ligand as a robust homogenous Heck catalyst. Chemical Communications 2001, 201-202.
Won, D. I. , J. S. Lee, J. M. Ji, W. J. Jung, H. J. Son, C. Pac and S. O. Kang, J. Am. Chem. Soc., 2015, 137, 13679.
Poyatos, M.; Mas-Marza, E.; Peris, E.; Mata, J. A.; Sanau, M. European Journal of Inorganic Chemistry 2003, 1215.
Poyatos, M.; Mas-Marza, E.; Sanau, M.; Peris, E. Inorganic chemistry 2004, 43, 1793-1798.

(56) References Cited

OTHER PUBLICATIONS

Poyatos, M.; Mata, J. A.; Peris, E., Complexes with Poly(N-heterocyclic carbene) Ligands: Structural Features and Catalytic Applications. Chem. Rev. 2009, 109, 3677-3707.
Poyatos, M.; Sanau, M.; Peris, E. Inorganic chemistry 2003, 42, 2572-2576.
Pugh, D.; Boyle, A.; Danopoulos, A. A., 'Pincer' pyridine dicarbene complexes of nickel and their derivatives. Unusual ring opening of a coordinated imidazol-2-ylidene. Dalton Trans. 2008, 1087-1094.
Raynal, M.; Pattacini, R.; Cazin, C. S. J.; Vallee, C.; Olivier-Bourbigou, H.; Braunstein, P., Reaction Intermediates in the Synthesis of New Hydrido, N-Heterocyclic Dicarbene Iridium(III) Pincer Complexes. Organometallics 2009, 28, 4028-4047.
Romerosa, A.; Suarez-Varela, J.; Hidalgo, M. A.; Avila-Rosón, J. C.; Colacio, E., Synthesis and Molecular Structure of the First Metal Complex of an Analogue of Guanine with PdII-C(8) Binding. Inorg. Chem. 1997, 36, 3784-3786.
Rosser, T. E., C. D. Windle and E. Reisner, Angew. Chem., Int. Ed. Engl., 2016, 55, 7388.
Rubio, R. J.; Andavan, G. T. S.; Bauer, E. B.; Hollis, T. K.; Cho, J.; Tham, F. S.; Donnadieu, B., Toward a general method for CCC N-heterocyclic carbene pincer synthesis: Metallation and transmetallation strategies for concurrent activation of three C—H bonds. J. Organomet. Chem. 2005, 690, 5353-5364.
Savéant, J. M., Chem. Rev., 2008, 108, 2348.
Schneider, J., H. Jia, J. T. Muckerman and E. Fujita, Chem. Soc. Rev., 2012, 41, 2036.
Schneider, J., H. Jia, K. Kobiro, D. E. Gabelli, J. T. Muckerman and E. Fujita, Energy Environ. Sci., 2012, 5, 9502.
Schreier, M., P. Gao, M. T. Mayer, J. Luo, T. Moehl, M. K. Nazeeruddin, S. D. Tilley and M. Grätzel, Energy Environ. Sci., 2015, 8, 855.
Schreier, M.,J. Luo, P. Gao, T. Moehl, M. T. Mayer and M. Gratzel, J. Am. Chem. Soc., 2016, 138, 1938.
Schuster, O.; Yang, L.; Raubenheimer, H. G.; Albrecht, M., Beyond Conventional N-Heterocyclic Carbenes: Abnormal, Remote, and Other Classes of NHC Ligands with Reduced Heteroatom Stabilization. Chem. Rev. 2009, 109, 3445-3478.
Schwarz, J.; Bohm, V. P. M.; Gardiner, M. G.; Grosche, m.; Herrmann, W. A.; Hieringer, W.; Randaschl-Sieber, G. Chem. Eur. J. 2000, 6, 1773.
Selander, N.; J. Szabó, K., Catalysis by Palladium Pincer Complexes. Chem. Rev. 2011, 111, 2048-2076.
Sheldrick, G. M. Acta crystallographica. Section A, Foundations of crystallography 2008, 64, 112.
Sheng, M., N. Jiang, S. Gustafson, B. You, D. H. Ess and Y. Sun, Dalton Trans., 2015, 44, 16247.
Sherman, B. D.; Xie, Y.; Sheridan, M. V.; Wang, D.; Shaffer, D. W.; Meyer, T. J.; Concepcion, J. J., Light-Driven Water Splitting by a Covalently Linked Ruthenium-Based Chromophore-Catalyst Assembly. ACS Energy Letters 2017, 2, 124-128.
Vargas, V. C.; Rubio, R. J.; Hollis, T. K.; Salcido, M. E., Efficient route to 1,3-Di-N-imidazolyl benzene. A comparison of monodentate vs bidentate carbenes in Pd-catalyzed cross coupling. Org. Lett. 2003, 5, 4847-4849.
Singleton, J. T., The uses of pincer complexes in organic synthesis. Tetrahedron 2003, 59, 1837-1857.
Smieja, J. M., M. D. Sampson, K. A. Grice, E. E. Benson, J. D. Froehlich and C. P. Kubiak, Inorg. Chem., 2013, 52, 2484.
Spencer, L. P.; Winston, S.; Fryzuk, M. D., Tridentate amido carbene ligands in early-transition-metal coordination chemistry. Organometallics 2004, 23, 3372¬3374.
Stanton, C. J. 3rd, C. W. Machan, J. E. Vandezande, T. Jin, G. F. Majetich, H. F. Schaefer, 3rd, C. P. Kubiak, G. Li and J. Agarwal, Inorg. Chem., 2016, 55, 3136.
Strassner, T. Accounts of chemical research 2016, 49, 2680.
Tabrizi, L.; Chiniforoshan, H. Polyhedron 2016, 117, 209.
Taheri, A. and L. A. Berben, Chem. Commun., 2016, 52, 1768.
Tam, A. Y.-Y.; Wong, K. M.-C.; Yam, V. W.-W., Unusual Luminescence Enhancement of Metallogels of Alkyl Platinum (II) 2,6-Bis(N-alkylbenzimidazol-2'-yl)pyridine Complexes upon a Gel-to-Sol Phase Transition at Elevated Temperatures. JACS 2009, 131, 6253-6260.
Tenne, M.; Metz, S.; Wagenblast, G.; Münster, I.; Strassner, T. Organometallics 2015, 34, 4433.
Thejo Kalyani, N.; Dhoble, S. J., Organic light emitting diodes: Energy saving lighting technology—A review. Renewable and Sustainable Energy Reviews 2012, 16, 2696-2723.
Therrien, J. A.; Wolf, M. O., The Influence of para Substituents in Bis(N-Heterocyclic Carbene) Palladium Pincer Complexes for Electrocatalytic CO2 Reduction. Inorg. Chem. 2017, 56, 1161-1172.
Thoi, V. S. and C. J. Chang, Chem. Commun., 2011, 47, 6578.
Thoi, V. S., N. Komienko, C. G. Margarit, P. Yang and C. J. Chang, J. Am. Chem. Soc., 2013, 135, 14413.
Thomsen, J. M.; Huang, D. L.; Crabtree, R. H.; Brudvig, G. W., Iridium-based complexes for water oxidation. Dalton Trans. 2015, 44, 12452-12472.
Tronnier, A.; Metz, S.; Wagenblast, G.; Muenster, I.; Strassner, T., Blue phosphorescent nitrile containing CC* cyclometalated NHC platinum(ii) complexes. Dalton Trans. 2014, 43, 3297-3305.
Tronnier, A.; Poethig, A.; Herdtweck, E.; Strassner, T., CΛC* Cyclometalated Platinum(II) NHC Complexes with β-Ketoimine Ligands. Organometallics 2014, 33, 898-908.
Tseng, C.-H.; Fox, M. A.; Liao, J.-L.; Ku, C.-H.; Sie, Z.-T.; Chang, C.-H.; Wang, J.-Y.; Chen, Z.-N.; Leee, G.-H.; Chi, Y. Journal of Materials Chemistry C 2017.
Vanderploeg, A.; Vankoten, G.; Vrieze, K.; Spek, A. L., Oxidative-Addition Reactions of Cyclometalated Platinum(II) Compounds With Mercury(II) Carboxylates—X-Ray Crystal and Molecular-Structure of RAC-Λ-(MU-MECO2)-CF,DE-(2-ME2NCH2C6H4)2PTHG(O2CME). Inorg. Chem. 1982, 21, 2014-2026.
Hahn, F. E.; Jahnke, M. C.; Gomez-Benitez, V.; Morales-Morales, D.; Pape, T., Synthesis and catalytic activity of pincer-type bis(benzimidazolin-2-ylidene) palladium complexes. Organometallics 2005, 24, 6458-6463.
Hahn, F. E.; Jahnke, M. C.; Pape, T., Synthesis of pincer-type bis(benzimidazolin-2-ylidene) palladium complexes and their application in C—C coupling reactions. Organometallics 2007, 26, 150-154.
Hang, X. C.; Fleetham, T.; Turner, E.; Brooks, J.; Li, J. Angewandte Chemie 2013, 52, 6753.
Helgert, T. R.; Hollis, T. K.; Valente, E. J. Organometallics 2012, 31, 3002.
Helgert, T. R.; Zhang, X.; Box, H. K.; Denny, J. A.; Valle, H. U.; Oliver, A. G.; Akurathi, G.; Webster, C. E.; Hollis, T. K., Extreme it—Loading as a Design Element for Accessing Imido Ligand Reactivity. A CCC-NHC Pincer Tantalum Bis (imido) Complex: Synthesis, Characterization, and Catalytic Oxidative Amination of Alkenes. Organometallics 2016, 35, 3452-3460.
Herrmann, W. A., N-Heterocyclic Carbenes: A New Concept in Organometallic Catalysis. Angew. Chem. Int. Ed. 2002, 41, 1290-1309.
Herrmann, W. A.; Reisinger, C.-P.; Spiegler, M. Journal of Organometallic Chemistry 1998, 557, 93.
Ho, C.-L.; Li, H.; Wong, W.-Y., Red to near-infrared organometallic phosphorescent dyes for OLED applications. J. Organomet. Chem. 2014, 751, 261-285.
Hohlein, I. M.; Angi, A.; Sinelnikov, R.; Veinot, J. G.; Rieger, B. Chemistry—A European Journal 2015, 21, 2755.
Hollis, T. K. and X. Zhang, U.S. Pat. No. 9,029,804, 2015.
Hopkinson, M. N.; Richter, C.; Schedler, M.; Glorius, F., An overview of N-heterocyclic carbenes. Nature 2014, 510, 485-496.
House, R. L. N. Y. M. Iha, R. L. Coppo, L. Alibabaei, B. D. Sherman, P. Kang, M. K. Brennaman, P. G. Hoertz and T. J. Meyer, J. Photochem. Photobiol., C, 2015, 25, 32.
Huckaba, A. J., E. A. Sharpe and J. H. Delcamp, Inorg. Chem., 2016, 55, 682.
Huckaba, A. J.; Cao, B.; Hollis, T. K.; Valle, H. U.; Kelly, J. T.; Hammer, N. I.; Oliver, A. G.; Webster, C. E. Dalton transactions 2013, 42, 8820.
Huckaba, A. J.; Hollis, T. K.; Howell, T. O.; Valle, H. U.; Wu, Y. Organometallics 2013, 32, 63.

(56) References Cited

OTHER PUBLICATIONS

Hung, F.-F.; Wu, S.-X.; To, W.-P.; Kwong, W.-L.; Guan, X.; Lu, W.; Low, K.-H.; Che, C.-M., Palladium(II) Acetylide Complexes with Pincer-Type Ligands: Photophysical Properties, Intermolecular Interactions, and Photo-cytotoxicity. Chemistry—An Asian Journal 2017, 12, 145-158.

Hung, L. S.; Chen, C. H., Recent progress of molecular organic electroluminescent materials and devices. Materials Science and Engineering: R: Reports 2002, 39, 143-222.

Agarwal, J., T. W. Shaw, H. F. Schaefer III and A. B. Bocarsly, Inorg. Chem., 2015, 54, 5285.

Jarosz, P.; Du, P. W.; Schneider, J.; Lee, S. H.; McCamant, D.; Eisenberg, R., Platinum(II) Terpyridyl Acetylide Complexes on Platinized $TiO_2$: Toward the Photogeneration of H-2 in Aqueous Media. Inorg. Chem. 2009, 48, 9653-9663.

Jupally, V. R., A. C. Dharmaratne, D. Crasto, A. J. Huckaba, C. Kumara, P. R. Nimmala, N. Kothalawala, J. H. Delcamp and A. Dass, Chem. Commun., 2014, 50, 9895.

Kärkäs, M. D.; Verho, O.; Johnston, E. V.; Åkermark, B., Artificial Photosynthesis: Molecular Systems for Catalytic Water Oxidation. Chem. Rev. 2014, 114, 11863-12001.

Kaufhold, S.; Petermann, L.; Staehle, R.; Rau, S., Transition metal complexes with N-heterocyclic carbene ligands: From organometallic hydrogenation reactions toward water splitting. Coord. Chem. Rev. 2015, 304-305, 73-87.

Keşan, G.; Bağlayan, Ö.; Parlak, C.; Alver, Ö.; Şenyel, M., FT-IR and Raman spectroscopic and quantum chemical investigations of some metal halide complexes of 1-phenylpiperazine. Spectrochimica Acta Part A: Molecular and Biomolecular Spectroscopy 2012, 88, 144-155.

Kido, J.; Kimura, M.; Nagai, K. Science 1995, 267, 1332.

Kim, D. , K. K. Sakimoto, D. Hong and P. Yang, Angew. Chem., Int. Ed., 2015, 54, 3259.

Moudam, O.; Rowan, B. C.; Alamiry, M.; Richardson, P.; Richards, B. S.; Jones, A. C.; Robertson, N., Europium complexes with high total photoluminescence quantum yields in solution and in PMMA. Chem. Commun. 2009, 6649-6651.

Kou, Y., S. Nakatani, G. Sunagawa, Y. Tachikawa, D. Masui, T. Shimada, S. Takagi, D. A. Tryk, Y. Nabetani, H. Tachibana and H. Inoue, J. Catal., 2014, 310, 57.

Kumar, B, et al., Catal. Today, 2016, 270, 19.

Kuriki, R., H. Matsunaga, T. Nakashima, K. Wada, A. Yamakata, O. Ishitani and K. Maeda, J. Am. Chem. Soc., 2016, 138, 5159.

Lee, C.-S.; Sabiah, S.; Wang, J.-C.; Hwang, W.-S.; Lin, I. J. B., Water-Induced Changes of Photoluminescence of a Pincer-Type N-Heterocyclic Carbene Platinum(II) Complex. Organometallics 2010, 29, 286-289.

Leopold, H.; Strassner, T. Organometallics 2016, 35, 4050.

Leopold, H.; Tronnier, A.; Wagenblast, G.; Münster, I.; Strassner, T. Organometallics 2016, 35, 959.

Li, F. , K. Fan, B. Xu, E. Gabrielsson, Q. Daniel, L. Li and L. Sun, J. Am. Chem. Soc., 2015, 137, 9153.

Liao, J. L.; Chi, Y.; Wang, J. Y.; Chen, Z. N.; Tsai, Z. H.; Hung, W. Y.; Tseng, M. R.; Lee, G. H. Inorganic chemistry 2016, 55, 6394.

Lin, W. J.; Naziruddin, A. R.; Chen, Y. H.; Sun, B. J.; Chang, A. H.; Wang, W. J.; Hwang, W. S. Chemistry, an Asian journal 2015, 10, 728.

Nayak, A. , S. Roy, B. D. Sherman, L. Alibabaei, A. M. Lapides, M. K. Brennaman, K. R. Wee and T. J. Meyer, ACS Appl Mater Interfaces, 2016, 8, 3853.

Liyanage, N. P.; H. A. Dulaney, A. J. Huckaba, J. W. Jurss and J. H. Delcamp, Inorg. Chem., 2016, 55, 6085.

Lower, S. K., M. A. E.-S., The Triplet State and Molecular Electronic Processes in Organic Molecules. Chem. Rev. 1966, 66, 199-241.

Luo, Q.-L.; Tan, J.-P.; Li, Z.-F.; Nan, W.-H.; Xiao, D.-R., Suzuki-Miyaura Coupling of Aryl Iodides, Bromides, and Chlorides Catalyzed by Bis(thiazole) Pincer Palladium Complexes. The Journal of Organic Chemistry 2012, 77, 8332-8337.

Marion, N.; Díez-González, S.; Nolan, S. P., N-Heterocyclic Carbenes as Organocatalysts. Angew. Chem. Int. Ed. 2007, 46, 2988-3000.

Mas-Marza, E; Poyatos, M.; Sanau, M.; Peris, E. Inorganic chemistry 2004, 43, 2213-2219.

Matson,E. M. , G. Espinosa Martinez, A. D. Ibrahim, B. J. Jackson, J. A. Bertke and A. R. Fout, Organometallics, 2015, 34, 399.

Mayo, E. I.; Kilsa, K.; Tirrell, T.; Djurovich, P. I.; Tamayo, A.; Thompson, M. E.; Lewis, N. S.; Gray, H. B., Cyclometalated iridium(III)-sensitized titanium dioxide solar cells. Photochemical & Photobiological Sciences 2006, 5, 871-873.

Miecznikowski, J. R.; Crabtree, R. H. Organometallics 2004, 23, 629.

Mikkelsen, M., M. Jørgensen and F. C. Krebs, Energy Environ. Sci., 2010, 3, 43.

Mondal, P. C.; Chhatwal, M.; Jeyachandran, Y. L.; Zhamikov, M., Enhancement of Optical and Electrochemical Properties via Bottom-Up Assembly of Binary Oligomer System. The Journal of Physical Chemistry C 2014, 118, 9578-9587.

Morris, A. J. , G. J. Meyer and E. Fujita, Acc. Chem. Res., 2009, 42, 1983.

Agarwal, J. ,T. W. Shaw, C. J. Stanton, 3rd, G. F. Majetich, A. B. Bocarsly and H. F. Schaefer, 3rd, Angew. Chem., Int. Ed. Engl., 2014, 53, 5152.

Ahrens, S.; Strassner, T., Detour-free synthesis of platinum-bis-NHC chloride complexes, their structure and catalytic activity in the CH activation of methane. Inorg. Chim. Acta 2006, 359, 4789-4796.

Albrecht, M.; Crabtree, R. H.; Mata, J.; Peris, E. Chemical communications 2002, 32.

Albrecht, M.; Miecznikowski, J. R.; Samuel, A.; Faller, J. W.; Crabtree, R. H. Organometallics 2002, 21, 3596.

Andrew, R. E.; Gonzalez-Sebastian, L.; Chaplin, A. B., NHC-based pincer ligands: carbenes with a bite. Dalton Trans. 2016, 45, 1299-1305.

Appel, A. M., J. E. Bercaw, A. B. Bocarsly, H. Dobbek, D. L. DuBois, M. Dupuis, J. G. Ferry, E. Fujita, R. Hille, P. J. Kenis, C. A. Kerfeld, R. H. Morris, C. H. Peden, A. R. Portis, S. W. Ragsdale, T. B. Rauchfuss, J. N. Reek, L. C. Seefeldt, R. K. Thauer and G. L. Waldrop, Chem. Rev., 2013, 113, 6621.

Arduengo. III , A. J.; Harlow, R. L.; Kline, M. Journal of the American Chemical Society 1991, 113, 361-363.

Aresta, M. , A. Dibenedetto and A. Angelini, Chem. Rev., 2014, 114, 1709.

Ashford, D. L.; Gish, M. K.; Vannucci, A. K.; Brennaman, M. K.; Templeton, J. L.; Papanikolas, J. M.; Meyer, T. J., Molecular Chromophore—Catalyst Assemblies for Solar Fuel Applications. Chem. Rev. 2015, 115, 13006-13049.

Au, V. K. M.; Wong, K. M. C.; Zhu, N. Y.; Yam, V. W. W., Luminescent Cyclometalated N-Heterocyclic Carbene-Containing Organogold(III) Complexes: Synthesis, Characterization, Electrochemistry, and Photophysical Studies. JACS 2009, 131, 9076-9085.

Gust, D.; Moore, T. A.; Moore, A. L., Solar Fuels via Artificial Photosynthesis. Acc. Chem. Res. 2009, 42, 1890-1898.

Bachmann, M.; Suter, D.; Blacque, O.; Venkatesan, K., Tunable and Efficient White Light Phosphorescent Emission Based on Single Component N-Heterocyclic Carbene Platinum(II) Complexes. Inorg. Chem. 2016, 55, 4733-4745.

Baldo, M. A.; O'Brien, D. F.; You, Y.; Shoustikov, A.; Sibley, S.; Thompson, M. E.; Forrest, S. R. Nature 1998, 395, 151.

Barbour, L. J. Journal of Supramolecular Chemistry 2001, 1, 189.

Bauer, E. B.; Andavan, G. T. S.; Hollis, T. K.; Rubio, R. J.; Cho, J.; Kuchenbeiser, G. R.; Helgert, T. R.; Letko, C. S.; Tham, F. S., Air- and Water-Stable Catalysts for Hydroamination/Cyclization. Synthesis and Application of CCC-NHC Pincer Complexes of Rh and Ir. Org. Lett. 2008, 10, 1175-1178.

Bauer, R.; Finkenzeller, W. J.; Bogner, U.; Thompson, M. E.; Yersin, H., Matrix influence on the OLED emitter Ir(btp)(2) (acac) in polymeric host materials—Studies by persistent spectral hole burning. Org. Electron. 2008, 9, 641-648.

Benson, E. E. , C. P. Kubiak, A. J. Sathrum and J. M. Smieja, Chem. Soc. Rev., 2009, 38, 89.

Bohm, M. C.; Gleiter, R., Electronic-Structure of Organometallic Compounds .24. Heavy-Atom Effect in the Photoelectron-Spectra

(56) References Cited

OTHER PUBLICATIONS of Transition-Metal Complexes. Angewandte Chemie-International Edition in English 1983, 22, 329-330.

Bourissou, D.; Guerret, O.; Gabbai, F. P.; Bertrand, G. Chem. Rev. 2000, 100, 39-91.

Bourrez, M., F. Molton, S. Chardon-Noblat and A. Deronzier, Angew. Chem., Int. Ed. Engl., 2011, 50, 9903.

Bratsch, S. G. J. Phys. Chem. Ref. Data, 1989, 18, 1.

Froehlich, J. D. and C. P. Kubiak, J. Am. Chem. Soc., 2015, 137, 3565.

Grundemann, S.; Albrecht, M.; Loch, J. A.; Faller, J. W.; Crabtree, R. H., Tridentate carbene CCC and CNC pincer palladium(II) complexes: Structure, fluxionality, and catalytic activity. Organometallics 2001, 20, 5485-5488.

Chakraborty, S.; Wadas, T. J.; Hester, H.; Schmehl, R.; Eisenberg, R., Platinum Chromophore-Based Systems for Photoinduced Charge Separation: A Molecular Design Approach for Artificial Photosynthesis. Inorg. Chem. 2005, 44, 6865-6878.

Cho, J.; Hollis, T. K.; Helgert, T. R.; Valente, E. J., An improved method for the synthesis of zirconium (CCC-N-heterocyclic carbene) pincer complexes and applications in hydroamination. Chem. Commun. 2008, 5001-5003.

Clark, W. D.; Tyson, G. E.; Hollis, T. K.; Valle, H. U.; Valente, E. J.; Oliver, A. G.; Dukes, M. P. Dalton transactions 2013, 42, 7338.

Costentin, C., S. Drouet, M. Robert and J. M. Saveant, Science, 2012, 338, 90.

Costentin, C., et al., Chem. Soc. Rev., 2013, 42, 2423.

Crudden, C. M.; Allen, D. P., Stability and reactivity of N-heterocyclic carbene complexes. Coord. Chem. Rev. 2004, 248, 2247-2273.

Danopoulos, A. A.; Pugh, D.; Wright, J. A., "Pincer" Pyridine-Dicarbene-Iridium Complexes: Facile C—H Activation and Unexpected eta(2)-Imidazol-2-ylidene Coordination. Angewandte Chemie-International Edition 2008, 47, 9765-9767.

Danopoulos, A. A.; Tulloch, A. A. D.; Winston, S.; Eastham, G.; Hursthouse, M. B., Chelating and 'pincer' dicarbene complexes of palladium; synthesis and structural studies. Dalton Trans. 2003, 1009-1015.

Díez-González, S.; Marion, N.; Nolan, S. P., N-Heterocyclic Carbenes in Late Transition Metal Catalysis. Chem. Rev. 2009, 109, 3612-3676.

Dini, D. Chem. Mater. 2005, 17, 1933.

Dolomanov, O. V.; Bourhis, L. J.; Gildea, R. J.; Howard, J. A. K.; Puschmann, H. Journal of Applied Crystallography 2009, 42, 339.

Drożdżewski, P.; Brożyna, A.; Kubiak, M.; Lis, T., Synthesis, structure and vibrational spectroscopy of palladium(II) complexes with 2-thiophenecarboxylic hydrazide (tch): Crystal structure of [PdCl2(tch)2]•2dmf. Vib. Spectrosc 2006, 40, 118-126.

DuBois, M. R. and D. L. DuBois, Am Chem. Res., 2009, 42, 1974.

Evans, R. C.; Douglas, P.; Winscom, C. J., Coordination complexes exhibiting room-temperature phosphorescence: Evaluation of their suitability as triplet emitters in organic light emitting diodes. Coord. Chem. Rev. 2006, 250, 2093¬2126.

Faller, J. W.; D'Alliessi, D. G. Organometallics 2001, 21, 1743.

Fantasia, S.; Petersen, J. L.; Jacobsen, H.; Cavallo, L.; Nolan, S. P., Electronic properties of n-heterocyclic carbene (NHC) ligands: Synthetic, structural, and spectroscopic studies of (NHC)Platinum(II) complexes. Organometallics 2007, 26, 5880-5889.

Fevre, M.; Pinaud, J.; Gnanou, Y.; Vignolle, J.; Taton, D., N-Heterocyclic carbenes (NHCs) as organocatalysts and structural components in metal-free polymer synthesis. Chem. Soc. Rev. 2013, 42, 2142-2172.

Finkenzeller, W. J.; Hofbeck, T.; Thompson, M. E.; Yersin, H., Triplet state properties of the OLED emitter Ir(btp)(2) (acac): Characterization by site-selective spectroscopy and application of high magnetic fields. Inorg. Chem. 2007, 46, 5076-5083.

Ha, E. G., J. A. Chang, S. M. Byun, C. Pac, D. M. Jang, J. Park and S. O. Kang, Chem. Commun., 2014, 50, 4462.

Fleetham, T.; Ecton, J.; Wang, Z.; Bakken, N.; Li, J. Adv Mater 2013, 25, 2573.

Fleetham, T.; Li, G.; Li, J., Phosphorescent Pt(II) and Pd(II) Complexes for Efficient, High-Color-Quality, and Stable OLEDs. Adv. Mater. 2017, 29, 1601861-n/a.

Fleetham, T.; Wang, Z.; Li, J. Organic Electronics 2012, 13, 1430.

Froehlich, J. D. and C. P. Kubiak, Inorg. Chem., 2012, 51, 3932.

\* cited by examiner

SYMMETRICAL CCC-NHC PINCER METAL COMPLEXES AND SYMMETRICAL BIMETALLIC COMPLEXES: BIO-ACTIVITY, AND APPLICATIONS TO ORGANIC TRANSFORMATIONS AND ENERGY-RELATED CATALYTIC METHODS

RELATED APPLICATIONS

This application claims the benefit of U.S. Provisional Application Ser. No. 62/532,694, filed Jul. 14, 2017, the entire disclosure of which is incorporated herein by this reference.

GOVERNMENT INTEREST

This invention was made with government support under grant numbers CHE-0809732 and OIA-1539035 awarded by the National Science Foundation (NSF). The government has certain rights in the invention.

TECHNICAL FIELD

The present invention is generally directed toward CCC—NHC pincer metal complexes and methods of making and using the same. More specifically, the present disclosure is directed to symmetrical CCC—NHC pincer metal complexes and catalytic methods of the same.

BACKGROUND

Artificial photosynthesis research activities include photocatalytic splitting of water and the reduction of $CO_2$. Each approach has its inherent challenges. Oxidation yielding $O_2$ must occur concurrently with a reduction, most often providing $H_2$ in water splitting. Furthermore, reduction of $H^+$ to $H_2$, the hydrogen evolution reaction (HER), competes with $CO_2$ reduction to CO or $HCO_2H$ on a purely thermodynamic basis (0.0 V vs −0.10 V or −0.11 V vs a normal hydrogen electrode in water at pH 0). Altering the selectivity beyond simple thermodynamic ratios is an inherently kinetic issue.

In addition to generating fuels, $CO_2$ reduction may be viewed as a $C_1$ source for chemical synthesis. Many catalysts have recently been reported for $CO_2$ reduction including biological, heterogeneous, and nano-material based systems. Altering the reactive sites of these can be an extremely challenging issue in such systems. Further, designing and then controlling the reactive sites during synthesis is often beyond current capabilities. Because these systems cannot be fully characterized to the level of chemical understanding, a controlled, systematic synthetic methodology is often unavailable.

In contrast, the design of molecular catalysts represents an approach through well-established synthetic methodology and ligand structure that provides exquisite control of the reactive sites. Thus, it is possible to design a selective molecular catalyst. Several recent reports have highlighted the design of molecular catalysts for the reduction of $CO_2$ with good selectivity over hydrogen production, including examples with a CNC—Ni pincer and other ligands on Ni. Pincer ligands with their tridentate, meridional binding provide highly stable complexes with a plethora of reactivity. N-heterocyclic carbene (NHC) pincers have also proven to have additional stability and ligand donor strength. However, there are various drawbacks associated with existing molecular catalysts.

Accordingly, there is a need for catalysts which overcome the drawbacks associated with existing compounds.

SUMMARY

This summary describes several embodiments of the presently-disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently-disclosed subject matter, whether listed in this summary or not. To avoid excessive repetition, this summary does not list or suggest all possible combinations of features.

The presently-disclosed subject matter provides, in some embodiments, a symmetrical pincer metal complex comprising a structure according to Formula I:

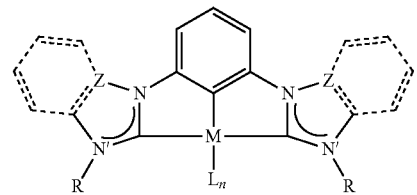

I wherein M is a metal; wherein each N and N' is independently nitrogen or carbon; wherein Z is selected from the group consisting of CH, C, and N; wherein n is 0-3; wherein each L is independently a neutral or charged ligand; and wherein each R is independently an alkyl, Nx, $CH_2TMS$. In one embodiment, at least one L is a positively charged ligand. In one embodiment, at least one L is a negatively charged ligand. In one embodiment, at least one L is selected from the group consisting of monodentate, bidentate, and tridentate ligands. In another embodiment, at least one L is selected from the group consisting of halogen, alkyl, aryl, biaryl, substituted aryl, aryloxy, acetate, trifluoroacetate, and alkoxy. In some embodiments, the alkyl is selected from the group consisting of methyl, ethyl, propyl, butyl, pentyl, and hexyl. In some embodiments, the substituted aryl is a fluoro substituted aryl. In some embodiments, at least one L is a halogen.

In some embodiments, the alkyl of R is selected from the group consisting of methyl, ethyl, propyl, butyl, pentyl, and hexyl. In some embodiments, M is selected from the group consisting of a transitional metal, Co, Rh, Ir, Cu, Ag, Au, Fe, Ru, Os, Cr, Mo, W, Mn, and Re. In one embodiment, M is Ni. In another embodiment, the complex is selected from the group consisting of:

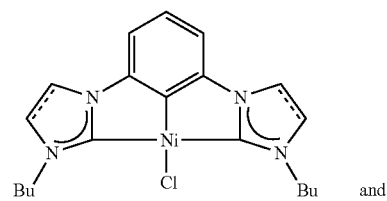

and

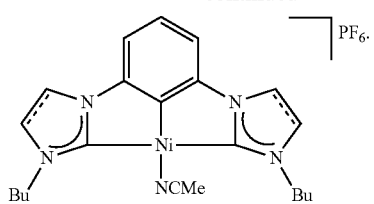
In one embodiment, M is Pt. In another embodiment, the complex is selected from the group consisting of:
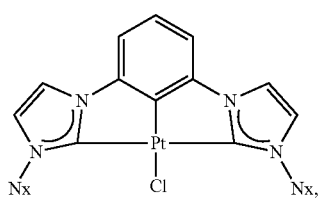
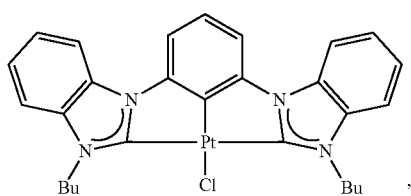
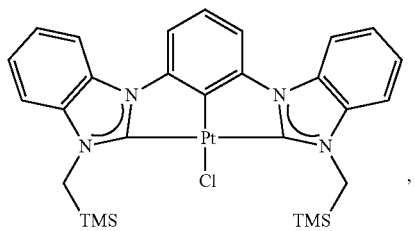
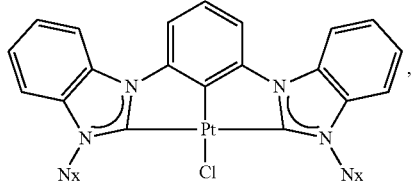
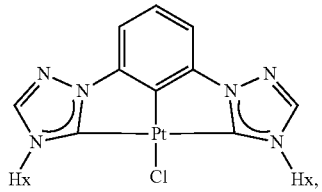
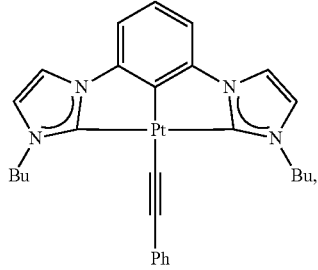
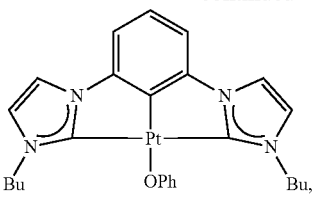
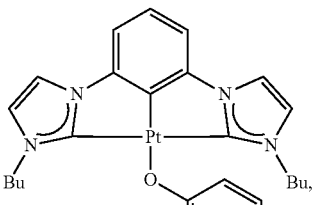
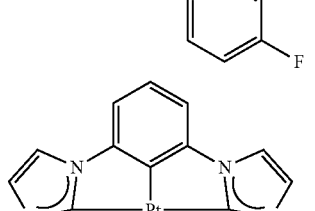
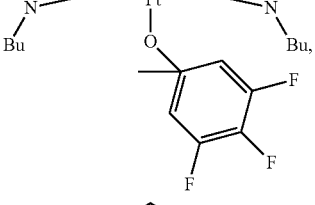
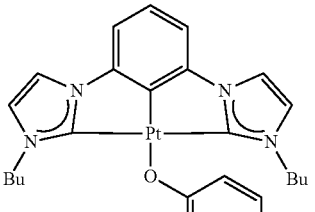
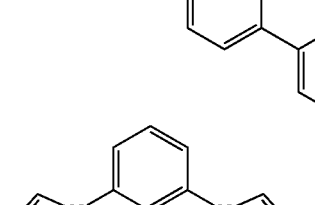
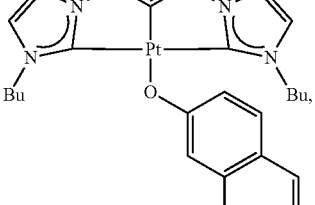
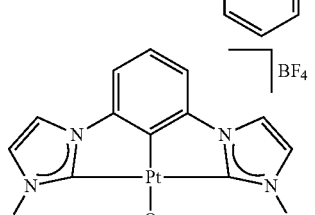

-continued
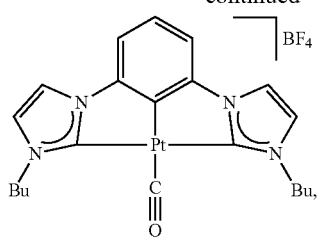
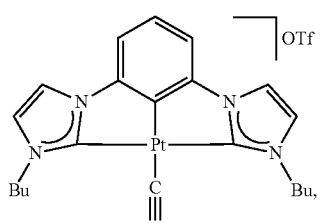
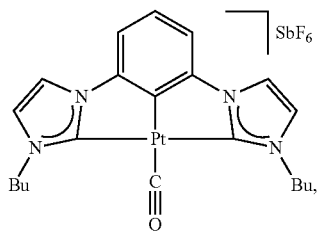
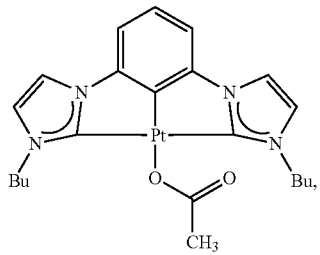
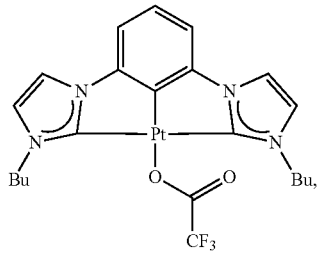
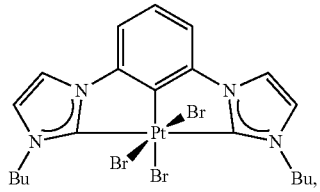
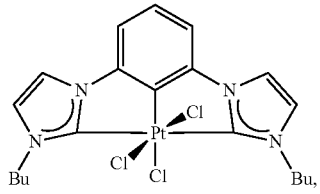
-continued
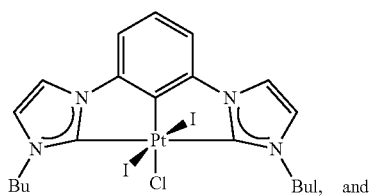
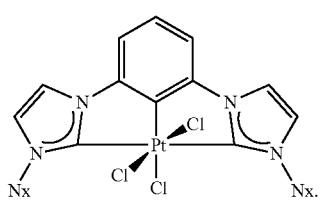
In one embodiment, M is Pd. In another embodiment, the complex is selected from the group consisting of:
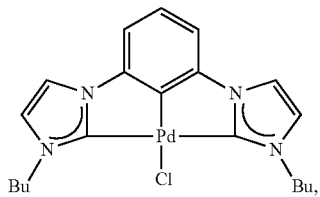
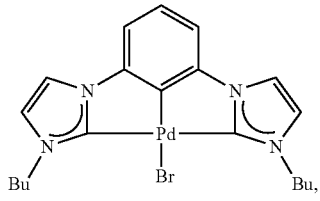
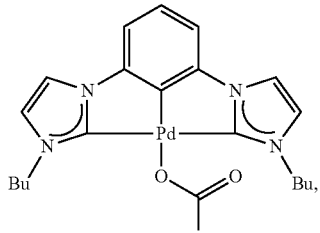
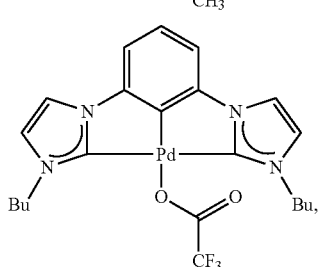
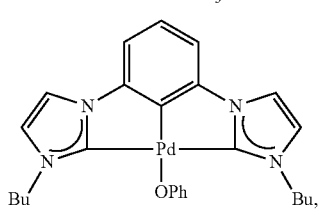

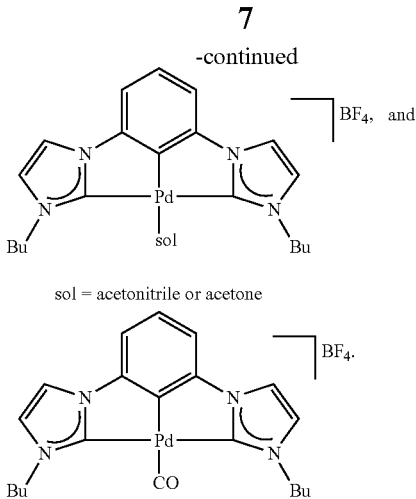

sol = acetonitrile or acetone

Also provided herein, in some embodiments is a symmetrical bimetallic complex comprising a structure according to Formula II:

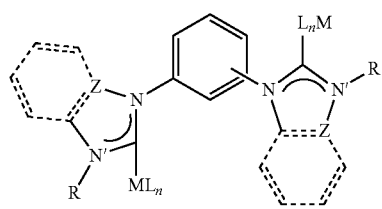

wherein M is a metal; wherein each N and N' is independently nitrogen or carbon; wherein Z is selected from the group consisting of CH, C, and N; wherein n is 0-3; wherein each L is independently a neutral or charged ligand; and wherein each R is independently an alkyl, Nx, $CH_2TMS$. In one embodiment, Z is N; R is Bu; $ML_n$ is Rh(COD)X; and X is I, Br, or Cl.

Further provided herein, in some embodiments, is a method of catalyzing a reaction comprising administering one or more of the complexes disclosed herein. In one embodiment, the reaction is reduction of $CO_2$.

BRIEF DESCRIPTION OF THE DRAWINGS

The presently-disclosed subject matter will be better understood, and features, aspects and advantages other than those set forth above will become apparent when consideration is given to the following detailed description thereof. Such detailed description makes reference to the following drawings, wherein.

Figure 1A:
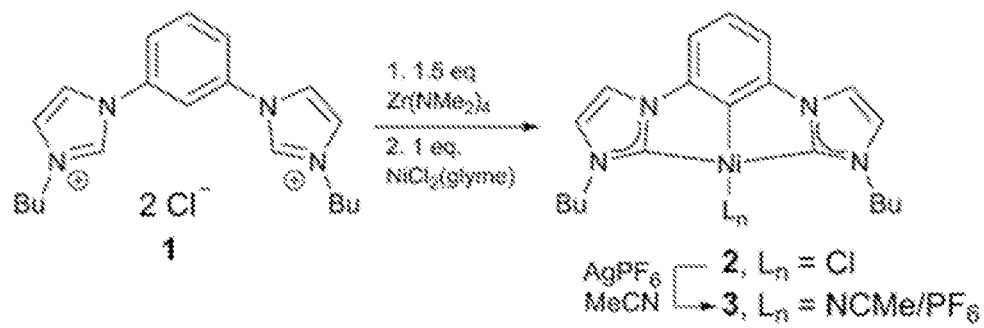
FIGS. 1A-B depict the basic synthesis schemes for symmetrical pincer metal complexes and symmetrical bimetallic complexes. (A) Shows the synthesis scheme of the ($^{Bu}C^i$-$C^iC^{Bu}$)Ni(II)Cl complex 2. (B) Shows the synthesis scheme for various symmetrical bimetallic complexes.

While the disclosure is susceptible to various modifications and alternative forms, specific embodiments thereof have been shown by way of example in the drawings and are herein described below in detail. It should be understood, however, that the description of specific embodiments is not intended to limit the disclosure to cover all modifications, equivalents and alternatives falling within the spirit and scope of the disclosure as defined by the appended claims.

DEFINITIONS

Unless defined otherwise, all technical and scientific terms used herein have the same meaning as commonly understood by one of ordinary skill in the art to which the disclosure belongs. Any methods and materials similar to or equivalent to those described herein can be used in the practice or testing of the present disclosure, including the methods and materials are described below.

Following long-standing patent law convention, the terms "a," "an," and "the" refer to "one or more" when used in this application, including the claims. Thus, for example, reference to "a cell" includes a plurality of cells, and so forth.

The terms "comprising," "including," and "having" are intended to be inclusive and mean that there may be additional elements other than the listed elements.

Unless otherwise indicated, all numbers expressing quantities of ingredients, properties such as reaction conditions, and so forth used in the specification and claims are to be understood as being modified in all instances by the term "about." Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration, percentage, or the like is meant to encompass variations of in some embodiments ±50%, in some embodiments ±40%, in some embodiments ±30%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

All combinations of method or process steps as used herein can be performed in any order, unless otherwise specified or clearly implied to the contrary by the context in which the referenced combination is made.

DETAILED DESCRIPTION

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

The presently-disclosed subject matter relates to symmetrical metal complexes and methods of making the same. In some embodiments, the symmetrical metal complexes include symmetrical pincer metal complexes. For example, in one embodiment, the symmetrical pincer metal complexes include a structure according to Formula I:

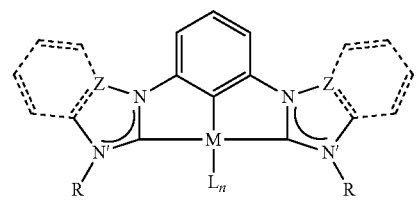

Where M is a metal, including, but not limited to, a transitional metal, Co, Rh, Ir, Cu, Ag, Au, Fe, Ru, Os, Cr, Mo, W, Mn, Re, or any other suitable metal for forming the structure of Formula I; each N and N' is independently nitrogen or carbon; Z is CH, C, or N; n is 0, 1, 2, or 3; each L is independently a neutral or charged ligand (positive or negatively charged), including, but not limited to, monodentate, bidentate, or tridentate ligands; and each R is independently an alkyl or aryl substituent containing 1 to 50 carbons. In another embodiment, the alkyl or aryl of R may be substituted and include other elements, such as, but not limited to, O, Si, halogens, S, Se, B, and/or N. In a further embodiment, the alkyl and/or aryl of R is branched, and the other element is substituted in the branches thereof. Suitable R groups include, for example, methyl ethyl, propyl, butyl, isopropyl, pentyls, hexyls, neohexyl, $CH_2TMS$, phenyl, p-t-Buphenyl, other substituted aryls, or combinations thereof. Suitable ligands include, but are not limited to, halogen, alkyl (e.g., methyl, ethyl, propyl, butyl, pentyl, hexyl, etc., and branched analogs thereof), alkenyl, alkynyl, aryl, biaryl, substituted aryl (e.g., fluoro substituted aryl), aryloxy and substituted analogs, acetate, trifluoroacetate, alkoxy, or any other suitable ligand. In certain embodiments, the other suitable ligands include any ligand that results in a cationic complex.

In one embodiment, M is nickel and N, N', Z, R, and $L_n$ are each as defined above. For example, in another embodiment, the symmetrical pincer metal complex includes, but is not limited to:

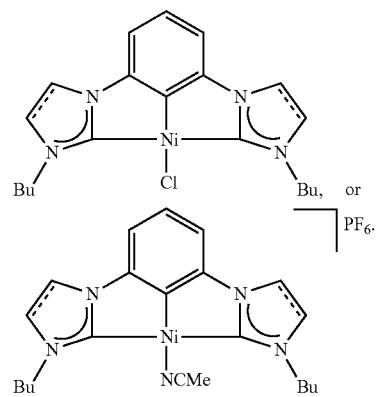

Although the complexes above both include N for N', CH for Z, and Bu for R, as will be appreciated by those skilled in the art, the nickel containing complexes are not so limited and may include any other suitable elements or combination of elements as discussed hereinabove.

In one embodiment, M is platinum and N, N', Z, R, and $L_n$ are each as defined above. For example, in another embodiment, the symmetrical pincer metal complex includes, but is not limited to:

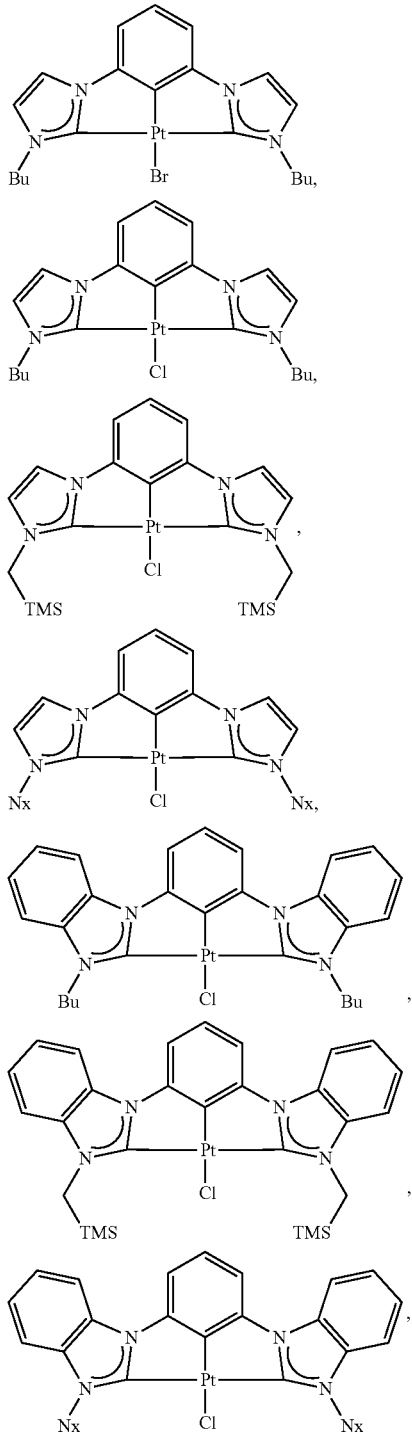

-continued

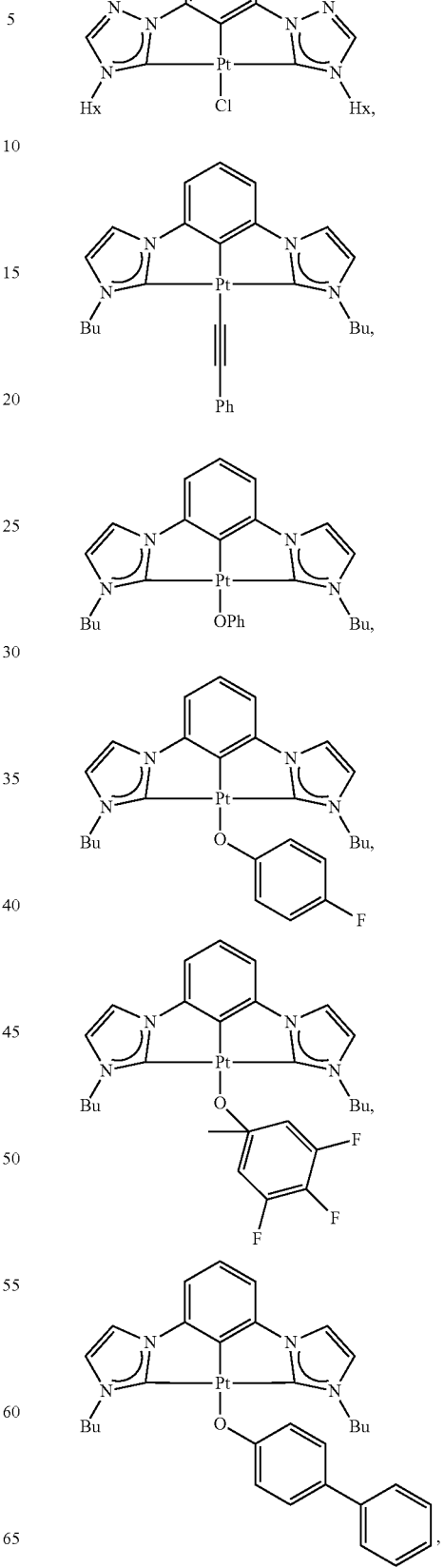

-continued
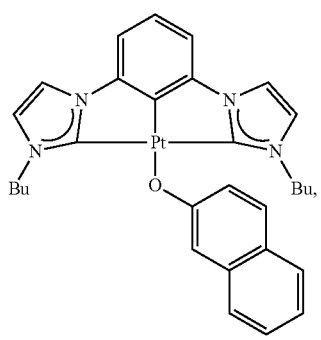
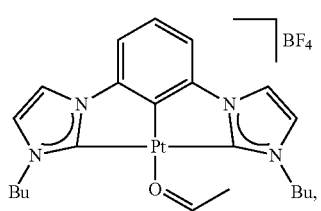
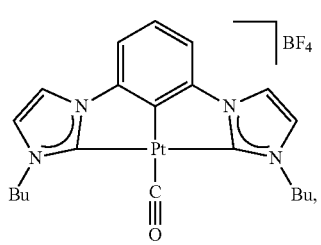
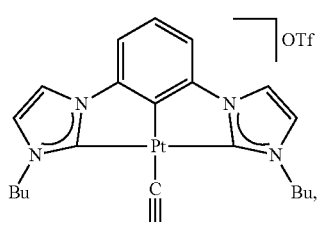
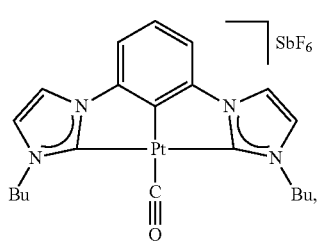
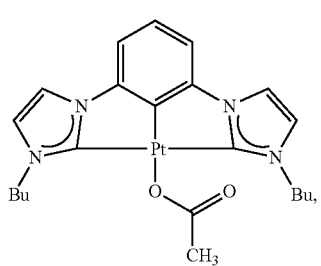
-continued
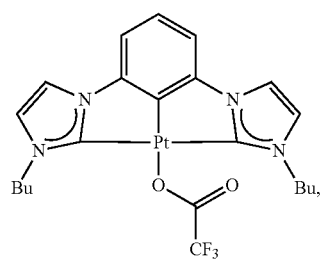
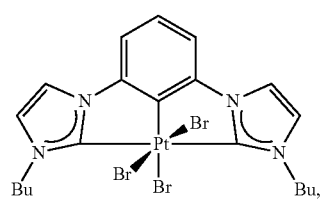
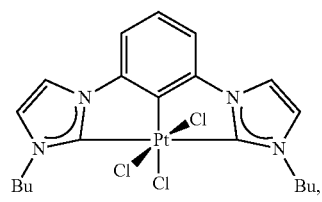
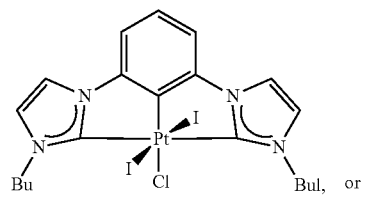
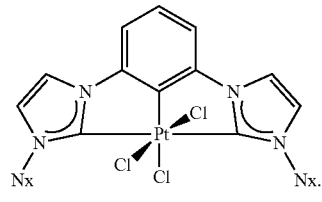 or
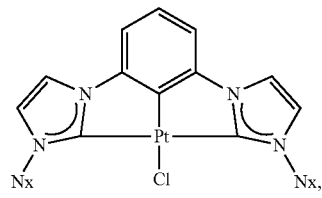
In another embodiment, the symmetrical pincer metal complex includes, but is not limited to:
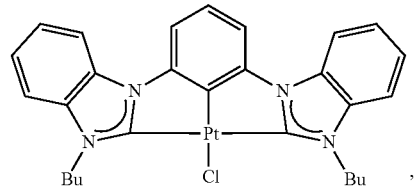

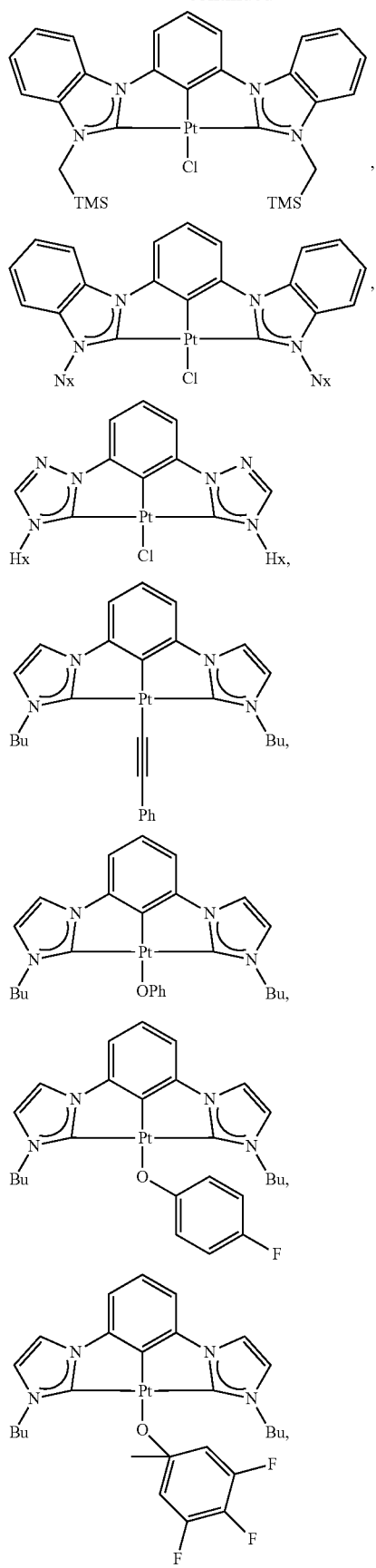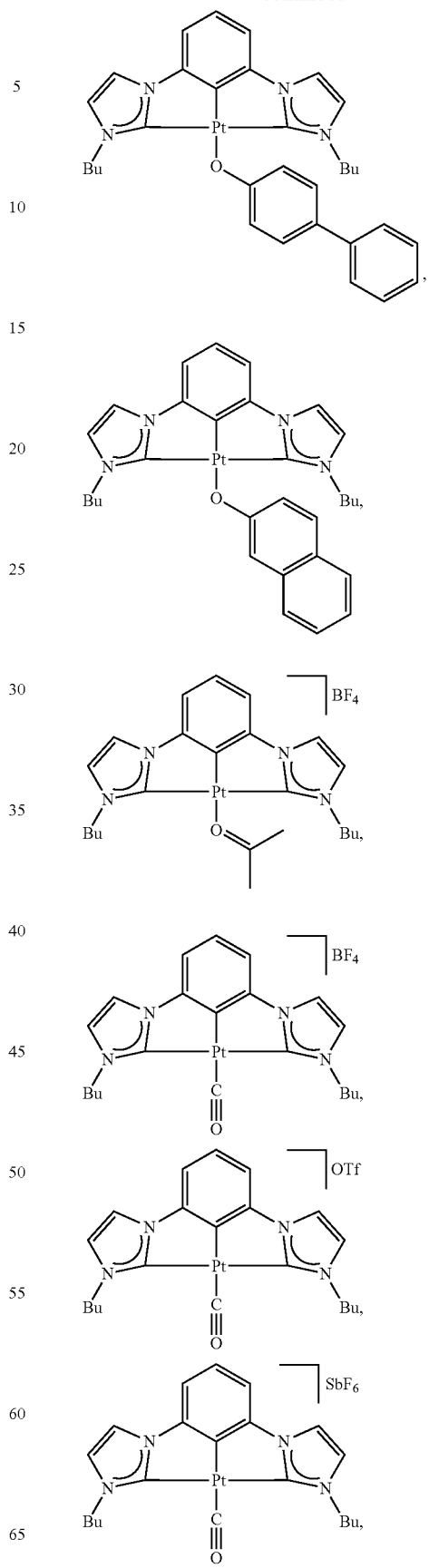

-continued

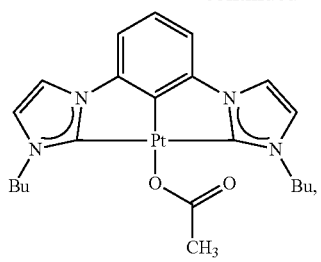

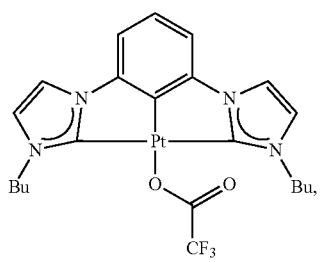

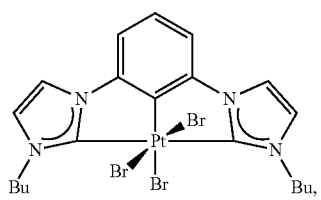

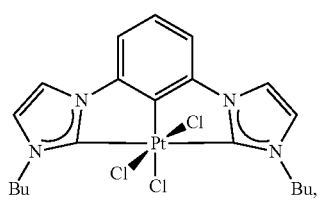

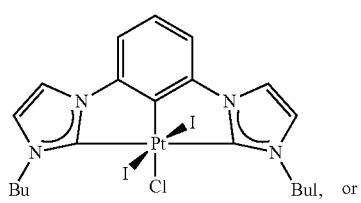, or

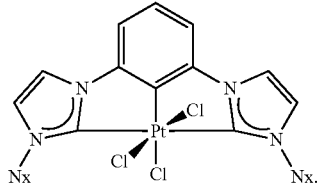

Although the complexes above are described with respect to Pt as the metal, as will be appreciated by those skilled in the art, the complexes are not so limited and may include any other suitable metal in combination with the specific N, N', Z, R, and $L_n$ substituents shown above.

In one embodiment, M is palladium and N, N', Z, R, and $L_n$ are each as defined above. For example, in another embodiment, the symmetrical pincer metal complex includes, but is not limited to:

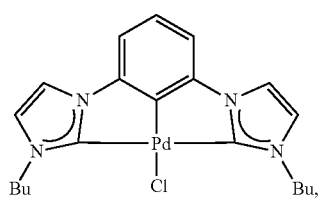

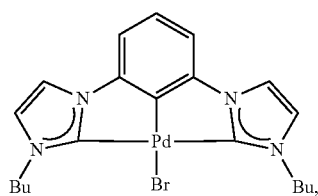

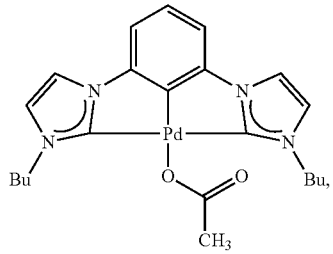

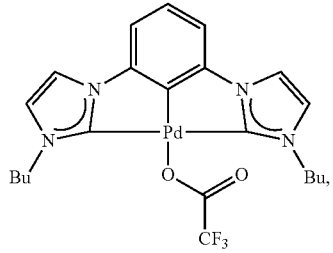

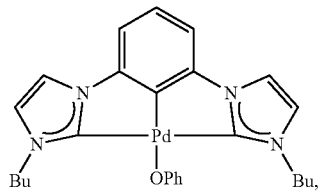

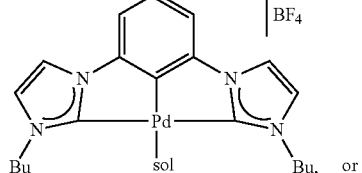, or sol = acetonitrile or acetone

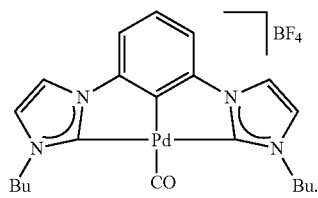

In some embodiments, the symmetrical metal complexes include symmetrical bimetallic complexes. For example, in one embodiment, the symmetrical bimetallic complexes include a structure according to Formula II:

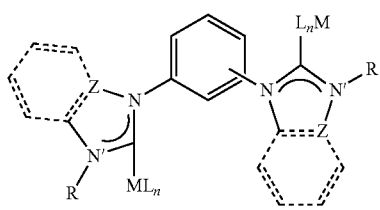

II

Where M is a metal, including, but not limited to, a transitional metal; each N and N' is independently nitrogen or carbon; Z is CH, C, or N; n is 0, 1, 2, or 3; each L is independently a neutral or charged ligand (positive or negatively charged), including, but not limited to, monodentate, bidentate, or tridentate ligands; and each R is independently an alkyl or aryl substituent containing 1 to 50 carbons. In another embodiment, the alkyl or aryl of R may be substituted and include other elements, such as, but not limited to, O, Si, halogens, S, Se, B, and/or N. In a further embodiment, the alkyl and/or aryl of R is branched, and the other element is substituted in the branches thereof. Suitable R groups include, for example, methyl ethyl, propyl, butyl, isopropyl, pentyls, hexyls, neohexyl, $CH_2TMS$, phenyl, p-t-Buphenyl, other substituted aryls, or combinations thereof. Suitable ligands include, but are not limited to, halogen, alkyl (e.g., methyl, ethyl, propyl, butyl, pentyl, hexyl, etc., and branched analogs thereof), alkenyl, alkynyl, aryl, biaryl, substituted aryl (e.g., fluoro substituted aryl), aryloxy and substituted analogs, acetate, trifluoroacetate, alkoxy, or any other suitable ligand. In certain embodiments, the other suitable ligands include any ligand that results in a cationic complex.

In one embodiment, the symmetrical bimetallic complexes include a structure according to Formula III:

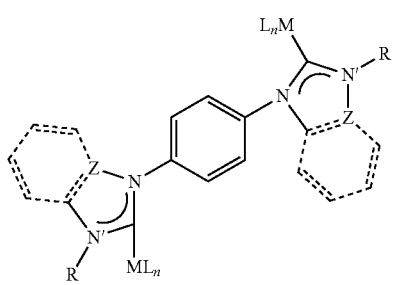

III

In a another embodiment, the symmetrical bimetallic complexes include a structure according to Formula IV:

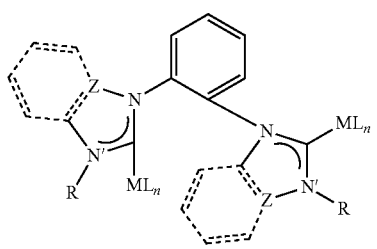

IV

For example, in some embodiments, where the symmetrical bimetallic complex includes a structure according to Formula III or IV, Z is N, R is Bu; $ML_n$ is Rh(COD)X; and X is I, Br, or Cl.

Also provided herein, in some embodiments, is a method of forming the symmetrical metal complexes disclosed herein. For example, in one embodiment, the method includes metalation/transmetalation, as discussed in detail in the Examples below. In another embodiment, the method includes metalation of a salt precursor with any suitable metalation source, such as $Zr(NMe_2)_4$, followed by transmetalation with any suitable transmetalation source. As will be appreciated by those skilled in the art, suitable transmetalation sources are selected based upon the desired metal and ligand of the final complex. Such transmetalation sources include, but are not limited to, $NiX_2$(glyme) for Ni based complexes with X as the ligand, $Pt(COD)X_2$ for Pt based complexes with X as the ligand, and $Pd(COD)X_2$ for Pt based complexes with X as the ligand.

As further discussed in the Examples below, the symmetrical metal complexes disclosed herein form catalysts for various catalytic reactions, organic transformations, and/or energy related reactions. One such catalytic reaction includes electrocatalytic reduction of $CO_2$. Under a variety of conditions for electrocatalytic reduction of $CO_2$, the complexes and their cations provide fast catalytic rates and high substrate selectivity ($CO_2$ vs H+). In certain embodiments, rates improved in the presence of water, and, significantly, catalysis occurred at the first reduction potential, presumably at the Ni(I) state for Ni based complexes. Additionally, in some embodiments, controlled potential electrolysis (CPE) of the Ni based complexes yields CO at 34% and formate at 47% Faradaic efficiency (FE). The symmetrical metal complexes disclosed herein may also form light emitting fluorescent molecules. For example, in some embodiments, palladium based complexes exhibited photoactivity. Accordingly, also provided herein are methods of applying these complexes as bio-active agents, for catalytic reactions such as reduction of carbon dioxide, for organic transformations, and/or for energy related reactions.

The presently-disclosed subject matter is further illustrated by the following specific but non-limiting examples. The following examples may include compilations of data that are representative of data gathered at various times during the course of development and experimentation related to the presently-disclosed subject matter.

EXAMPLES

Example 1

This Example demonstrates the synthesis, characterization, and catalytic activity of a CCC—NHC pincer Ni complex with excellent selectivity and catalytic rates for $CO_2$ reduction. The pyridyl group in the CNC—Ni pincer was replaced with an aryl group, a stronger donor, as in the CCC—NHC pincer ligand to enhance the catalytic reduction of $CO_2$. As shown in the other Examples below, the nickel moiety may be replaced with palladium, platinum, or rhodium for $CO_2$ reduction.

General Synthesis of Symmetrical Pincer Metal Complexes

Reagents for syntheses were purchased from commercial sources and used no further purification. All experiments took place under inert atmosphere using a glovebox unless otherwise noted $^1H$ NMR and $^{13}C$ NMR were obtained using Bruker AVANCE III 300 MHz. $CDCl_3$ and Acetone- D6 were both degassed and dried prior to use in initial synthesis and NMR characterization. ESI was obtained using Bruker UHPLC-Micro-Q-ToF MS/MS. 1,3-bis(1-imidazol-3-yl)benzene dihalide salts were prepared from a previously reported synthesis.

Figure 2A:
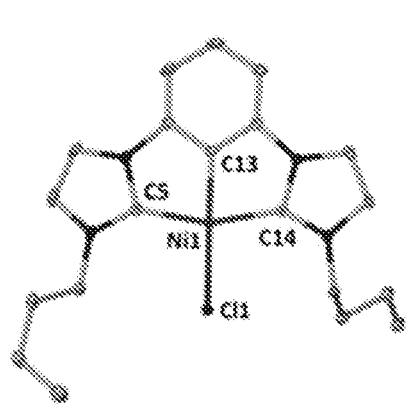
FIGS. 2A-B depict ORTEP diagrams with thermal ellipsoids shown at 50% probability of the molecular structure with selected bond lengths (Å) and angles (°) of (A) Ni complex 2 ($^{Bu}C^iC^iC^{Bu}$)NiCl, 2: Ni1-C13=1.854(3); Ni1-C5=1.954(3); Ni1-C14=1.955(3); Ni1-Cl1=2.2312(8). C5-Ni1-C13=80.38(12); C13-Ni1-C14=79.80(12); C5-Ni1-C14=160.15(11); C5-Ni1-Cl1=99.62(9); C14-Ni1-Cl1=100.12(8); and (B) Ni complex 3 [($^{Bu}C^iC^iC^{Bu}$)Ni(NC-Me)]$PF_6$, 3: Ni1-C13=1.854(2); Ni1-C5=1.933(2); Ni1-C14=1.940(2); Ni1-N5=1.8943(19); N5-C21=1.141(3); C21-C22=1.454(3); C5-Ni1-C13=79.70(9); C13-Ni1-C14=80.46(10); C5-Ni1-C14=160.14(9); C5-Ni1-N5=99.96(8); C14-Ni1-N5=99.84(8); Ni1-N5-C21=178.59(19).

The imidazolium salt 1 was combined with 1.5 eq. $Zr(NMe_2)_4$ in DCM and stirred for 1 hr, at which point $NiCl_2(DME)$ was added and allowed to react for 16 hr (FIG. 1A). Following an aqueous workup, the $^1H$ NMR for 2 showed loss of the imidazolium signal at 11.9 ppm and loss of an Ar—H signal consistent with metalation of the aromatic ring. $^{13}C$ NMR also revealed a peak at 172.5 ppm for the Ni—$C_{NHC}$ carbon, which is consistent with previously reported CCC—NHC pincer complexes. The molecular structure of 2 is depicted in FIG. 2A as determined by X-ray diffraction.

Figure 2B:
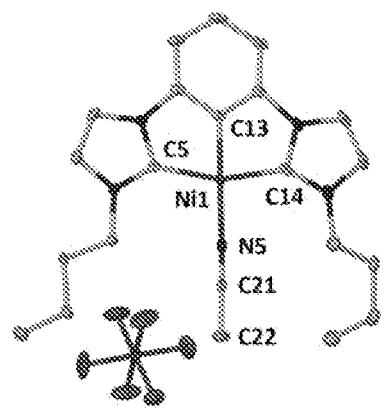

Additionally, for evaluation in the electrochemical reduction of $CO_2$, 2 was reacted with AgPF6 to produce the MeCN adduct 3. Complex 3 was initially prepared in situ to evaluate for activity, and was eventually isolated independently for electrochemical study. The molecular structure is depicted in FIG. 2B.

General Synthesis of Symmetrical Bimetallic Complexes

Figure 1B:
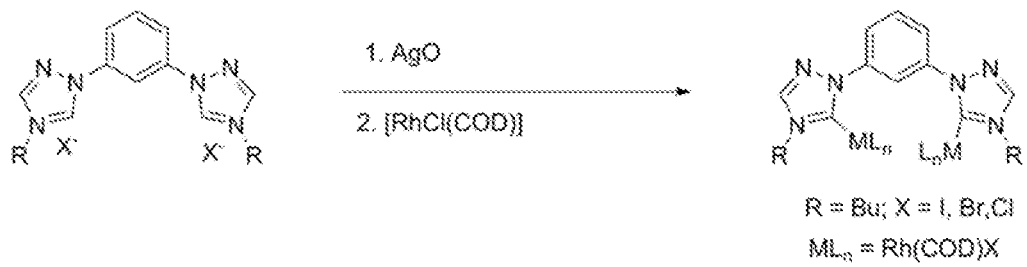

Referring to FIG. 1B, The bis-salt, 1,3-bis(1'-butyl-3'-triazolyl)benzene dichloride (1 mmol), $Ag_2O$ (0.57 mmol), KOH (0.5 mmol), and MeCN (30 mL) were combined, protected from light, and stirred at room temperature for 24 h. The cloudy beige reaction mixture was filtered to yield a yellow filtrate and a white precipitate. The precipitate was triturated with hexanes (3×5 mL) and dried under reduced pressure to yield a white solid. It was combined with $[Rh(COD)Cl]_2$ (0.52 mmol) and $CH_2Cl_2$ (10 mL) and stirred at room temperature. After 24 h, the reaction mixture was filtered, and the volatiles were removed under reduced pressure. The resulting solid was triturated with hexanes (2×5 mL) and dried under reduced pressure to yield a yellow solid.

Synthesis of 2-(1,3-Bis(N-butylimidazol-2-ylidene) phenylene)(chloro)-nickel(II) (2)

Under an inert atmosphere 1,3-bis(1-benzylimidizol-3-yl) benzene dichloride (0.307 g, 0.777 mmol) and $Zr(NMe_2)_4$ (0.301 g, 1.13 mmol) were combined in $CH_2Cl_2$ (10 mL) and stirred for 1 hour. $NiCl_2$ (glyme) (0.168 g, 0.763 mmol) was added and stirred for 3 hours. Water (0.600 mL, 0.033 mmol) was added producing a precipitate that was removed and washed with $CH_2Cl_2$ (3×10 mL). The filtrate was concentrated, and the resulting orange-yellow solid was dried under reduced pressure. Isopropyl alcohol (2 mL) was added and the resulting suspension vigorously stirred for 2 minutes. Filtration afforded a glittering orange-yellow microcrystalline solid (0.182 g, 0.439 mmol, 58.8%). X-ray quality crystals were obtained by a vapor diffusion of diethyl ether with a $CH_2Cl_2$ solution of 2. $^1H$ NMR ($CDCl_3$, 500 MHz): δ 7.23 (d, 2H, J=1.7 Hz), 7.03 (t, 1H, J=7.8 Hz), 6.79 (d, 2H, J=1.7 Hz), 6.71 (d, 2H, J=7.8 Hz), 4.65 (t, 4H, J=7.4 Hz), 1.87 (quintet, 4H, J=7.6 Hz), 1.45 (sextet, 4H, J=7.6 Hz), 0.97 (t, 6H, J=7.4 Hz). $^{13}C\{H\}$ NMR ($CDCl_3$; 125 MHz): δ 172.5, 146.9, 145.5, 124.7, 121.7, 112.8, 106.5, 49.0, 34.1, 19.8, 13.9. ESI-MS (m/z): observed, 379.1545 for $[M-Cl]^+$; calcd, 379.1433 for $C_{20}H_{25}N_4Ni$.

Synthesis of 2-(1,3-Bis(N-butylimidazol-2-ylidene) phenylene)(acetonitrile)-nickel(II) hexafluorophosphate (3)

Under an inert atmosphere, 2-(1,3-bis(N-butylimidazol-2-ylidene)phenylene)(chloro)-nickel(II) (2) (56 mg, 0.13 mmol), silver hexafluorophosphate (35.5 mg, 0.15 mmol) and acetonitrile (10 mL) were combined and covered with aluminum foil. The mixture was stirred for 1 h at room temperature to afford a yellow solution. The solution was passed through a plug of Celite, concentrated under reduced pressure, dissolved in $CH_2Cl_2$ (2 mL) and passed through a second plug of Celite, concentrated to dryness under reduced pressure affording a yellow solid (0.076 mg, 0.13 mmol, 81.5%). %). X-ray quality crystals were obtained by a vapor diffusion of diethyl ether with a $CH_2Cl_2$ solution of 3.1 H NMR (Acetone-$d_6$; 500 MHz): δ 7.79 (s, 2H), 7.32 (s, 2H), 7.17 (t, 1H, J=7.5 Hz), 7.05 (d, 2H, J=7.8 Hz), 4.09 (t, 4H, J=7.2 Hz), 2.61 (s, 3H), 1.88 (quintet, 4H, J=7.2 Hz), 1.42 (sextet, 4H, J=7.4 Hz), 0.99 (t, 6H, J=7.4 Hz). $^{13}C\{H\}$ NMR (Acetone-$d_6$; 125 MHz): 147.9, 147.2, 143.3, 127.1, 123.1, 114.7, 108.0, 49.1, 33.5, 19.6, 13.1, 2.4. ESI-MS (m/z): observed, 379.1545 $[M-PF_6-NCMe]^+$; calcd, 379.1433 for $.C_{20}H_{25}N_4Ni$.

Methods and Materials

CV Studies and Electrode Surface Area Measurement.

Cyclic voltammetry was measured using a CH Instruments electrochemical analyzer with ferrocene as an internal reference, platinum as a pseudo-reference electrode, platinum as a counter electrode and glassy carbon as the working electrode. All electrochemical measurements were measured in acetonitrile using the scan rate of 100 mV/s. An acetonitrile 0.1 M tetrabutylammonium hexafluorophosphate electrolyte solution (3 mL) was used with a catalyst concentration of 1 mM. Before the each measurement the solution was degassed with $N_2$ or $CO_2$ (for about 15 min). To avoid concentration changes for the electrolyte and catalyst, the desired experimental solvent volume and accurate concentrations were added to the electrolysis cell. The solvent height in the cell was marked and, the mixture was then diluted with pure acetonitrile (2-3 mL). The mixture was then degassed with $N_2$ or $CO_2$ until the solvent evaporated and level returned to the marked volume. For experiments with water, the catalyst concentration in water (2M) was adjusted prior to dilution with pure acetonitrile. No additional water was added during evaporation. During cyclic voltammetry measurement scans, the sweep width window was set to approximately 100 mV past the second reduction wave peak.

Figure 3:
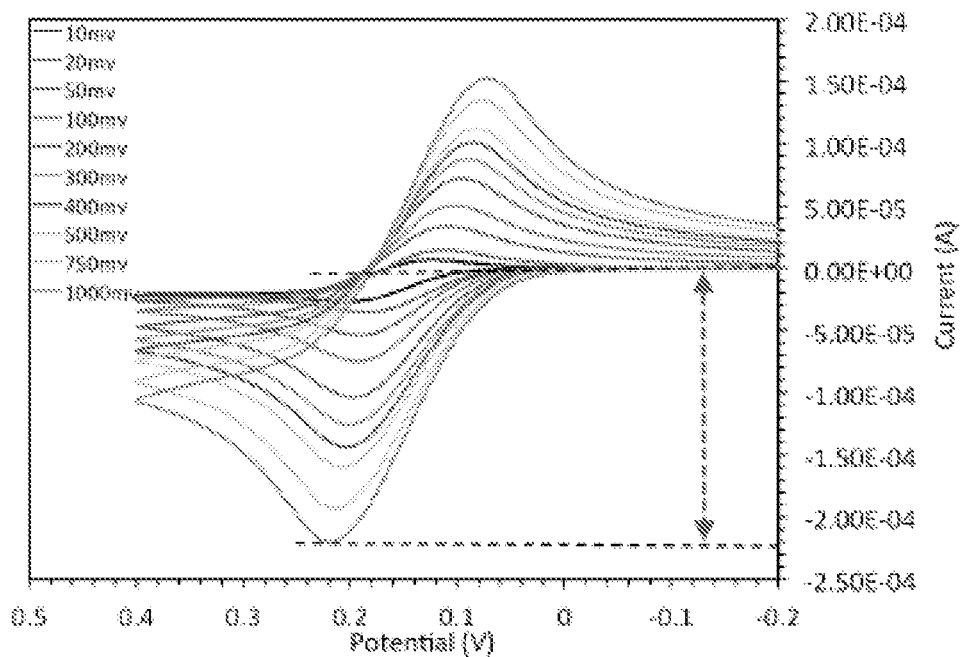
FIG. 3 shows a graph illustrating potential versus current at scan rates of between 10 my and 1000 my.
Figure 4:
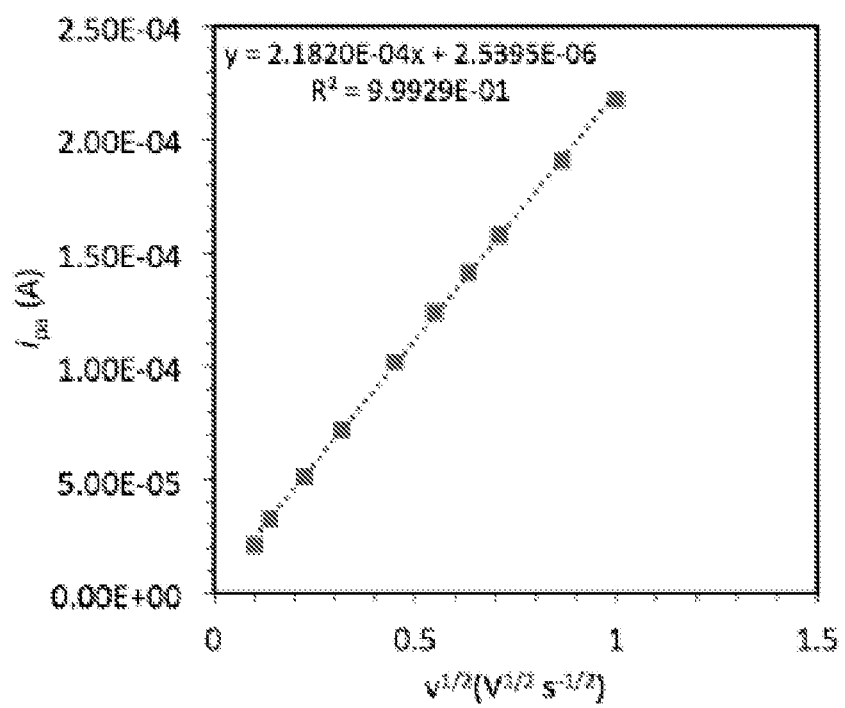
FIG. 4 shows a graph illustrating the square root of the scan rate potted versus the absolute value of the anodic peak current.

The glassy carbon working electrode surface area was measured using the Randles-Sevcik equation:

$$i_p = 0.4463 n F A_{eff} C (nFvD/RT)^{1/2}$$

where at room temperature the equation is simplified to:

$$i_p = 269,000 n^{3/2} A_{eff} D^{1/2} C v^{1/2}$$

Where $i_p$ is the current maximum in amps, n is number of electrons transferred, $A_{eff}$ is the effective electrode surface area in $cm^{-2}$, D is the diffusion coefficient in $cm^2/s$, C is the concentration in $mol/cm^3$, and v is the scan rate in V/s. The simplified term definitions are as follows: F is Farraday's constant in C/mol, R is the gas constant in VC/Kmol, and T is temperature in K. Experimental data was collected via CV with a glassy carbon working electrode, a platinum reference and platinum counter electrode in acetonitrile with a 0.1 M tetrabutylammonium hexafluorophosphate electrolyte solution. Ferrocene was used as a reversible redox standard with a concentration of 1 mM. The diffusion coefficient of ferrocene in acetonitrile was taken as $2.60 \times 10^{-5}$ $cm^2/s$ as reported in: Wang, Y.; Rogers, E. I.; Compton, R. G. *Journal of Electroanalytical Chemistry* 2010, 648, 15-19. The scan rates were varied from 10 mV to 1000 mV (FIG. 3), and the square root of the scan rate was potted versus the absolute value of the anodic peak current (FIG. 4). The slope of the linear fit was used in the Randles-Sevcik equation and $A_{eff}$ found.

Controlled Potential Electrolysis (CPE)

Figure 5:
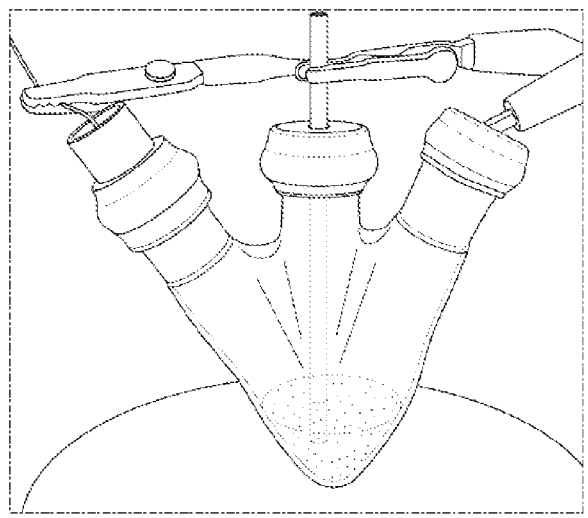
FIG. 5 shows an image illustrating an electrochemical analyzer using a three-neck flask as the cell with rubber septum sealed electrode ports.

All the measurements were taken with a CH Instruments electrochemical analyzer and using a three-neck flask (50 mL) as the cell with rubber septum sealed electrode ports. The electrodes used are a platinum cylindrical plate as the counter electrode inside of a fine fritted isolation chamber, Ag/AgCl as the reference electrode and a glassy carbon 3 mm diameter carbon type 2 rod as the working electrode (FIG. 5). Ferrocene (saturated in acetonitrile with 0.1 M tetrabutylammonium hexafluorophosphate) was used as a sacrificial oxidant in the isolation chamber to avoid complete consumption of electrolyte during electrolysis. The height of solution in the isolation chamber (about 2 mL) was even with the larger glassy carbon chamber solution level when the isolation chamber was fully submerged. To the glassy carbon chamber was added 6 mL of 0.1 M tetrabutylammonium hexafluorophosphate in acetonitrile solution. Two additional milliliters of pure acetonitrile was then added to the glassy carbon chamber with κ μmol of catalyst, then the solution was degassed with $CO_2$ (about 15 min) until 2 mL of acetonitrile had evaporated from the glassy carbon chamber and a slow scan (0.01 mV/s CV scan was taken of the solution) to find the fixed potential to be used during CPE. The fixed CPE potential was set at −1.95 V (CPE with water) or −2.3 V (CPE without water) vs SCE (about 200 mV more negative than the peak current potential) for 2 hours with the charge passed being monitored over time. During electrolysis headspace samples (300 μL) were taken with a VICI valved syringe. The gas in the syringe was compressed to 250 μL, then with the tip of the syringed submerged in a vial of diethyl ether, the valve was open to allow the pressure to equalize to atmospheric pressure. The entire 250 μL sample was then injected onto a custom Agilent 7890B Gas Chromatograph (column, Agilent PorapakQ 6 ft, ⅛ OD) with a dual detector system (TCD and FID), a methanizer before the FID detector, and a backflush system to maintain good spectrum in the presence of $CO_2$. Quantification of CO and methane was made using the FID detector and $H_2$ was quantified on the TCD detector (all calibrated using standards purchased from BuyCalGas. com). Formate detection is outlined below.

Controlled Potential Electrolysis Setup (CPE/Bulk Electrolysis/BE)

Left electrode is a platinum cylindrical plate counter electrode inside of an isolation chamber with the glass frit visible just below the bottom red line. The isolation chamber has an exchangeable atmosphere with the larger chamber. The central electrode is the glassy carbon type 2 working electrode. The right electrode is a Ag/AgCl reference electrode.

¹H NMR Formate Detection

Figure 6:
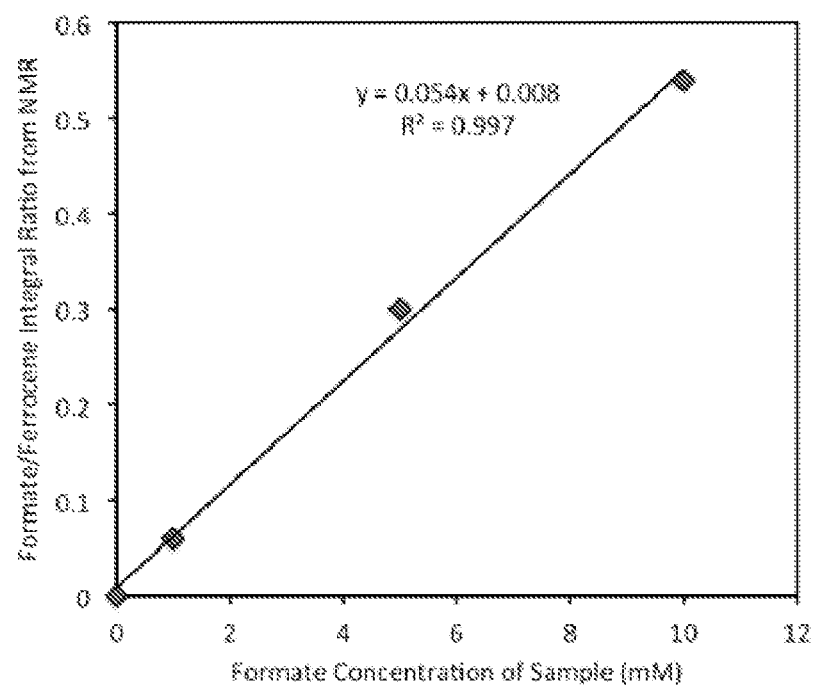
FIG. 6 shows a graph illustrating a formate calibration curve of NMR samples of formate in d3-MeCN with ferrocene as an internal standard.

The instant procedure was a slightly modified version of that found in Fei, H.; Sampson, M. D.; Lee, Y.; Kubiak, C. P.; Cohen, S. M. *Inorg. Chem.* 2015, 54, 6821, and was as follows: Upon reaction completion, 0.8 mL of the reaction solution was taken into a syringe and added to a 4 mL vial. To this 36 uL of Verkade's Triisobutyl Superbase (CAS #331465-71-5; 2,8,9-Triisobutyl-2,5,8,9-tetraaza-1-phosphabicyclo[3.3.3]undecane) was added to the solution. The mixture was sonicated for 10 minutes at room temperature. 1.16 mL of a d3-MeCN ferrocene solution (1.19 mM concentration) was added to the mixture. The vial was thoroughly mixed, then an NMR spectrum was taken on a 500 MHz NMR with an extended d1-delay of 10 seconds and a minimum of 200 scans. The ratio of the formate peak (about 8.7 ppm) and the ferrocene peak (about 4.2 ppm) were then compared to a calibration curve generated through the analysis of known concentrations of formate (0.0 mM, 0.1 mM, 1.0 mM and 10.0 mM solutions). Through this method the concentration of formate could be evaluated accurately through a trendline having an $R^2$ value of 0.997 (FIG. 6). All NMR spectrum were evaluated with MestReNova software to ensure level baselines in the analyte region prior to integrating peaks.

Discussion

A number of catalytic reactions and electronic device applications have more predictable performance properties when electrochemical redox potentials are considered. Cyclic voltammetry (CV) was conducted with complex 2 to establish the viability of this complex for reductive catalysis. Two non-reversible reduction waves were observed in MeCN with 0.1 M $Bu_4NPF_6$ electrolyte (FIG. 7) under nitrogen with reduction potential onsets at −2.35 V ($E_{(S/S-)}$) and −2.6 V ($E_{(S-/S2-)}$) versus ferrocene/ferrocenium (Fc/Fc⁺). Increasing the scan rate did not reveal any pseudo-reversibility for these reduction waves suggesting a change in the structure of 2. DFT computations show that after the first reduction of 2 the loss of Cl⁻ is free energy favored (−11.1 kcal mol⁻¹). Without wishing to be bound by theory, it is believed that the loss of Cl⁻ from reduced 2 may be the source of irreversibility. Importantly, the reduction potentials are sufficiently high in energy for catalytic $CO_2$ reduction, and the significantly negative potentials could lead to interesting electron transfer kinetics and product distributions during catalysis, albeit, thermodynamically, at less energy efficient overpotentials.

Figure 7:
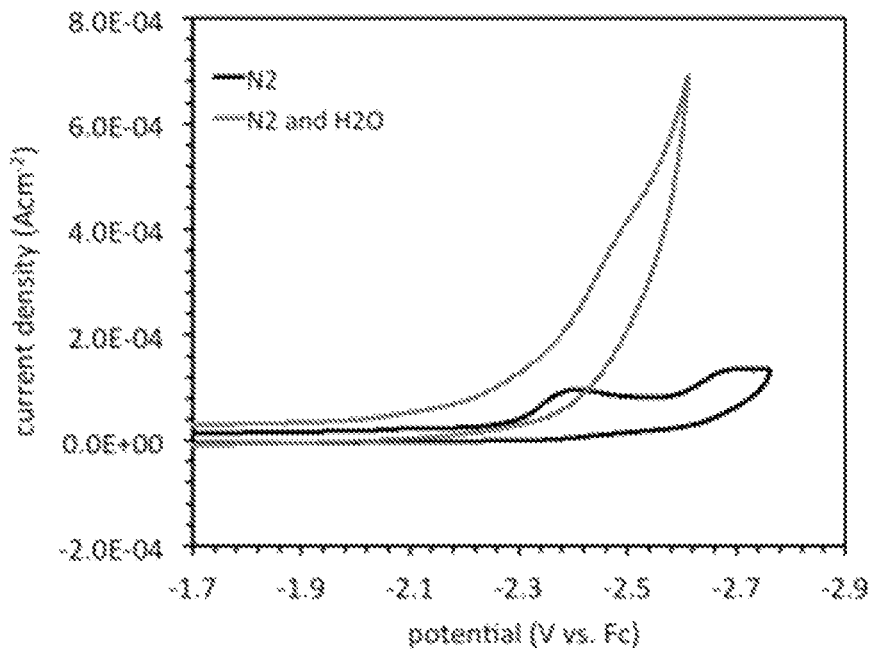
FIG. 7 shows a plotted graph illustrating CV of Ni complex 2 in MeCN under N2 with no added water (black) and under N2 with added water (blue).

Water in solvent quantities is desirable for many catalytic cycles as it can dramatically increase the rates of catalysis and alter activation energy barriers. Pre-catalysts, which produce active catalysts in water/organic solvent solutions, are highly desirable and may lead to improved product selectivity and reaction rates. When the CV was collected in 2M $H_2O$ in MeCN, a modest increase in current was observed at the first reduction potential (FIG. 7). The second reduction wave was more dramatically affected by the addition of water than the first showing a noticeable increase in current. These results suggest that if a reaction being catalyzed by complex 2 occurs at the first reduction wave, then the reaction could be compatible with solvent quantities of water.

Figure 8:
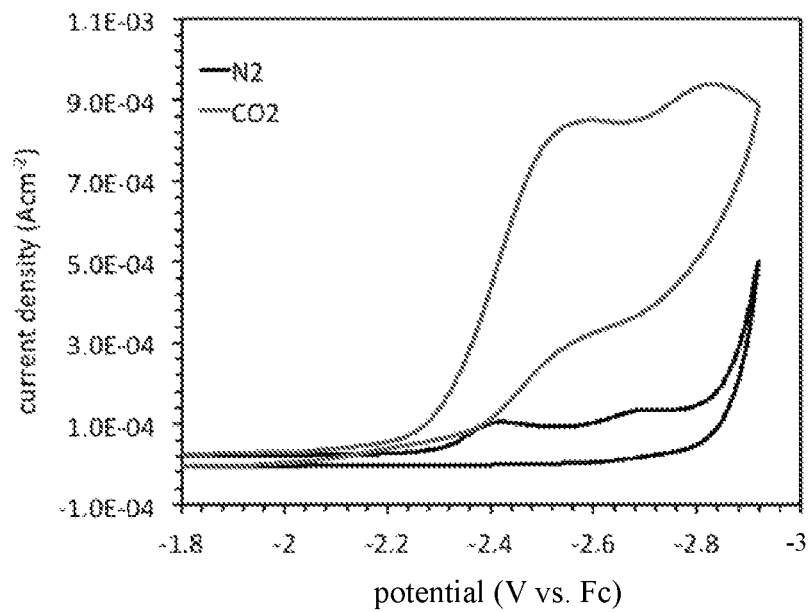
FIG. 8 shows a plotted graph illustrating CV of Ni complex 2 in MeCN under N2 (black) and $CO_2$ (red).

Complex 2 was evaluated for the first time for electrocatalytic $CO_2$ reduction. The instant inventors' CV studies under inert atmosphere indicated complex 2 has a first reduction potential near −2.35 V versus Fc/Fc⁺ in MeCN. Upon saturating MeCN with $CO_2$ and exchanging the $N_2$ atmosphere for $CO_2$ with no added water, a substantial increase in current at the first reduction potential was observed with a slight shift in onset potential (FIG. 8). Catalytic activity has been previously noted to occur on the first reduction wave in the cases of Mn and Re complexes with strongly donating NHC-based ligands, Ni with macrocycle-based ligands, and Au-nanomaterials. However, it is believed that the instant Example represents the first NHC-ligated Ni catalyst where $CO_2$ reduction catalysis occurred at the first reduction potential.

Figure 9:
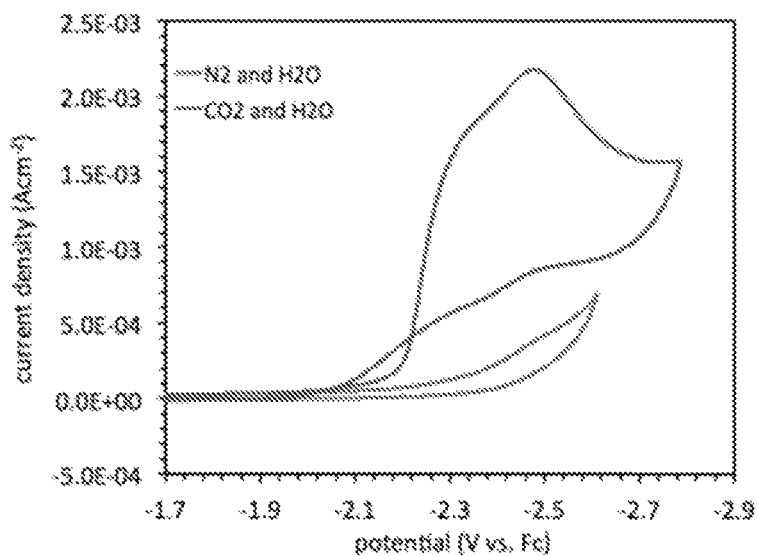
FIG. 9 shows a plotted graph illustrating cyclic voltammetry of Ni complex 2 in a water:MeCN mixture under N2 (and H2O, blue) and $CO_2$ (and H2O, red).

Turnover frequencies (TOFs) were estimated from cyclic voltammetry measurements to establish relative rates between 2, 3, and literature reported catalysts. A TOF of 10 s⁻¹ in the absence of water was calculated at the first reduction of 2. Upon addition of 2M $H_2O$ in MeCN, a remarkable increase in current at the first potential is observed reaching a TOF of 30 s$^{-1}$ (FIG. 9). Additionally, a about 100 mV shift in reduction potential onset toward less negative values is observed when $CO_2$ is present, which is indicative of a pre-catalysis association of a $CO_2$ molecule to the Ni-complex (FIGS. 8-9). A TOF of 30 s$^{-1}$ is remarkable compared to known nickel catalysts and compares favorably to known $CO_2$ reduction catalysts in general. TABLE 1 summarizes the measured rates and reduction potentials relative to several state-of-the-art Ni catalysts. TOF values for [Ni(bimpy)]$^{2+}$, (CNC-pincer)Ni—Cl, Ni(cyclam)$^{2+}$, and Ni(MTC)$^{2+}$ are estimates from the reported voltammograms rounded to one significant figure, given the deviation of the voltammograms from an ideal S-shape.

The rate of $CO_2$ reduction of 2 is about 75 times faster than tetracoordinated complex Ni(bimpy)$^{2+}$. Additionally, the catalytic activity of [Ni(bimpy)](PF$_6$)$_2$ was found to occur at the second reduction potential (−1.6 V), which is in contrast to the catalytic reduction of $CO_2$ at the first reduction potential (−2.2 V) for complex 2. The tridentate CNC ligand, in CNC—Ni—Cl, differs from CCC—NHC Ni 2 by a nitrogen coordination to Ni in place of the aryl carbon coordination and the addition of a counterion, yet a dramatically different CV is observed under $CO_2$. CNC—Ni shows catalytic activity on the third reduction wave (−1.7 V), rather than the first, and with a about 30 times slower TOF when compared to CCC—Ni 2. Ni-cyclams and Ni-macrocycles have dominated Ni-based homogeneous $CO_2$ reduction catalysis. They have very high rates for catalytic activity with reduction frequently occurring at low overpotentials at the first wave. When compared with benchmark Ni(cyclam)$^{2+}$, CCC—Ni 2 shows a 6 times faster TOF at the first reduction wave. Additionally, when compared with one of the fastest Ni-macrocycles, Ni(MTC)$^{2+}$, CCC—Ni 2 is found to be within an order of magnitude of the rate (TOFs of 200 vs. 30 s$^1$, TABLE 1).

To probe the influence of the Cl ligand of 2, cationic complex 3 was prepared in situ for comparison. It has similar CV data to 2 (TABLE 1), and $CO_2$ reduction was observed at the first reduction potential as well. It was found to have a TOF value of 3 s$^{-1}$ in the absence of water, which is about 2 times the catalytic rate of the CNC—Ni complex. However, complex 3 was not found to be as effective a precatalyst as neutral complex 2. Use of isolated 3 was slower than in situ prepared 3, although (3+H$_2$O) did give the second fastest rate of these complexes (TABLE 1). Computations show that after the first reduction of 3 the loss of MeCN is free energy favored (−1.7 kcal mol$^{-1}$), but less so than the loss of Cl$^-$ from reduced 2 (−11.1 kcal mol$^{-1}$ (2) vs −1.7 kcal mol$^{-1}$ (3)).

TABLE 1

Comparison of reduction potentials at which catalysis occurs and TOF of state-of-the-art Ni-catalysts.

| Cat. | Reduction Wave Number | $E^{cat}(s^n/s^{n-1})^{47}$ | TOF (s$^{-1}$) |
|---|---|---|---|
| 2 | 1 | −2.3 | 10 |
| 3$^a$ | 1 | −2.5 | 3 |
| 3$^b$ | 1 | −2.2 | 1 |
| 2 (+H$_2$O) | 1 | −2.2 | 30 |
| 3$^b$ (+H$_2$O) | 1 | −2.2 | 4 |
| Ni(bimpy)$^{2+}$ | 2 | −1.6 | 0.4 |
| CNC—Ni—Cl | 3 | −1.7 | 1 |
| Ni(cyclam)$^{2+}$ | 1 | −1.7 | 5 |
| Ni(MTC)$^{2+}$ | 1 | −1.5 | 200 |

$^a$Prepared in situ
$^b$Isolated complex 3
$E^{cat}(s^n/s^{n-1})$—Onset potential at which reduction is observed in the presence of $CO_2$ versus ferrocene in MeCN.

To better understand this substantial increase in catalytic current, controlled potential electrolysis (CPE, bulk electrolysis) measurements were conducted with a glassy carbon rod, platinum counter electrode, and a Ag/AgCl reference electrode in MeCN with and without water. These results are summarized in TABLE 2. In the absence of added water, the potential was held constant at −2.7 V vs Fc/Fc$^+$ in a sealed reaction vessel under $CO_2$ while measuring the charge passed. Under these conditions 1.18 Coulombs were observed to pass in the first hour with a linear charge versus time plot. As CV suggested, the incorporation of $H_2O$ in the reaction mixture should lead to an increased rate of charge passing (1.23 C hr$^{-1}$) at a less negative electrolysis potential (−2.35 V versus Fc/Fc$^+$). It should be noted that the exact position of the working electrode is challenging to control, and likely leads to variability in the surface area/catalyst ratio and the relative rates of charge passing are loose estimates. Extending the electrolysis time demonstrated an initially linear charge versus time plot with water also. Enough charge had passed for catalyst turnover to have occurred at about 1 hour in CPE experiments with and without water.

TABLE 2

CPE measurement with and without water.

| Cat. | Potential (V) | Time (minutes) | Charge (C) | TON (max) | TON [FE (%)] H$_2$ | CO | HCO$_2^{-1}$ |
|---|---|---|---|---|---|---|---|
| 2 | −2.7 | 60 | 1.2 | 1 | 0 [0] | 0 [0] | 0 [0] |
| 2 | −2.8 | 550 | 13.4 | 11 | 0 [0] | 0 [3] | 1 [11] |
| 2$^a$ | −2.3 | 60 | 1.2 | 1 | N/A | N/A | N/A |
| 2$^a$ | −2.3 | 120 | 2.8 | 2 | 0 [0] | 1 [34] | 1 [47] |
| 2$^a$ | −2.3 | 550 | 36.4 | 31 | 0 [0] | 1 [3] | 5 [16] |
| 2$^a$ | −2.6 | 550 | 45.5 | 39 | 4 [10] | 1 [3] | 3 [8] |

$^a$H$_2$O added

The headspace above the reactions was sampled to analyze CO, CH$_4$, and H$_2$ production. The highest Faradaic efficiency (FE) for CO was observed after 2 hours of CPE in water at 34%. CH$_4$ and H$_2$ were each only observed in trace amounts. Given the lack of products in the gas phase (only 34% of passed charge accounted for), the solution phase was analyzed for formate through the Verkade's base method. A 47% FE for 1 TON at 2 hours was observed. Extending the reaction time to about 9 hours increased the TON to 5 and decreased the FE to 16%. Only 2 has been reported to produce formate among Ni-catalysts. Most Ni-catalysts produce CO as the primary product. The CCC—NHC ligand has led to a dramatic change in product selectivity, and reduction occurred at the first reduction wave versus the second or third reduction potential for reported Ni—NHC ligated catalysts. This highlights a potential change in mechanism.

In conclusion, this Example describes a new class of well-characterized CCC—NHC Ni complexes that can be readily synthesized through the established metallation/transmetallation methodology. 2-(1,3-Bis(N-butyl-imidazol- 2'-ylidene)phenylene) nickel(II) chloride, 2, has been found to provide excellent rates of electrocatalytic reduction of $CO_2$ without the production of $H_2$. Most significantly, $CO_2$ reduction occurs at the first reduction wave, and the rates are dramatically improved in the presence of bulk water. Product analysis shows the production of CO and formate, primarily, with a good combined FE of 81%.

Example 2

This Example describes eight new CCC—NHC based salts and nineteen new symmetrical CCC—NHC pincer platinum (Pt) complexes (including fifteen Pt(II) complexes and four Pt(IV) complexes) that were synthesized by metalation/transmetalation strategy and characterized. The meridional tridentate ligand based CCC—NHC pincer Pt(IV) complexes were synthesized and reported for the first time. The photophysical properties (absorptions, emissions, lifetimes, and quantum yields) of these new Pt complexes were studied. The molecular structures of the Pt complexes were determined by X-ray crystallography. The UV-Vis absorption and emission spectra in DCM solution and solid-state are reported. The solid-state photostability data, the radiative lifetime, and quantum yield are also reported. These symmetrical CCC—NHC pincer Pt complexes can be used in a variety of applications, including, but not limited to electrocatalytic $CO_2$ reduction, light emission uses, and bio-active uses.

1. Synthesis and Characterization

Figure 10A:
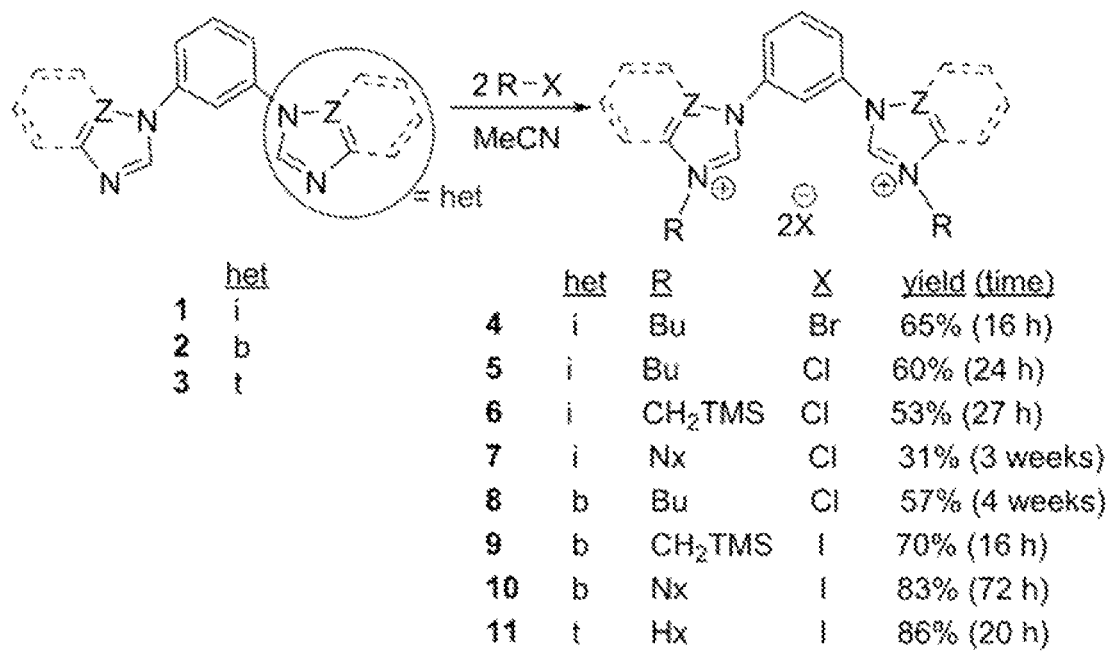
FIGS. 10A-B show schematics illustrating synthesis of salts (A) 4-11 and (B) 12-14. het=heterocycle; Z=CH, C or N; i=imidazole; b=benzimidazole; t=1,2,4-triazole; Bu=n-butyl; TMS=trimethylsilane; Nx=3,3-dimethylbutyl; Hx=n-hexyl.
Figure 10B:
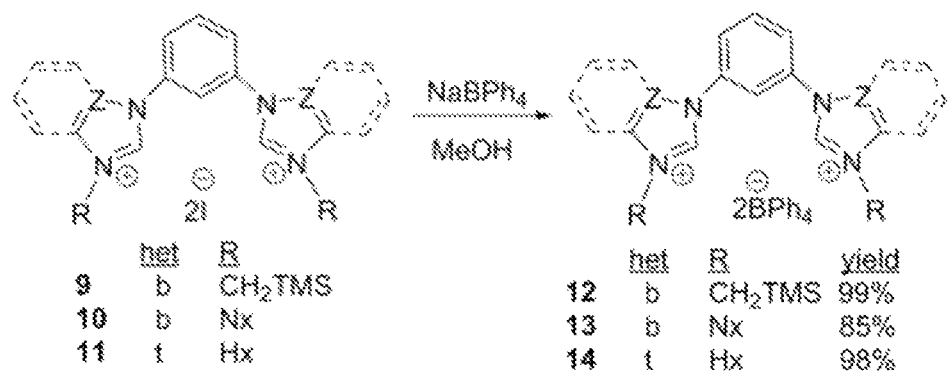

Ligands (1), (2), and (3), and salts (4), (5), (6), and (9) were synthesized following the literature procedures. Chloride salts 7 and 8, and iodide salts 10 and 11 were synthesized using similar alkylation method (FIGS. 10A-B). Tetraphenylborate salts (12, 13, 14) were synthesized by reacting the corresponding iodide salt with sodium tetraphenylborate in a methanol solution with pretty high yields (85-99%). All of the new salts were fully characterized by $^1$H and $^{13}$C NMR and ESI-MS spectroscopy (data not shown).

Figure 11:
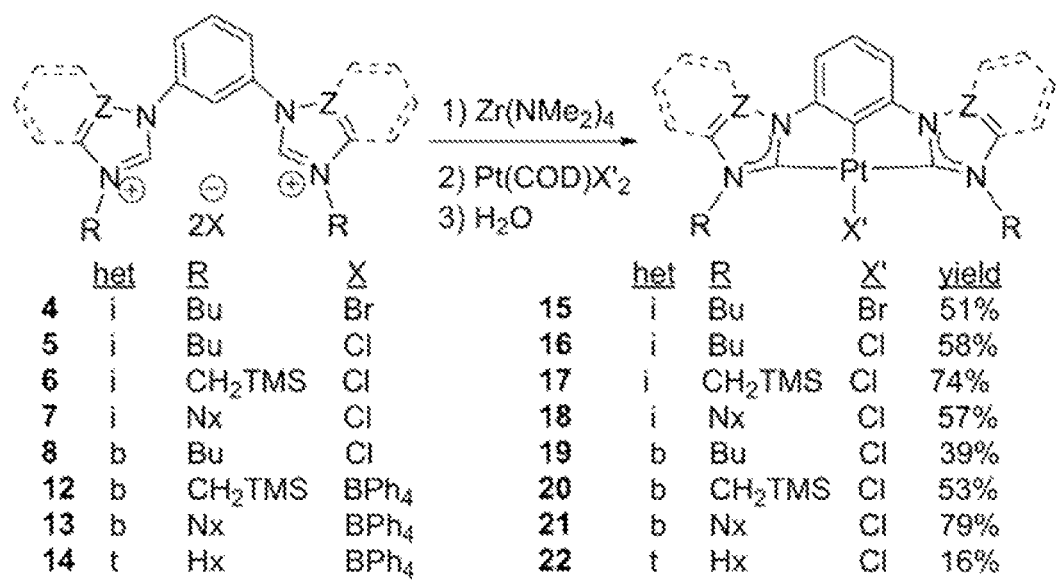
FIG. 11 shows a schematic illustrating in situ metalation and transmetalation (Z=CH, C or N).

Complexes 15-16, and 17 were synthesized using the literature procedure. Different Pt(II) chloride complexes (18-22) were synthesized following the similar method using 7, 8, and 12-14 as precursors, $Zr(NMe_2)_4$ as metalation source, and $Pt(COD)Cl_2$ as transmetalation source (FIG. 11). All of these Pt(II) chloride complexes were fully characterized by $^1$H, $^{13}$C, and $^{195}$Pt NMR and ESI-MS spectroscopy (data not shown).

Figure 12:
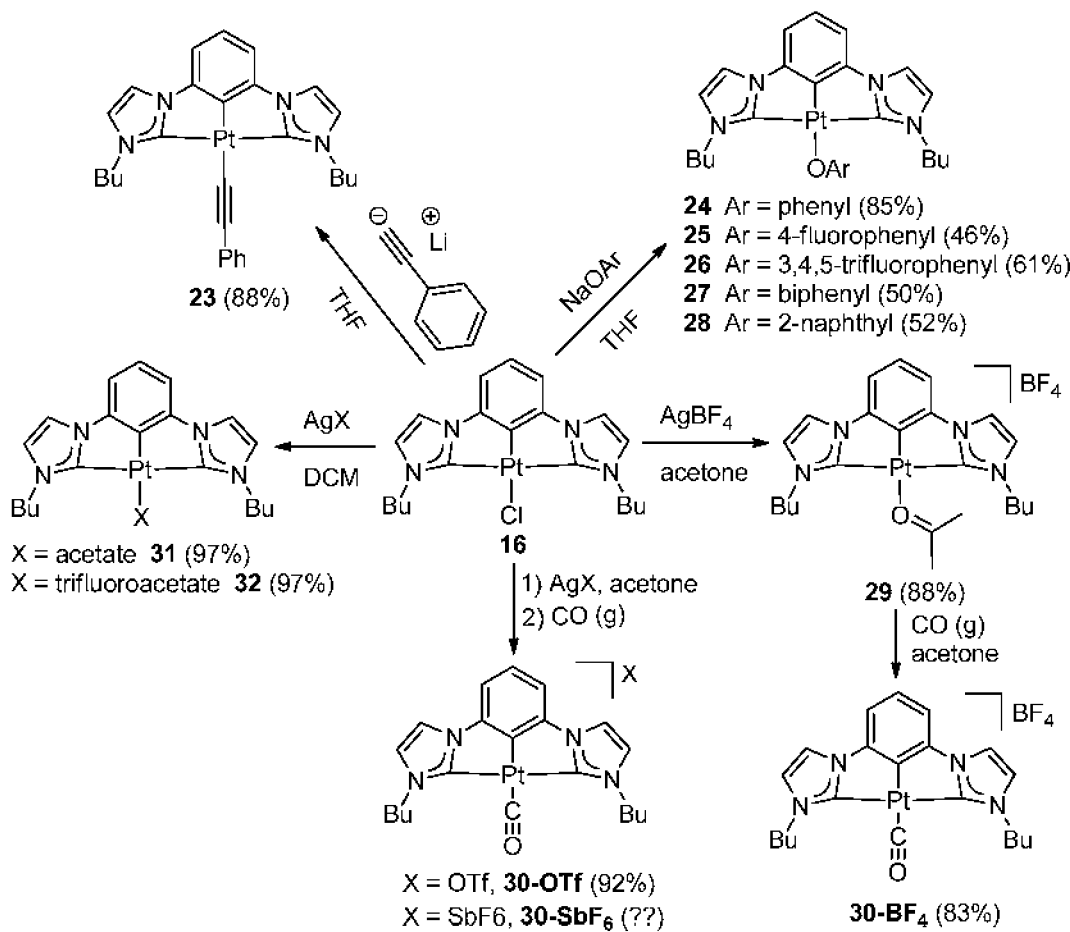
FIG. 12 shows a schematic view illustrating derivation of 16 to form other Pt complexes.

Complex 16 can be used as a starting material to synthesize other derivatives (23-33) (FIG. 12). Chloro Pt(II) complex 16 reacts with lithium phenylacetylide to form complex 23. The yield of 23 (88%) is higher than the reported yield. It also can react with different NaOAr to form different Pt—OAr complexes (24-28) in THF with a yield higher than 50%. Pt-acetone adduct (29) was synthesized by reaction of 16 with silver tetrafluoroborate in acetone, and then flowing CO gas through the reaction to yield the carbonyl complex 30-BF4. Pt carbonyl complexes with different counter-ions 30-OTf and 30-SbF6 were synthesized through a Pt-acetone adduct using silver triflate or silver hexafluoroantimonate instead of silver tetrafluoroborate. Complex 16 can be reacted with silver acetate or silver trifluoroacetate to form Pt-acetate (31) or Pt-trifluoroacetate complex (32). All of these Pt(II) complexes were fully characterized by $^1$H, $^{13}$C, and $^{195}$Pt NMR and ESI-MS spectroscopy (data not shown).

Figure 13A:
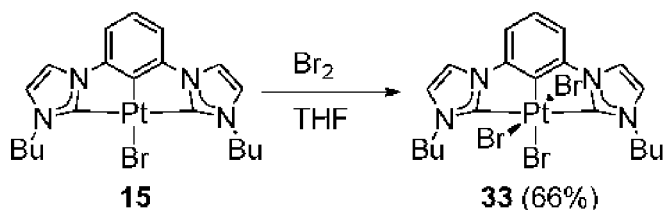
FIGS. 13A-B show a schematic view illustrating synthesis of CCC—NHC Pt(IV) complexes. (A) Shows a schematic view illustrating synthesis of Pt complex 33 from Pt complex 15. (B) Shows a schematic view illustrating synthesis of Pt complexes 34 and 35 from Pt complex 16.
Figure 13B:
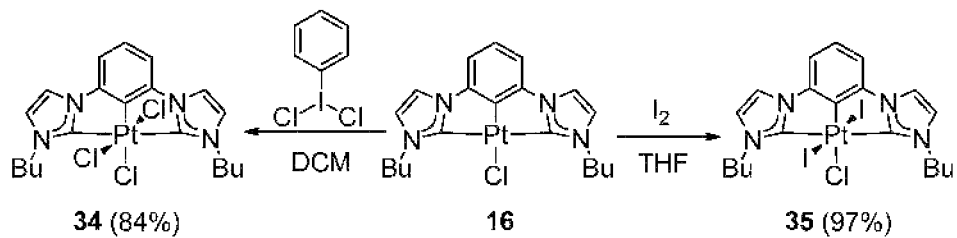

The meridional tridentate ligand based CCC—NHC Pt(IV) complexes were synthesized for the first time. The tribromide Pt(IV) complex 33 was synthesized by the addition of bromine to complex 15 (FIG. 13A). Trichloride Pt(IV) complex 34 was synthesized by reacting 16 with iodobenzene dichloride (FIG. 13B left). Pt(IV) complex 35 was synthesized by the addition of iodine to 16 in THF solution (FIG. 13B right). All of the Pt(IV) complexes were fully characterized by $^1$H, $^{13}$C, and $^{195}$Pt NMR and ESI-MS spectroscopy (data not shown).

Absorption and emission in DCM solution. The absorption and emission spectra were obtained in DCM solution. The absorption peaks and emission peaks of selected Pt complexes are showed in TABLE 3.

TABLE 3

Absorption and emission data of Pt complexes in DCM solution

| Complex | $\lambda_{abs}$, nm ($\varepsilon$, $10^3 M^{-1} cm^{-1}$) | $\lambda_{em}$, nm (rel intens, %)[a] |
|---|---|---|
| 15 | 266 (21.6), 324 (3.84), 358 (5.84) | 447 (100), 473 (76) |
| 16 | 266 (17.5), 322 (3.18), 356 (4.59) | 446 (100), 474 (81) |
| 17 | 272 (24.8), 324 (4.65), 356 (7.01) | 444 (100), 471 (86) |
| 18 | 266 (25.4), 324 (4.66), 356 (6.79) | 446 (100), 473 (84) |
| 19 | 276 (31.2), 290 (33.3), 298 (34.9), 376 (12.8) | 476 (100), 507 (77) |
| 20 | 278 (22.4), 290 (21.1), 304 (24.3), 374 (10.2) | 473 (100), 505 (80) |
| 21 | 276 (20.4), 290 (19.6), 298 (20.2), 374 (7.47) | 477 (100), 507 (79) |
| 22 | 276 (7.30), 306 (4.21), 326 (3.03), 358 (2.51), 382 (0.054) | 458 (100), 485 (75) |
| 23 | 272 (34.6), 326 (5.17), 376 (8.49) | 468 (100), 497 (52) |
| 24 | 302 (8.33), 324 (5.50), 354 (5.73) | 446 (100), 471 (85) |
| 25 | 304 (7.18), 324 (7.18), 354 (5.14) | 446 (100), 471 (82) |
| 26 | 296 (6.43), 322 (4.02), 358 (3.90) | 445 (100), 467 (84) |
| 27 | | |
| 28 | 300 (5.61), 324 (3.76), 356 (4.06) | 445 (100), 471 (83) |
| 31 | 264 (23.5), 322 (2.84), 352 (3.63) | 445 (100), 472 (82) |
| 32 | 264 (26.5), 322 (3.37), 354 (4.38) | 444 (100), 471 (85) |

[a]Excitation wavelength at 360 nm.

Emission, Photoluminescence Decay, and Photostability in Solid State.

Emission spectra, lifetime, and quantum yield of selected Pt complexes were obtained in solid state, and the data are showed in TABLE 4.

TABLE 4

Emission, lifetime, and quantum yield data of selected Pt complexes in solid state

| Complex | $\lambda_{em}$, nm (rel intens, %) | Lifetime (μs) | QY (%) |
|---|---|---|---|
| 17 | 478 (100), 509 (49) | 2.24 | 75 |
| 18 | 458 (52), 478 (100), 509(47) | 1.01 | 34 |
| 19 | 482 (51), 508 (100), 543 (42) | 0.795 | 30 |
| 21 | 639 (100) | 1.41 | 94 |
| 31 | 474 (100), 505 (76), 544 (56) 579 (55) | 0.885 | 78 |
| 32 | 470 (100), 501 (64), 542 (49), 581 (53) | 0.734 | 20 |

Electrochemistry.

Cyclic voltammetry (CV) of selected Pt complexes were obtained in dry DCM under a $N_2$ atmosphere in a three electrode system set up; a glassy carbon (GC) or a platinum (Pt) electrode was used as the working electrode, a graphite counter electrode, a silver wire as the reference electrode, and 0.1 M tetrabutylammonium hexafluorophosphate ($TBAPF_6$) as the supporting electrolyte. The CV of these selected Pt complexes showed irreversible oxidation peak (TABLE 5).

TABLE 5

Oxidation peaks of selected Pt complexes (scan rate: 0.1 V/s, Pt electrode, DCM, $TBAF(PF_6)$)

| Complex | $E_{pc}$ (vs. Ag/AgCl) |
|---|---|
| 15 | 1.425 V |
| 17 | 1.253 V |
| 18 | 1.293 V |
| 19 | 1.384 V |
| 20 | 1.828 V, 1.177 V |
| 21 | 1.285 V |
| 31 | 1.107 V |
| 32 | 0.784 V |

Discussion

Chart 2 Symmetric bis-NHC Pt complexes

15

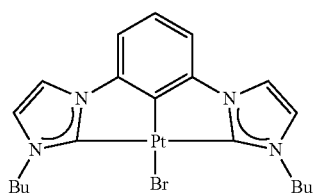

16

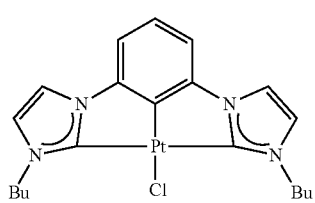

17

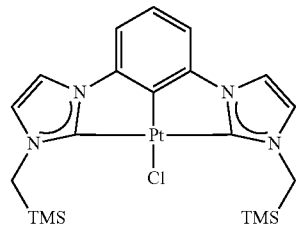

18

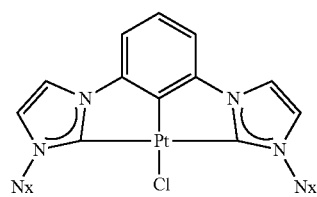

19

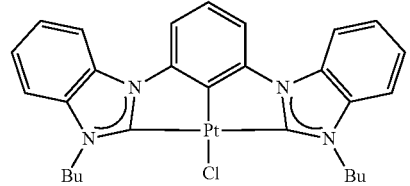

20

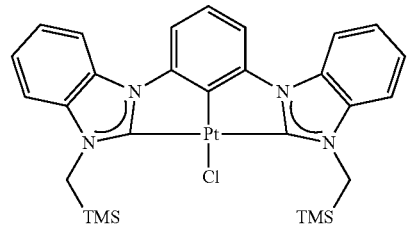

21

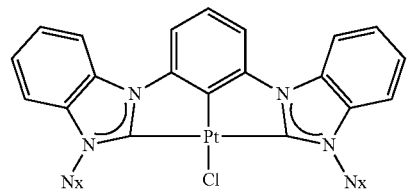

22

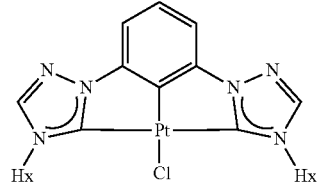

23

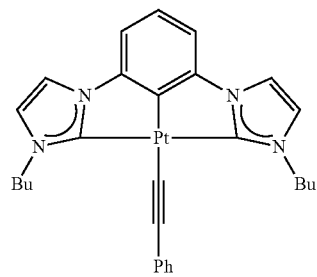

31
-continued
24
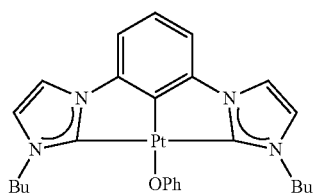
25
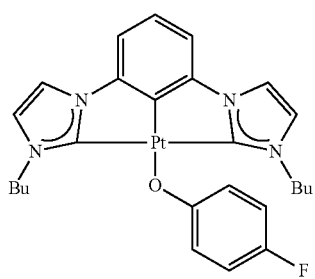
26
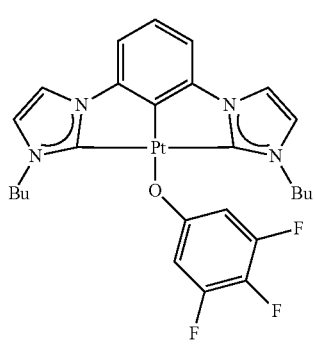
27
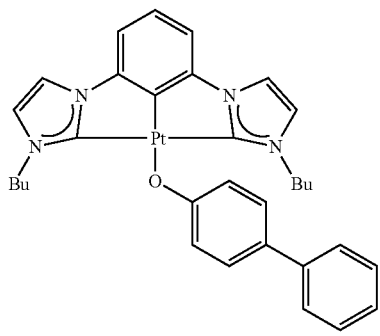
28
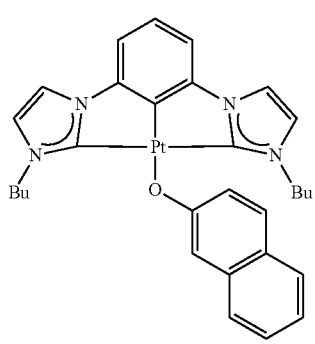
32
-continued
29
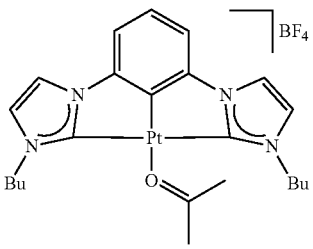
30-BF$_4$
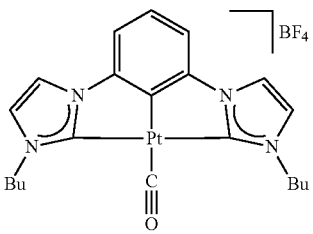
30-OTf
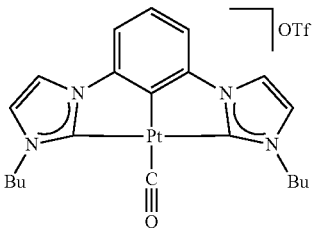
30-SbF$_6$
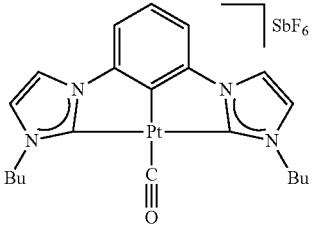
31
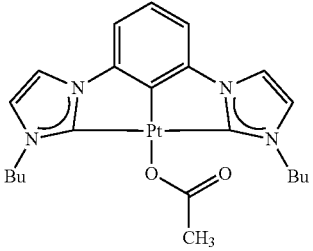
32
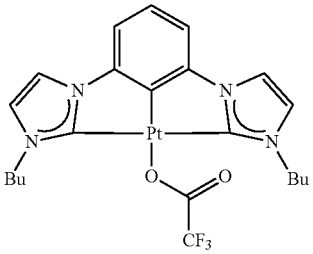

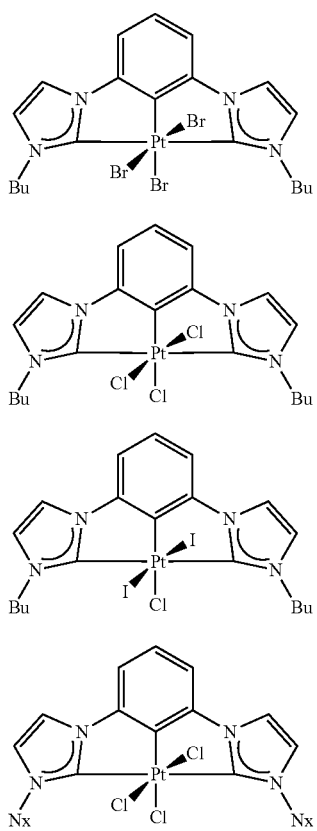

Synthesis.

The alkylation reactions to synthesize salt 7 and 8 were taking 3 to 4 weeks as monitored by low resolution MS. The alkylations between ligand 2 and (chloromethyl)trimethylsilane, ligand 2 and 1-chloro-3,3-dimethylbutane, ligand 3 and hexyl chloride were difficult because ligands 2 and 3 are more electron-deficient nucleophiles, and chloride is a poor leaving group in these SN$_2$ reactions. Accordingly, iodide salts (9, 10, 11) were synthesized, and then counter-ion exchange to tetraphenylborate salts (12, 13, 14) was conducted with pretty high yields (85-99%) by reacting iodide salt with sodium tetraphenylborate in a methanol solution.

Complex 18 and 19 were synthesized using chloride salts as precursors with reasonable yields. Iodide salts (9, 10, 11) were not used directly to synthesize the target Pt chloride complexes (20, 21, 22) because a mixture of Pt iodide and Pt chloride complexes is formed. The method discovered to synthesize the target Pt chloride complexes without halogen exchange during metalation and transmatalation reactions includes using the tetraphenylborate salts (12, 13, 14) as precursors. The yield of complex 20 and 21 is 53% and 79%, respectively. The low yield of complex 22 is from possible metalation at multiple carbene sites to from multi-metallic species.

Characterization.

The $^1$H NMR chemical shift of benzimidazolium protons in the chloride salt 8 (10.90 ppm) is more downfield compared with the protons in iodide salts 9 (10.25 ppm) and 10 (10.41 ppm), and also more downfield compared with the protons in tetraphenylborate salts 12 (10.15 ppm) and 13 (10.40 ppm). The $^1$H NMR chemical shift of triazolium protons in salt 11 (11.14 ppm) and 14 (11.37 ppm) are more downfield than the protons in imidazolium and benzimidazolium protons. The imidazolium, benzimidazolium and triazolium carbon signals of these salts are at the range of 136.6 ppm to 148.4 ppm.

After metalation and transmetalation reactions, the imidazolium, benzimidazolium and triazolium protons of complexes 15-22 disappeared. The NCH$_2$ proton signals of alkyl arms in Pt complexes were observed more down-field than that in salts. The NCH$_2$ proton signals in benzimidazolium based Pt complexes are more down-field than that in imidazolium based Pt complexes. And there is not much difference on NCH$_2$ proton signals between imidazolium based Pt complex (16) and triazolium based Pt complex (22). All the carbene carbon signals were observed at the range of 173 ppm to 182 ppm with $^1J_{Pt-C}$ around 1170 Hz, which are similar to the previous reports for Pt—NHC complexes. The imidazolium carbene carbon signals in complexes 16-18 (around 172 ppm) is 10 ppm more up-field than that of benzimidazolium carbons in complexes 19-21 (around 182 ppm), and also 3 ppm more up-field than that of triazolium carbons in complex 22 (175 ppm).

There is not much difference on the NCH$_2$ proton signals and carbene carbon signals between complexes 16 and 23. The NCH$_2$ proton signals in complexes 24-32 (around 4.20 ppm) are more up-field than that in 16 (4.69 ppm). The carbene carbon signals in complexes 24-28 and 31-32 (175 ppm to 178 ppm range) are slightly more down-field than that in 16 (172 ppm). The NCH$_2$ proton signals in Pt acetone adduct complex 29 (4.07 ppm) are much more up-field than any of the other Pt complexes. There are not much difference in NCH$_2$ proton signals, the carbene carbon signals and carbonyl stretching frequency in 30-BF4 and 30-OTf. However, the carbene carbon signals are significantly more up-field than any of Pt(II) complexes disclosed herein.

The primary observation of Pt(IV) complexes 34 and 35 in the $^1$H NMR spectra was the down-field shift of the NCH$_2$ peaks (34, 4.78 ppm; 35, 4.87 ppm) compared with the NCH$_2$ peak in Pt(II) complex 16 (4.69 ppm). However, there was only slight difference of NCH$_2$ signals between Pt(II) complex 15 (4.76 ppm) and Pt(IV) complexes 33 (4.80 ppm). The NHC carbon signals of 33, 34, and 35 (149.2 ppm, 150.6 ppm, and 149.2 ppm) were much more up-field shift compared with the Pt(II) complexes carbon signals (15, 170.5 ppm; 16, 171.7 ppm). And the coupling constants ($^1J_{Pt-C}$) decreased when the ligated metal center was oxidized from Pt(II) (15, 1166 Hz; 16, 1168 Hz) to Pt(IV) (33, 852 Hz; 34, 881 Hz; 35, 851 Hz).

X-Ray Structures.

X-ray-quality crystals of all Pt complexes were obtained and reported. The two iodides in 35 are both cis to chloride and phenyl ring, which was determined through a single-crystal X-ray diffraction study.

Photophysical Studies in DCM Solution.

Most imidazolium backbone based Pt(II) complexes have an absorption band in the range of 352 nm to 358 nm and a emission band in the range of 444 nm to 477 nm. However, complex 23, an imidazolium backbone based complex, has a red-shift absorption band at 376 nm and a red-shift emission band at 468 nm. The benzimidazolium backbone based Pt(II) complexes (19, 20, 21) also have a red-shift absorption band in the range of 374 nm to 376 nm and a red-shift emission band in the range of 473 nm to 477 nm because of the higher conjugated systems. The triazolium backbone based Pt(II) complex 22 has two absorption bands: one is at 358 nm in the same range with imidazolium backbone based Pt complexes; another one is at 382 nm, which is about 8 nm red-shift than the benzimidazolium backbone based Pt(II) complexes. The emission band of complex 22 is about 10 nm red-shift than the imidazolium backbone based Pt(II) complexes and about 20 nm blue-shift than the benzimidazolium backbone based Pt(II) complexes.

General Methodology.

All chemicals were purchased from Sigma Aldrich, Fisher Scientific, or Strem and were used as received. All solvents used in reactions were taken from dry solvent system or were dried by passing over activated basic alumina. All alkylation reactions were carried out under $N_2$ atmosphere. All reactions involving organometallic reagents were carried out in an argon-filled glovebox. The NMR spectra were recorded at 300 ($^1H$), 121 ($^{31}P$), and 282 MHz ($^{19}F$) using a Bruker AVANCE III 300 MHz spectrometer; at 500 ($^1H$), 125 ($^{13}C$), and 107 MHz ($^{195}Pt$) using a Bruker AVANCE III 500 MHz NMR spectrometer; and at 600 ($^1H$) and 150 MHz ($^{13}C$) using a Bruker AVANCE III 600 MHz spectrometer. The $^{195}Pt$ NMR shifts were referenced to sodium hexachloroplatinate(IV) as an external standard ($[PtCl_6]^{2-}$, 0 ppm). High-resolution mass spectra were collected by using ESI technique on a Bruker UHPLC-Micro-Q/T of MS/MS. UV-Visible absorption spectra were collected on a Thermo Scientific Evolution 300 UV-Vis spectrophotometer. Emission spectra were collected on a Horiba Jobin Yvon FluoroMax-4 spectrofluorometer. Elemental analysis was carried out by ALS Group USA, Corp. dba ALS Environmental.

Ligand 1, 2, and 3; salts 4, 5, 6, and 9; and Pt complexes 15-16 and 17 were synthesized following the reported procedures. Lithium phenylacetylide solution and iodobenzene dichloride were synthesized following the literature procedures. Dried acetone was prepared by distillation at 56° C. from a mixture of ACS reagent acetone and molecular sieves (4 Å, 1.6 mm pellets).

1,1'-(1,3-phenylene)bis(3-(3,3-dimethylbutyl)-1H-imidazol-3-ium) dichloride (7)

1,3-di(1H-imidazol-1-yl)benzene (1) (500 mg, 2.38 mmol), 1-chloro-3,3-dimethylbutane (1.7 mL, 11.9 mmol), sodium iodide (10 mg, 0.07 mmol) and MeCN (15 mL) were combined in a storage flask. The mixture was degassed with $N_2$ gas for 3 min and heated at 190° C. in a closed system. After heating for 20 days, the mixture was transferred to a round-bottom flask. Solvent was removed under reduced pressure, yielding a brownish solid. The brownish solid was purified with silica gel chromatography (DCM/MeOH=9:1), yielding an off-white solid (330 mg, 31%). $^1H$ NMR (300 MHz, DMSO-d6): 10.73 (s, 2H), 8.79 (s, 3H), 8.20 (s, 2H), 8.09 (d, 2H, J=8.0 Hz), 7.94 (t, 1H, J=8.1 Hz), 4.34 (t, 4H, J=8.3 Hz), 1.92 (t, 4H, J=8.1 Hz), 1.00 (s, 18H). $^{13}C$ NMR (126 MHz, DMSO-d6): δ 136.6, 136.3, 132.4, 124.1, 122.1, 121.3, 115.3, 47.1, 43.2, 30.3, 29.5. HRMS (ESI) m/z 415.2426 ([M-Cl$^-$]$^+$ calcd for $C_{24}H_{36}ClN_4$: 415.2623).

1,1'-(1,3-phenylene)bis(3-butyl-1H-benzo[d]imidazol-3-ium) dichloride (8)

1,3-bis(1H-benzo[d]imidazol-1-yl)benzene (2) (1.00 g, 3.2 mmol), n-butyl chloride (6.7 mL, 64 mmol), and MeCN (11 mL) were combined in a storage flask. The mixture was degassed with $N_2$ gas for 3 min and heated at 120° C. in a closed system. After heating for 4 weeks, the mixture was transferred to a round-bottom flask. Solvent was removed under reduced pressure, yielding a brownish solid. The brownish solid was purified with silica gel chromatography (DCM/MeOH=50:3), yielding a white solid (0.908 g, 57%). $^1H$ NMR (300 MHz, DMSO-d6): 10.90 (s, 2H), 8.53 (s, 1H), 8.26 (m, 4H), 8.14 (d, 3H, J=8.2 Hz), 7.80 (quintet, 4H, J=7.4 Hz), 4.68 (t, 4H, J=7.1 Hz), 2.05 (quintet, 4H, J=7.3 Hz), 1.46 (sextet, 4H, J=7.7 Hz), 1.00 (t, 6H, J=7.2 Hz). $^{13}C$ NMR (126 MHz, DMSO-d6): δ 143.6, 134.9, 132.7, 131.8, 131.3, 128.0, 127.6, 127.3, 122.6, 114.7, 114.3, 47.4, 31.0, 19.6, 13.9. HRMS (ESI) m/z 459.2092 ([M-Cl$^-$]$^+$ calcd for $C_{28}H_{32}ClN_4$: 459.2310). Anal. Calcd for $C_{28}H_{32}N_4Cl_2$·2H$_2$O: C, 63.27; H, 6.83; N, 10.54. Found: C, 63.49; H, 6.96; N, 10.53.

1,1'-(1,3-phenylene)bis(3-(3,3-dimethylbutyl)-1H-benzo[d]imidazol-3-ium) diiodide (10)

1,3-bis(1H-benzo[d]imidazol-1-yl)benzene (2) (0.50 g, 1.6 mmol), 1-iodo-3,3-dimethylbutane (1.0 g, 4.8 mmol), and MeCN (3 mL) were combined in a storage flask. The mixture was degassed with $N_2$ gas for 3 min and heated at 120° C. in a closed system. After heating for 16 h, a mass spectrum of the reaction mixture was taken, and there was still mono-product left. Another 0.50 g (2.4 mmol) of 1-iodo-3,3-dimethylbutane was added to the reaction mixture, and the reaction was heated for another 3 days. The mixture was transferred to a round-bottom flask. Solvent was removed under reduced pressure, yielding a yellow solid. The yellow solid was purified by washing with MeCN, yielding a yellow solid (0.98 g, 83%). $^1H$ NMR (300 MHz, DMSO-d6): 10.41 (s, 2H), 8.43 (t, 1H, J=1.7 Hz), 8.22 (m, 5H), 8.07 (m, 2H), 7.81 (m, 4H), 4.64 (m, 4H), 2.0 (m, 4H), 1.09 (s, 18H). $^{13}C$ NMR (151 MHz, DMSO-d6): δ 146.0, 137.5, 135.5, 134.3, 134.0, 130.8, 130.3, 130.2, 125.2, 117.4, 116.9, 47.4, 44.9, 33.1, 32.2. HRMS (ESI) m/z 607.2200 ([M-I$^-$]$^+$ calcd for $C_{32}H_{40}IN_4$: 607.2292).

1,1'-(1,3-phenylene)bis(4-hexyl-1H-1,2,4-triazol-4-ium) diiodide (11)

The procedure was analogous to the preparation of 10. 1,3-Di(1H-1,2,4-triazol-1-yl)benzene (3) (1.0 g, 4.7 mmol), n-hexyl chloride (1.7 g, 14.1 mmol) in 3 mL of MeCN. $^1H$ NMR (300 MHz, DMSO-d6): 11.14 (s, 2H), 9.57 (s, 2H), 8.53 (s, 1H), 8.19 (d, 2H, J=8.0 Hz), 8.07 (t, 1H, J=8.0 Hz), 4.36 (t, 4H, J=7.1 Hz), 1.97 (quintet, 4H, J=7.0 Hz), 1.35 (br, 12H), 0.90 (t, 6H, J=6.9 Hz). $^{13}C$ NMR (151 MHz, DMSO-d6): δ 148.4, 145.7, 139.3, 135.3, 125.2, 116.1, 51.3, 33.7, 31.7, 28.3, 25.0, 17.0. HRMS (ESI) m/z 509.1835 ([M-I]$^+$ calcd for $C_{22}H_{34}IN_6$: 509.1884).

1,1'-(1,3-phenylene)bis(3-((trimethylsilyl)methyl)-1H-benzo[d]imidazol-3-ium) bis(tetra phenylborate) (12)

1,1'-(1,3-phenylene)bis(3-((trimethylsilyl)methyl)-1H-benzo[d]imidazol-3-ium) diiodide (9) (500 mg, 0.677 mmol) in MeOH (15 mL) was added into sodium tetraphenylborate (695 mg, 2.03 mmol) in MeOH (10 mL). A white precipitate was immediately formed after combining the two solutions. The white precipitate was collected over a filter frit, washed with MeOH (3×5 mL) and diethyl ether (3×5 mL), and dried under vacuum overnight yielding a white solid (722 mg, 95%). $^1H$ NMR (300 MHz, DMSO-d6): 10.15 (s, 2H), 8.38 (s, 1H), 8.22 (d, 2H, J=7.8 Hz), 8.13 (br, 3H), 8.05 (d, 2H, J=8.0 Hz), 7.78 (m, 4H), 7.20 (br, 16H), 6.94 (t, 16H, J=7.3 Hz), 6.80 (m, 8H), 4.34 (s, 4H), 0.20 (s, 18H). $^{13}C$ NMR (126 MHz, DMSO-d6): δ 163.9 ($^1J_{11B-C}$=49.5 Hz, $^1J_{10B-C}$=16.4 Hz), 141.9, 136.0, 134.9, 132.7, 132.4, 131.4, 128.0, 127.7, 127.4, 125.8 ($^2J_{11B-C}$=2.7 Hz), 122.8 122.0, 114.9, 114.0, 39.0, −2.2. HRMS (ESI) m/z 803.3881 ([M-BPh4−]+ calcd for C52H56BN4Si2: 803.4140). Anal. Calcd for C76H76N4B2Si2 0.5H2O: C, 80.62; H, 6.85; N, 4.95. Found: C, 80.46; H, 6.97; N, 4.95.

1,1'-(1,3-phenylene)bis(3-(3,3-dimethylbutyl)-1H-benzo[d]imidazol-3-ium) bis(tetraphenylborate) (13)

The procedure was analogous to the preparation of 12. 1,1'-(1,3-Phenylene)bis(3-(3,3-dimethylbutyl)-1H-benzo[d]imidazol-3-ium) diiodide (10) (100.0 mg, 0.136 mmol), sodium tetraphenylborate (139.8 mg, 0.408 mmol) and MeOH (4 mL) to yield a white solid (129.3 mg, 85%). $^1$H NMR (300 MHz, DMSO-d6): 10.40 (s, 1H), 10.38 (s, 1H), 8.41 (s, 1H), 8.23 (d, 2H, J=7.8 Hz), 8.18 (br, 3H), 8.04 (d, 2H, J=6.8 Hz), 7.80 (m, 4H), 7.18 (br, 16H), 6.93 (t, 16H, J=7.3 Hz), 6.79 (m, 8H), 4.63 (t, 4H, J=7.9 Hz), 1.99 (t, 4H, J=8.1 Hz), 1.09 (s, 18H). $^{13}$C NMR (151 MHz, DMSO-d6): δ 163.4 ($^1J_{11B-C}$=49.5 Hz), 142.9, 135.5, 134.2, 132.4, 131.1, 130.9, 127.7, 127.2, 127.1, 125.3 ($^2J_{11B-C}$=2.7 Hz), 122.1, 121.5, 114.2, 113.7, 44.2, 41.8, 30.0, 29.0. HRMS (ESI) m/z 701.4365 ([M-BPh4]+ calcd for C43H47BN5: 701.4505).

1,1'-(1,3-phenylene)bis(4-hexyl-1H-1,2,4-triazol-4-ium) bis(tetraphenylborate) (14)

The procedure was analogous to the preparation of 12. 1,1'-(1,3-Phenylene)bis(4-hexyl-1H-1,2,4-triazol-4-ium) diiodide (11) (50.0 mg, 0.079 mmol), sodium tetraphenylborate (80.7 mg, 0.24 mmol) and MeOH (3 mL) to yield a white solid (78.5 mg, 98%). $^1$H NMR (300 MHz, DMSO-d6): 11.37 (s, 2H), 9.58 (s, 2H), 8.65 (s, 1H), 8.21 (d, 2H, J=7.3 Hz), 8.05 (t, 1H, J=7.8 Hz), 7.19 (br, 16H), 6.93 (t, 16H, J=7.3 Hz), 6.79 (m, 8H), 4.36 (t, 4H, J=7.0 Hz), 1.97 (m, 4H), 1.35 (br, 12H), 0.90 (br, 6H). $^{13}$C NMR (126 MHz, DMSO-d6): δ 163.4 ($^1J_{11B-C}$=49.5 Hz), 145.3, 142.6, 136.2, 135.5, 132.1, 125.3 ($^2J_{11B-C}$=2.7 Hz), 121.9, 121.5, 112.8, 48.2, 30.6, 28.6, 25.2, 21.9, 13.9. HRMS (ESI) m/z 701.4365 ([M-BPh4-]+ calcd for C43H47BN5: 701.4505).

Additional characterization of published Pt complexes 15, 16, 17. $^{195}$Pt NMR (107 MHz, CDCl3): −4222 ppm (15), −4125 ppm (16), −4110 ppm (17).

2-(1,3-Bis(N-((3,3-dimethylbutyl)imidazol-2-ylidene)phenylene)chloroplatinum(II) (18)

In a glovebox, 1,1'-(1,3-phenylene)bis(3-(3,3-dimethylbutyl)-1H-imidazol-3-ium) dichloride (7) (30.0 mg, 0.067 mmol) was added to Zr(NMe2)4 (26.6 mg, 0.10 mmol) in 1 mL of DCM in an oven dried vial with a magnetic stir bar. The mixture was stirred for 3 hours at room temperature to afford a dark red homogenous solution. Pt(COD)Cl2 (25.0 mg, 0.067 mmol) was added to mixture, and the solution was stirred overnight. Water (2 drops) was added to the mixture after it was removed from the glovebox. The mixture was filtered through Celite. The volatiles were removed under reduced pressure. The resulting orange solid was washed with acetone (3×0.5 mL) and dried under reduced pressure to yield a yellow solid (17.1 mg, 42%). X-ray quality crystals were grown by slow diffusion of hexanes and a DCM solution of 18. $^1$H NMR (500 MHz, CDCl3): 7.37 (d, 2H, J=2.0 Hz), 7.13 (t, 1H J=7.8 Hz), 6.99 (d, 2H, J=1.7 Hz), 6.88 (q, 2H, J=8.0 Hz), 4.80 (m, 4H), 1.83 (m, 4H), 1.08 (s, 18H). $^{13}$C NMR (126 MHz, CDCl3): δ 173.0 (t, $^1J_{Pt-C(NHC)}$=1183.4 Hz), 144.8 (t, $J_{Pt-C}$=12.5 Hz), 134.7 (t, $^1J_{Pt-C}$=941.9 Hz), 123.1, 120.1 (t, $J_{Pt-C}$=14.5 Hz), 114.8 (t, $J_{Pt-C}$=21.1 Hz), 107.3 (t, $J_{Pt-C}$=15.8 Hz), 46.3, 45.3, 30.2, 29.6. $^{195}$Pt NMR (107 MHz, CDCl3): −4121 ppm. HRMS (ESI) m/z 572.2305 ([M-Cl−]+ calcd for C24H33N4Pt: 572.2349). Anal. Calcd for C24H33N4PtCl 0.04 CH2Cl2: C, 47.22; H, 5.45; N, 9.16. Found: C, 46.92; H, 5.63; N, 8.90.

2-(1,3-bis(3'-butylbenzimidazol-2'-ylidene)phenylene)chloroplatinum(II) (19)

In a nitrogen-filled glovebox, 1,1'-(1,3-phenylene)bis(3-butyl-1H-benzo[d]imidazol-3-ium) dichloride (8) (32.0 mg, 0.0646 mmol) was added to Zr(NMe2)4 (25.8 mg, 0.0969 mmol) in 2 mL of dry toluene in an oven dried vial with a magnetic stir bar. The mixture was stirred for 3 hours at 120° C. to afford a dark red homogenous solution. Then Pt(COD)Cl2 (24.2 mg, 0.0646 mmol) and 2 mL of DCM was added to mixture, and the solution was stirred overnight. Water (2 drops) was added to mixture after it was removed from the glovebox. The mixture was filtered through Celite. The volatiles were removed under reduced pressure. The resulting orange solid was washed with acetone (3×1 mL) and dried under reduced pressure to yield a yellow solid (10 mg, 38%). X-ray quality crystals were grown by vapor diffusion of hexanes and a DCM solution of 19. $^1$H NMR (600 MHz, CDCl3): 8.00 (d, 2H, J=8.1 Hz), 7.54 (d, 2H, J=8.1 Hz), 7.46 (t, 2H, J=7.7 Hz), 7.42 (d, 2H, J=7.9 Hz), 7.40 (t, 2H, J=7.7 Hz), 7.33 (t, 1H, J=8.1 Hz), 5.11 (t, 4H, J=7.4 Hz), 2.01 (quintet, 4H, J=7.6 Hz), 1.60 (sextet, 4H, J=7.6 Hz), 1.00 (t, 6H, J=7.6 Hz). $^{13}$C NMR (151 MHz, CDCl3): δ 181.7 (t, $^1J_{Pt-C(NHC)}$=1160.6 Hz), 145.7 (t, $J_{Pt-C}$=11.6 Hz), 135.0 (t, $J_{Pt-C}$=15.0 Hz), 134.6 (t, $^1J_{Pt-C}$=929.4 Hz), 131.5 (t, $J_{Pt-C}$=21.3 Hz), 124.7, 124.0, 123.5, 111.9, 111.5, 108.9 (t, $J_{Pt-C}$=17.0 Hz), 46.5, 32.8, 20.3, 14.1. $^{195}$Pt NMR (107 MHz, CDCl3): −4039 ppm. HRMS (ESI) m/z 616.2017 ([M-Cl−]+ calcd for C28H29N4Pt: 616.2037). Anal. Calcd for C28H29N4PtCl: C, 51.57; H, 4.48; N, 8.59. Found: C, 51.52; H, 4.60; N, 8.54.

2-(1,3-bis(3'-trimethsilylmethylbenzimidazol-2'-ylidene)phenylene)chloroplatinum(II) (20)

The procedure was analogous to the preparation of 18. 1,1'-(1,3-Phenylene)bis(3-((trimethylsilyl)methyl)-1H-benzo[d]imidazol-3-ium) bis(tetraphenylborate) (12) (500 mg, 0.446 mmol), Zr(NMe2)4 (202 mg, 0.756 mmol), 20 mL DCM, Pt(COD)Cl2 (167 mg, 0.446 mmol), and water (1 mL) to yield an orange-red solid. Then a light yellow solid (162 mg, 51%) was collected after purifying the orange-red solid with column chromatography on silica gel eluting with DCM. Characterization matched with the previous literature report. $^{195}$Pt NMR (107 MHz, CDCl3): −4024 ppm.

2-(1,3-bis(3'-3,3-dimethylbutylbenzimidazol-2'-ylidene)phenylene)chloroplatinum(II) (21)

The procedure was analogous to the preparation of 18. 1,1'-(1,3-Phenylene)bis(3-(3,3-dimethylbutyl)-1H-benzo[d]imidazol-3-ium) bis(tetraphenylborate) (13) (100 mg, 0.0894 mmol), Zr(NMe2)4 (40.4 mg, 0.152 mmol), 4 mL DCM, Pt(COD)Cl2 (33.5 mg, 0.0894 mmol), and 0.5 mL of water to yield an orange-red solid. Then a light yellow solid (35.8 mg, 57%) was collected after purifying the orange-red solid with column chromatography on silica gel eluting with DCM. X-ray quality crystals were grown by vapor diffusion of hexanes and a DCM solution of 21. $^1$H NMR (500 MHz, CDCl3): 8.06 (d, 2H, J=7.6 Hz), 7.50 (m, 8H), 7.34 (t, 2H, J=7.4 Hz), 5.18 (t, 4H, J=7.7 Hz), 1.96 (t, 4H, J=8.0 Hz), 1.19 (s, 18H). $^{13}$C NMR (151 MHz, CDCl3): δ 184.2 (t, $^1J_{Pt-C(NHC)}$=1168.0 Hz), 148.4, 137.7, 137.5 (t, $J_{Pt-C}$=15.5 Hz), 134.3 (t, $J_{Pt-C}$=20.8 Hz), 127.3, 126.5, 126.1, 114.3, 114.1, 111.4 (t, $J_{Pt-C}$=17.0 Hz), 46.2, 46.1, 33.0, 32.3. $^{195}$Pt NMR (107 MHz, CDCl$_3$): −4032 ppm. HRMS (ESI) m/z 672.2608 ([M-Cl$^-$]$^+$ calcd for C$_{32}$H$_{37}$N$_4$PtCl: 672.2663). Anal. Calcd for C$_{32}$H$_{37}$N$_4$PtCl: C, 54.27; H, 5.27; N, 7.91. Found: C, 53.95; H, 5.51; N, 7.78.

2-(1,3-bis(3'-hexyl-1,2,4-triazol-2'-ylidene)phenylene)chloroplatinum(II) (22)

The procedure was analogous to the preparation of 18. 1,1'-(1,3-Phenylene)bis(4-hexyl-1H-1,2,4-triazol-4-ium) bis(tetraphenylborate) (14) (100 mg, 0.0979 mmol), Zr(NMe$_2$)$_4$ (44.3 mg, 0.166 mmol), Pt(COD)Cl$_2$ (36.6 mg, 0.0979 mmol), 3 mL DCM, and 0.5 mL water to yield an orange-red solid. A light yellow solid (5.5 mg, 10%) was collected after purifying the orange-red solid with column chromatography on silica gel eluting with DCM. X-ray quality crystals were grown by vapor diffusion of hexanes and a DCM solution of 22. $^1$H NMR (300 MHz, CDCl$_3$): 8.06 (s, 2H), 7.27 (m, 3H), 4.68 (t, 4H, J=7.4 Hz), 1.99 (quintet, 4H, J=7.6 Hz), 1.36 (m, 12H), 0.90 (t, 6H, J=6.9 Hz). $^{13}$C NMR (126 MHz, CDCl$_3$): δ 175.2 (t, $^1J_{Pt-C(NHC)}$=1178.4 Hz), 143.6, 141.7 (t, $J_{Pt-C}$=15.8 Hz), 130.3 (t, $^1J_{Pt-C}$=884.0 Hz), 124.1, 109.7 (t, $J_{Pt-C}$=17.2 Hz), 47.9, 31.3 (4CH$_2$), 26.1, 22.5, 14.0. $^{195}$Pt NMR (107 MHz, CDCl$_3$): −4192 ppm. HRMS (ESI) m/z 574.2218 ([M-Cl$^-$]$^+$ calcd for C$_{22}$H$_{31}$N$_6$PtCl: 574.2254).

2-(1,3-bis(N-butyl-imidazol-2-ylidene)phenylene) phenylacetyleneylplatinum (II) (23)

This complex was adapted from the literature.[24] To a 2-(1,3-bis(N-butylimidazol-2-ylidene)phenylene)chloroplatinum(II) (16) (10 mg, 0.0181 mmol) in THF (2 mL), lithium phenylacetylide solution (40 μL, 0.0543 mmol, 0.12 g/mL) was added slowly under N$_2$ atmosphere at −78° C. After stirring for 15 min, the reaction was brought to room temperature and stirred for another 30 min. The excess lithium phenylacetylide was quenched using wet THF (3 mL). The reaction mixture was filtered through Celite, and solvent was removed under reduced pressure, yielding a yellow solid. The solid was redissolved in 0.5 mL THF, and the precipitate was crashed out by adding hexanes slowly. The precipitate was triturated with hexanes (2×3 mL) to yield a yellow solid (11.0 mg, 98%). X-ray quality crystals were grown by vapor diffusion of hexanes and a THF solution of 23. $^1$H NMR (500 MHz, acetone-d6): 7.86 (d, 2H, J=2.0 Hz), 7.38 (m, 2H), 7.33 (d, 2H, J=7.5 Hz), 7.21 (m, 4H), 7.13 (t, 1H, J=6.8 Hz), 7.08 (t, 1H, J=7.3 Hz), 4.87 (t, 4H, J=7.4 Hz), 1.95 (quintet, 4H, J=7.5 Hz), 1.44 (sextet, 4H, J=7.8 Hz), 0.92 (t, 6H, J=7.3 Hz). $^{13}$C NMR (126 MHz, acetone-d6): δ 172.7 (t, $^1J_{Pt-C(NHC)}$=1136.9 Hz), 150.3 (t, $^1J_{Pt-C}$=604.4 Hz), 147.5 (t, $J_{Pt-C}$=11.9 Hz), 130.5, 127.7 (t, $J_{Pt-C}$=597.5 Hz), 123.9, 123.4, 120.2, 116.1, 115.9, 107.3, 50.9, 34.7, 20.4, 14.2. $^{195}$Pt NMR (107 MHz, acetone-d$_6$): −4422 ppm. $^{195}$Pt NMR (107 MHz, CDCl$_3$): −4415 ppm. HRMS (ESI) m/z 516.1684 ([M-C$_8$H$_6^-$]$^+$ calcd for C$_{20}$H$_{25}$N$_4$Pt: 516.1723).

2-(1,3-bis(N-butyl-imidazol-2-ylidene)phenylene) (phenoxyl)platinum(II) (24)

2-(1,3-Bis(N-butylimidazol-2-ylidene)phenylene)chloroplatinum(II) (16) (30.0 mg, 0.0543 mmol), sodium phenoxide (9.4 mg, 0.0814 mmol), and THF (1 mL) were combined in a screw-capped vial in a glovebox. Reaction was sonicated for 3 hours. The reaction mixture was then filtered through Celite. The solvent was removed, and the residue was dissolved in THF (0.5 mL) and layered with hexanes (2 mL). Yellow crystals (28.3 mg, 85%) were formed after sitting in the glovebox overnight and collected by pipetting off solvent. X-ray quality crystals were grown by vapor diffusion of hexanes and a THF solution of 24. $^1$H NMR (300 MHz, acetone-d$_6$): 7.82 (d, 2H, J=2.1 Hz), 7.34 (d, 2H, J=2.1 Hz), 7.10 (t, 3H, J=6.0 Hz), 6.87 (t, 2H, J=7.4 Hz), 6.79 (d, 2H, J=6.7 Hz), 6.04 (t, 2H, J=6.9 Hz), 4.20 (t, 4H, J=7.9 Hz), 1.62 (quintet, 4H, J=7.5 Hz), 1.07 (sextet, 4H, J=7.8 Hz), 0.72 (t, 9H, J=7.1 Hz). $^{13}$C NMR (151 MHz, acetone-d$_6$): δ 176.1 (t, $^1J_{Pt-C(NHC)}$=1188.9 Hz), 172.6, 146.6 (t, $J_{Pt-C}$=12.5 Hz), 134.9 (t, $^1J_{Pt-C}$=880.0 Hz), 129.0, 123.6, 121.2 (t, $J_{Pt-C}$=15.4 Hz), 122.2 (t, $J_{Pt-C}$=15.5 Hz), 116.8 (t, $J_{Pt-C}$=15.5 Hz), 112.4, 108.4 (t, $J_{Pt-C}$=15.5 Hz), 49.3, 34.6, 20.3, 14.1. $^{195}$Pt NMR (107 MHz, acetone-d$_6$): −3988 ppm (br). $^{195}$Pt NMR (107 MHz, CDCl$_3$): −3978 ppm. HRMS (ESI) m/z 516.1667 ([M-OC$_6$H$_5^-$]$^+$ calcd for C$_{20}$H$_{25}$N$_4$Pt: 516.1723).

2-(1,3-bis(N-butyl-imidazol-2-ylidene)phenylene)(4-fluorophenolate)platinum(II) (25)

The procedure was analogous to the preparation of 24. 2-(1,3-Bis(N-butylimidazol-2-ylidene)phenylene)chloroplatinum(II) (16) (20.0 mg, 0.0362 mmol), sodium 4-fluorophenolate (7.2 mg, 0.0542 mmol), and THF (2 mL) to yield yellow crystals (10.4 mg, 46%). X-ray quality crystals were grown by vapor diffusion of hexanes and a THF solution of 25. $^1$H NMR (500 MHz, acetone-d$_6$): 7.87 (br, 2H), 7.40 (br, 2H), 7.18 (br, 3H), 6.74 (br, 2H), 6.68 (m, 2H), 4.25 (t, 4H, J=7.5 Hz), 1.68 (quintet, 4H, J=7.5 Hz), 1.14 (sextet, 4H, J=7.5 Hz), 0.79 (t, 6H, J=7.4 Hz). $^{13}$C NMR (151 MHz, acetone-d$_6$): δ 176.0 (t, $^1J_{Pt-C(NHC)}$=1192 Hz), 168.9, 155.3 (d, $^1J_{F-C}$=225 Hz), 146.6 (t, $J_{Pt-C}$=11.9 Hz), 134.6 (t, $^1J_{Pt-C}$=870 Hz), 123.7, 121.3 (t, $J_{Pt-C}$=14.2 Hz), 119.4 (td, $J_{Pt-C}$=15.2 Hz, $J_{F-C}$=7.7 Hz), 116.9 (t, $J_{Pt-C}$=20.8 Hz), 114.8 (d, $^2J_{F-C}$=22.0 Hz), 108.4 (t, $J_{Pt-C}$=14.4 Hz), 49.3, 34.6, 20.3, 14.0. $^{195}$Pt NMR (107 MHz, acetone-d$_6$): −3999 ppm. $^{195}$Pt NMR (107 MHz, CDCl$_3$): −3988 ppm. HRMS (ESI) m/z 516.1693 ([M-OC$_6$H$_4$F]$^+$ calcd for C$_{20}$H$_{25}$N$_4$Pt: 516.1723).

2-(1,3-bis(N-butyl-imidazol-2-ylidene)phenylene)(3,4,5-trifluorophenolate)platinum(II) (26)

The procedure was analogous to the preparation of 24. 2-(1,3-Bis(N-butylimidazol-2-ylidene)phenylene)chloroplatinum(II) (16) (10.0 mg, 0.0181 mmol), sodium 3,4,5-trifluorophenolate (4.6 mg, 0.0271 mmol), and THF (1 mL) to yield yellow crystals (7.3 mg, 61%). X-ray quality crystals were grown by vapor diffusion of hexanes and a THF solution of 26. $^1$H NMR (500 MHz, acetone-d$_6$): 7.90 (br, 2H), 7.44 (br, 2H), 7.16 (br, 3H), 6.45 (dd, 2H, $^3J_{F-H}$=12.0 Hz, $^4J_{F-H}$=5.2 Hz), 4.23 (t, 4H, J=7.5 Hz), 1.72 (quintet, 4H, J=7.5 Hz), 1.20 (sextet, 4H, J=7.5 Hz), 0.83 (t, 6H, J=7.4 Hz). $^{13}$C NMR (151 MHz, acetone-d$_6$): δ 175.7 (t, $^1J_{Pt-C(NHC)}$=1192 Hz), 168.7 (t, $J_{F-C}$=12.8 Hz), 152.0 (dt, $^1J_{F-C}$=241.4 Hz, $^2J_{F-C}$=10.0 Hz), 146.5 (t, $J_{Pt-C}$=11.2 Hz), 133.1 (t, $J_{Pt-C}$=893.0 Hz), 130.2 (dt, $^1J_{F-C}$=229.2 Hz, $^2J_{F-C}$=16.6 Hz), 124.2, 121.5 (t, $J_{Pt-C}$=13.9 Hz), 117.1 (t, $J_{Pt-C}$=21.1 Hz), 108.6 (t, $J_{Pt-C}$=14.5 Hz), 102.3 (td, $^3J_{Pt-C}$=17.8 Hz, $^2J_{F-C}$=15.6 Hz), 49.4, 34.6, 20.4, 13.9. $^{195}$Pt NMR (107 MHz, acetone-d$_6$): −4040 ppm. $^{195}$Pt NMR (107 MHz, CDCl$_3$): −4026 ppm. HRMS (ESI) m/z 516.1665 ([M-OC$_6$H$_2$F$_3^-$]$^+$ calcd for C$_{20}$H$_{25}$N$_4$Pt: 516.1723).

2-(1,3-bis(N-butyl-imidazol-2-ylidene)phenylene) ([1,1'-biphenyl]-4-olate)platinum(II) (27)

The procedure was analogous to the preparation of 24. 2-(1,3-Bis(N-butylimidazol-2-ylidene)phenylene)chloroplatinum(II) (16) (10.0 mg, 0.0181 mmol), sodium [1,1'-biphenyl]-4-olate (5.2 mg, 0.0271 mmol), and THF (1 mL) to yield yellow crystals (6.4 mg, 50%). X-ray quality crystals were grown by vapor diffusion of hexanes and a THF solution of 27. $^1$H NMR (500 MHz, CDCl$_3$): 7.56 (s, 1H), 7.54 (s, 1H), 7.39 (d, 2H, J=1.9 Hz), 7.35 (m, 4H), 7.16 (m, 2H), 7.07 (s, 1H), 7.05 (s, 1H), 6.96 (d, 2H, J=2.0 Hz), 6.91 (s, 1H), 6.90 (s, 1H), 4.24 (t, 4H, J=7.8 Hz), 1.66 (quintet, 4H, J=7.7 Hz), 1.12 (sextet, 4H, J=7.7 Hz), 0.74 (t, 6H, J=7.4 Hz). $^{13}$C NMR (151 MHz, acetone-d$_6$): δ 177.4 ($^1$J(Pt—C$_{NHC}$)=1192 Hz), 170.4, 154.6, 153.0, 148.3, 134.9, 132.7, 131.2, 126.0, 123.2, 118.8, 110.4, 104.1, 51.2, 36.4, 22.1, 15.7. $^{195}$Pt NMR (107 MHz, CDCl$_3$): −3987 ppm. HRMS (ESI) m/z 516.1665 ([M-OC$_6$H$_2$F$_3^-$]$^+$ calcd for C$_{20}$H$_{25}$N$_4$Pt: 516.1723).

2-(1,3-bis(N-butyl-imidazol-2-ylidene)phenylene) (naphthalen-2-olate)platinum(II) (28)

The procedure was analogous to the preparation of 24. 2-(1,3-Bis(N-butylimidazol-2-ylidene)phenylene)chloroplatinum(II) (16) (10.0 mg, 0.0181 mmol), sodium naphthalen-2-olate (4.5 mg, 0.0271 mmol), and THF (1 mL) to yield yellow crystals (6.2 mg, 52%). X-ray quality crystals were grown by vapor diffusion of hexanes and a THF solution of 28. $^1$H NMR (500 MHz, CDCl$_3$): 7.62 (d, 1H, J=8.0 Hz), 7.54 (d, 1H, J=8.9 Hz), 7.43 (d, 1H, J=8.3 Hz), 7.39 (d, 2H, J=1.8 Hz), 7.31 (dd, 1H, $^3$J=8.8 Hz, $^4$J=2.4 Hz), 7.26 (d, 1H, J=2.3 Hz), 7.17 (m, 2H), 7.00 (t, 1H, J=7.0 Hz), 6.94 (d, 2H, J=2.0 Hz), 6.92 (d, 2H, J=7.8 Hz), 4.20 (t, 4H, J=7.3 Hz), 1.60 (quintet, 4H, J=7.8 Hz), 0.99 (sextet, 4H, J=7.7 Hz), 0.56 (t, 6H, J=7.4 Hz). $^{13}$C NMR (126 MHz, acetone-d$_6$): δ 176.1 (t, $^1$J$_{Pt—C(NHC)}$=1192 Hz), 170.8, 146.6, 137.7, 134.7 (t, $^1$J$_{Pt—C}$=870 Hz), 128.4, 128.2, 126.6, 126.2, 125.5, 125.3, 123.8, 121.3 (t, J$_{Pt—C}$=14.5 Hz), 119.3, 116.9 (t, J$_{Pt—C}$=20.0 Hz), 110.9 (t, J$_{Pt—C}$=16.2 Hz), 108.5 (t, J$_{Pt—C}$=14.4 Hz), 49.4, 34.7, 20.2, 13.8. $^{195}$Pt NMR (107 MHz, acetone-d$_6$): −4002 ppm. $^{195}$Pt NMR (107 MHz, CDCl$_3$): −3991 ppm. HRMS (ESI) m/z 516.1667 ([M-OC$_{10}$H$_7^-$]$^+$ calcd for C$_{20}$H$_{25}$N$_4$Pt: 516.1723).

2-(1,3-bis(N-butyl-imidazol-2-ylidene)phenylene) (acetone)platinum(II) tertrafluoroborate (29)

To a mixture of 2-(1,3-Bis(N-butylimidazol-2-ylidene)phenylene)chloroplatinum(II) (16) (20 mg, 0.036 mmol) and AgBF$_4$ (7.0 mg, 0.036 mmol) was added dried acetone (1.0 mL) in a screw reaction vial in a glovebox. The reaction mixture was sonicated for 15 min and then filtered through Celite, concentrated, redissolved in pre-dried acetone (about 1 mL), and filtered through Celite again in a glovebox. The solvent was removed under reduced pressure, yielding a yellow solid (21 mg, 88%). $^1$H NMR (600 MHz, acetone-d$_6$): δ 8.00 (d, 2H, J=2.1 Hz), 7.58 (d, 2H, J=2.1 Hz, imi), 7.23 (m, 3H), 4.02 (t, 4H, J=6.6 Hz), 1.86 (quintet, 4H, J=7.5 Hz), 1.41 (sextet, 4H, J=7.8 Hz), 0.98 (t, 6H, J=7.4 Hz). $^{13}$C NMR (151 MHz, acetone-d$_6$): δ174.5 (t, $^1$J$_{Pt—C(NHC)}$=1207 Hz), 145.7 (t, J$_{Pt—C}$=12.3 Hz), 126.4, 125.2 (t, $^1$J$_{Pt—C}$=1027 Hz), 122.5 (t, J$_{Pt—C}$=13.7 Hz), 117.6 (t, J$_{Pt—C}$=20.9 Hz), 109.5 (t, J$_{Pt—C}$=16.7 Hz), 50.0, 33.9, 30.6, 20.3, 13.9. $^{195}$Pt NMR (107 MHz, acetone-d$_6$): −4152 ppm (br). $^{195}$Pt NMR (107 MHz, CDCl$_3$): −4136 ppm. HRMS (ESI) m/z 516.1755 ([M-acetone]$^+$ calcd for C$_{20}$H$_{25}$N$_4$Pt: 516.1723).

2-(1,3-bis(N-butyl-imidazol-2-ylidene)phenylene) (carbonyl)platinum(II) tetrafluoroborate (30-BF$_4$)

To an acetone (1 mL) solution of 29 (35.4 mg, 0.053 mmol) was added a steady flow of CO gas for 5 min. A yellow precipitate formed after standing for 15 min. The solvent was removed under reduced pressure, the resulting solid was washed with Et$_2$O (2×1 mL), and was dried under vacuum yielding a yellow solid (32.1 mg, 83%). X-ray quality crystals were grown by vapor diffusion of hexanes and a DCM solution of 30-BF$_4$. $^1$H NMR (500 MHz, CD$_3$OD): δ 7.91 (d, 2H, J=1.9 Hz), 7.52 (d, 2H, J=1.9 Hz), 7.29 (m, 3H), 4.19 (t, 4H, J=7.5 Hz), 1.90 (quintet, 4H, J=7.1 Hz), 1.46 (sextet, 4H, J=7.5 Hz), 1.02 (t, 6H, J=7.5 Hz). $^{13}$C NMR (126 MHz, CD$_3$OD): δ 184.4 (Pt—CO), 167.4 (t, $^1$J$_{Pt—C(NHC)}$=1147.2 Hz), 148.3 (t, J$_{Pt—C}$=12.9 Hz), 142.8, 131.5, 123.7 (t, J$_{Pt—C}$=12.8 Hz), 118.7 (t, J$_{Pt—C}$=19.8 Hz), 110.9 (t, J$_{Pt—C}$=11.5 Hz), 53.0, 35.0, 20.8, 13.9. $^{195}$Pt NMR (107 MHz, CD$_3$OD): −4782.5 ppm. IR (KBr pellet): v$_{co}$ 2078. HRMS (ESI) m/z 516.1715 ([M-CO]$^+$ calcd for C$_{20}$H$_{25}$N$_4$Pt: 516.1723).

2-(1,3-bis(N-butyl-imidazol-2-ylidene)phenylene) (carbonyl)platinum(II) triflate (30-OTf)

The procedure was analogous to the preparation of 30-BF$_4$. Complex 16 (20 mg, 0.036 mmol), AgOTf (9.3 mg, 0.036 mmol), dried acetone (1 mL), and CO gas were used to yield a yellow solid (23 mg, 92%). X-ray quality crystals were grown by vapor diffusion of hexanes and a DCM solution of 30-OTf. $^1$H NMR (300 MHz, CD$_2$Cl$_2$): δ 7.60 (d, 2H, J=2.0 Hz), 7.34 (t, 1H, J=8.0 Hz), 7.26 (d, 2H, J=2.0 Hz), 7.16 (d, 2H, J$_{H—H}$=8.0 Hz, J$_{Pt—H}$=13.0 Hz), 4.17 (t, 4H, J=7.5 Hz), 1.91 (quintet, 4H, J=7.1 Hz), 1.46 (sextet, 4H, J=7.5 Hz), 1.00 (t, 6H, J=7.5 Hz). $^{13}$C NMR (126 MHz, CD$_2$Cl$_2$): δ 184.8 (Pt—CO), 166.5 (Pt—C$_{NHC}$), 147.5, 142.1, 131.2, 122.8, 118.0, 110.4, 52.8, 34.3, 20.3, 13.9. IR (KBr pellet): v$_{co}$ 2079. HRMS (ESI) m/z 516.1664 ([M-CO]$^+$ calcd for C$_{20}$H$_{25}$N$_4$Pt: 516.1723). Anal. Calcd for C$_{22}$H$_{25}$F$_3$N$_4$O$_4$PtS.⅙(CH$_2$Cl$_2$): C, 37.62; H, 3.61; N, 7.92. Found: C, 37.44; H, 3.32; N, 7.90.

2-(1,3-bis(N-butyl-imidazol-2-ylidene)phenylene) (carbonyl)platinum(II) hexafluoroantimonate (30-SbF$_6$)

The procedure was analogous to the preparation of 30-BF$_4$ by using 16 (20 mg, 0.036 mmol), AgSbF$_6$ (9.3 mg, 0.036 mmol), dried acetone (1 mL), and CO gas. A yellow solid was yielded (23 mg, 92%). X-ray quality crystals were grown by vapor diffusion of hexanes from a THF solution of 30-SbF$_6$.

2-(1,3-bis(N-butyl-imidazol-2-ylidene)phenylene) (acetato)platinum(II) (31)

Complex 31 was synthesized according to the modified literature procedure using 2-(1,3-bis(N-butyl-imidazol-2-ylidene)phenylene)chloroplatinum(II) (16) (100 mg, 0.18 mmol), silver acetate (30 mg, 0.18 mmol), and CH$_2$Cl$_2$ (10 mL) were combined in a reaction vial. The mixture was stirred for 1 h in the absence of light, yielding AgCl as a white precipitate. The reaction mixture was filtered through Celite. The solvent was removed, and the residue was redissolved in $CH_2Cl_2$ (3 mL) and filtered through Celite again. The solvent was removed under reduced pressure to yield a yellow solid (101 mg, 97%). X-ray quality crystals were grown by vapor diffusion of diethyl ether and a MeOH solution of 31. $^1$H NMR (300 MHz, $CDCl_3$): 7.35 (d, 2H, J=2.0 Hz), 7.09 (t, 1H, J=7.8 Hz), 6.97 (d, 2H, J=2.0 Hz), 6.84 (q, 2H, J=8.0 Hz), 4.29 (t, 4H, J=7.3 Hz), 2.21 (s, 3H), 1.88 (quintet, 4H, J=7.5 Hz), 1.43 (sextet, 4H, J=7.7 Hz), 0.99 (t, 6H, J=6.9 Hz). $^{13}$C NMR (75 MHz, $CDCl_3$): δ 175.2 (Pt—$C_{NHC}$), 145.3, 123.1, 119.7, 115.1, 107.2, 49.3, 33.4, 25.0, 20.0, 13.8. $^{195}$Pt NMR (107 MHz, $CDCl_3$): −4027 ppm. HRMS (ESI) m/z 516.1559 ([M-$O_2CCH_3^-$]$^+$ calcd for $C_{20}H_{25}N_4Pt$: 516.1723).

2-(1,3-bis(N-butyl-imidazol-2-ylidene)phenylene) (trifluoroacetato)platinum(II) (32)

The procedure was analogous to the preparation of 31. 2-(1,3-Bis(N-butyl-imidazol-2-ylidene)phenylene)chloroplatinum(II) (16) (100 mg, 0.18 mmol), silver trifluoroacetate (40 mg, 0.18 mmol), and $CH_2Cl_2$ (10 mL) to yield a yellow solid (110 mg, 97%). X-ray quality crystals were grown by slow diffusion of hexanes and a MeOH solution of 32. $^1$H NMR (300 MHz, $CDCl_3$): 7.36 (d, 2H, J=2.0 Hz), 7.09 (t, 1H, J=8.1 Hz), 6.98 (d, 2H, J=2.0 Hz), 6.83 (q, 2H, J=7.8 Hz), 4.17 (t, 4H, J=7.4 Hz), 1.83 (quintet, 4H, J=7.5 Hz), 1.40 (sextet, 4H, J=8.1 Hz), 0.96 (t, 6H, J=7.5 Hz). $^{13}$C NMR (151 MHz, $CDCl_3$): δ 175.1 (t, $^1J_{Pt-C(NHC)}$=1204.5 Hz), 162.0 (q, $^2J_{F-C}$=36.3 Hz), 145.2 (t, $J_{Pt-C}$=12.3 Hz), 129.5 (t, $^1J_{Pt-C}$=969.2 Hz), 124.0, 120.1 (t, $J_{Pt-C}$=13.6 Hz), 117.1 (q, $^1J_{F-C}$=293.2 Hz), 115.4 (t, $J_{Pt-C}$=22.3 Hz), 107.6 (t, $J_{Pt-C}$=15.7 Hz), 49.4, 33.3, 19.7, 13.8. $^{19}$F NMR (282 MHz, $CDCl_3$): −79.54 ppm. $^{195}$Pt NMR (107 MHz, $CDCl_3$): −4081 ppm. HRMS (ESI) m/z 516.1667 ([M-$O_2CCF_3^-$]$^+$ calcd for $C_{20}H_{25}N_4Pt$: 516.1723).

2-(1,3-bis(N-butylimidazol-2-ylidene)phenylene) tribromoplatinum(IV) (33)

To a THF (2 mL) solution of 2-(1,3-Bis(N-butylimidazol-2-ylidene)phenylene)bromoplatinum(II) (15) (10 mg, 0.0168 mmol), a drop of $Br_2$ (about 10 mg, 0.063 mmol) was added. The reaction color changed from yellow to red. After stirring for 20 min, solvent was removed under reduced pressure. The resulting yellow-red solid was triturated with pentane (2×3 mL) to yield a yellow solid (8.5 mg, 66%) after decanting the washing and drying under vacuum. X-ray quality crystals were grown by vapor diffusion of hexanes and a THF solution of 33. $^1$H NMR (500 MHz, acetone-$d_6$): 8.20 (d, 2H, J=2.0 Hz), 7.70 (d, 2H, J=2.1 Hz), 7.57 (m, 2H), 7.37 (t, 1H, J=8.0 Hz), 4.80 (t, 4H, J=7.6 Hz), 2.06 (m, 4H), 1.51 (sextet, 4H, J=7.6 Hz), 1.00 (t, 6H, J=7.4 Hz). $^{13}$C NMR (126 MHz, acetone-$d_6$): δ 149.3 (t, $^1J_{Pt-C(NHC)}$=852.0 Hz), 142.6, 129.7 (t, $^1J_{Pt-C}$=638.2 Hz), 128.4, 124.2 (t, $J_{Pt-C}$=8.3 Hz), 118.3 (t, $J_{Pt-C}$=10.8 Hz), 111.7 (t, $J_{Pt-C}$=9.1 Hz), 50.0, 33.8, 19.4, 13.3. $^{195}$Pt NMR (107 MHz, acetone-$d_6$): −2920 ppm. $^{195}$Pt NMR (107 MHz, $CDCl_3$): −2976 ppm. HRMS (ESI) m/z 676.9994 ([M-$Br^-$]$^+$ calcd for $C_{20}H_{25}N_4PtBr_2$: 677.0069).

2-(1,3-bis(N-butylimidazol-2-ylidene)phenylene) trichloroplatinum(IV) (34)

To a DCM (2 mL) solution of 2-(1,3-bis(N-butylimidazol-2-ylidene)phenylene)chloroplatinum(II) (16) (25.0 mg, 0.0452 mmol), iodobenzene dichloride (12.4 mg, 0.0452 mmol) was added. After stirring for 30 min, yellow precipitate was formed. Solvent was removed under reduced pressure, and the solid was triturated with hexanes (2×3 mL) to yield a yellow solid (23.6 mg, 84%) after decanting the washing and drying under vacuum. X-ray quality crystals were grown by vapor diffusion of hexanes and a DCM solution of 34. $^1$H NMR (500 MHz, DMSO-$d6$): 8.40 (d, 2H, J=2.0 Hz), 7.81 (d, 2H, J=2.1 Hz), 7.62 (d, 2H, J=7.9 Hz), 7.44 (t, 1H, J=7.9 Hz), 4.78 (t, 4H, J=7.3 Hz), 1.88 (quintet, 4H, J=7.9 Hz), 1.39 (sextet, 4H, J=7.5 Hz), 0.93 (t, 6H, J=7.4 Hz). $^{13}$C NMR (126 MHz, DMSO-$d6$): δ 150.1 (t, $^1J_{Pt-C(NHC)}$=881.1 Hz), 141.2, 128.0, 127.4, 123.3, 118.0, 111.4, 48.6, 33.2, 19.1, 13.7. $^{195}$Pt NMR (107 MHz, DMSO-$d6$): −1971 ppm. HRMS (ESI) m/z 587.1067 ([M-$Cl^-$]$^+$ calcd for $C_{20}H_{25}N_4PtCl_2$: 587.1097).

2-(1,3-bis(N-butylimidazol-2-ylidene)phenylene) diiodochloroplatinum(IV) (35)

To a THF (2 mL) solution of 2-(1,3-bis(N-butylimidazol-2-ylidene)phenylene)chloroplatinum (II) (16) (30.0 mg, 0.0543 mmol), 12 (27.6 mg, 0.109 mmol) was added. The reaction color changed from yellow to dark red. After stirring for 1 h, solvent was removed under reduced pressure. The resulting orange-red solid was triturated with hexanes (2×3 mL) to yield an orange-red solid (42.3 mg, 97%) after decanting the washing and drying under vacuum. X-ray quality crystals were grown by vapor diffusion of hexanes and a THF solution of 35. $^1$H NMR (600 MHz, acetone-$d_6$): 8.20 (d, 2H, J=2.0 Hz), 7.70 (d, 2H, J=2.2 Hz), 7.57 (t, 1H, J=3.3 Hz), 7.56 (t, 1H, J=3.2 Hz), 7.37 (t, 1H, J=8.0 Hz), 4.87 (t, 4H, J=7.6 Hz), 2.11 (quintet, 4H, J=7.6 Hz), 1.54 (sextet, 4H, J=7.7 Hz), 1.01 (t, 6H, J=7.7 Hz). $^{13}$C NMR (151 MHz, acetone-$d_6$): δ 147.4 (t, $^1J_{Pt-C(NHC)}$=851.1 Hz), 143.3, 128.0, 124.1 (t, $J_{Pt-C}$=8.5 Hz), 122.6 (t, $^1J_{Pt-C}$=638.1 Hz), 118.6 ((t, $J_{Pt-C}$=11.0 Hz), 111.1 (t, $J_{Pt-C}$=11.0 Hz), 50.1, 33.9, 20.4, 14.2. $^{195}$Pt NMR (107 MHz, acetone-$d_6$): −4203 ppm. $^{195}$Pt NMR (107 MHz, $CDCl_3$): −4251 ppm. HRMS (ESI) m/z 769.9742 ([M-$Cl^-$]$^+$ calcd for $C_{20}H_{25}N_4PtI_2$: 769.9812).

X-ray Crystallography.

The single crystals of 19, 21, 23, 25, 26, 28, 31, 34, 35, and 36 were measured using a Bruker Venture X-ray diffractometer with Mo-Iµs X-ray tube (Kα=0.71073 Å) or Cu-Iµs X-ray tube (Kα=1.5418 Å). The single crystals of 18, 24, 30-$BF_4$, and 30-$SbF_6$ were measured using a Bruker APEX-II X-ray diffractometer with Mo X-ray tube (Kα=0.71073 Å). The single crystals of 30-OTf were measured using an Oxford Gemini X-ray diffractometer with Mo X-ray tube (Kα=0.71073 Å). All crystals were coated in paraffin oil, mounted on a MiTeGen MicroLoop, and placed under streaming $N_2$ (100 K) except 30-OTf (300 K). The space groups were determined by systematic absences and intensity statistics, and structures were solved by direct methods and refined by full-matrix least-squares on $F^2$. Anisotropic displacement parameters were employed for all non-hydrogen atoms; H atoms were placed at idealized positions and refined with fixed isotropic displacement parameters. The following programs were used: data collection, APEX3; data reduction, SAINT; absorption correction, SADABS; structure solutions and refinements, SHELXT/XS within OLEX. The final data presentation and structure plots were generated in X-Seed Version 2.0. Complex 30-OTf differed in data collection and reduction by using CrysAlis. Crystallographic data for the complexes are deposited in the Cambridge Crystallographic Data Centre;

their numbers are: CCDC 1533575 (18), CCDC 1533026 (19), CCDC 1534263 (21), CCDC 1533027 (23), CCDC 1533119 (24), CCDC 1533120 (25), CCDC 1533045 (26), CCDC 1533046 (28), CCDC 1535015 (30-BF4), CCDC 1016512 (30-OTf), CCDC 1533047 (30-SbF6), CCDC 1533048 (31), CCDC 1533023 (34), CCDC 1533024 (35), and CCDC 1533025 (36).

Electrochemical Characterization. The synthesized Pt complexes ($3.0 \times 10^{-3}$ M) were dissolved in dry dichloromethane (DCM) and characterized electrochemically under a nitrogen ($N_2$) atmosphere using cyclic voltammetry (CV) on a CHI760C electrochemical work station. In a three electrode system set up; a glassy carbon (GC) or a platinum (Pt) electrode was used as the working electrode, a graphite counter electrode, a silver wire as the reference electrode, and 0.1 M tetrabutylammonium hexafluorophosphate ($TBAPF_6$) as the supporting electrolyte.

Example 3

This Example describes CCC—NHC pincer complexes of $Pd^{II}$, some of which are suitable for photonic applications. Reports illustrate the importance of molecular inorganic and organometallic compounds to photonic applications in such areas as developments in artificial photosynthesis, photocatalytic splitting of water, solar cell applications, organic light-emitting diodes (OLEDs), and photoluminescence. Here, we report the synthesis, characterization, and photophysical properties of several CCC—NHC $Pd^{II}$ pincer complexes along with an experimental and computational analysis of their Raman spectra.

Results and Discussions
Synthesis and Characterization

Figure 14:
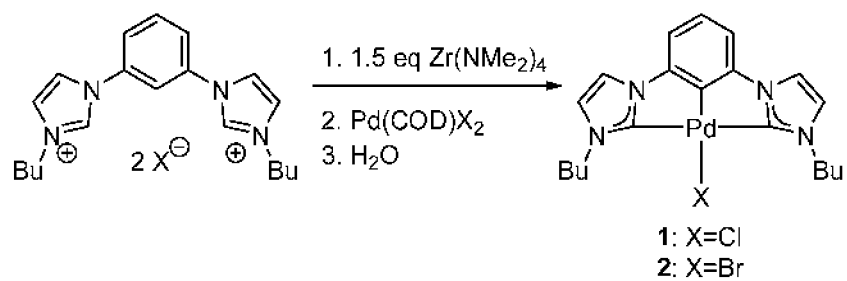
FIG. 14 shows a schematic view illustrating synthesis of $^{Bu}C^iC^iC^{Bu}$—Pd(II)—X complexes.
Figure 15:
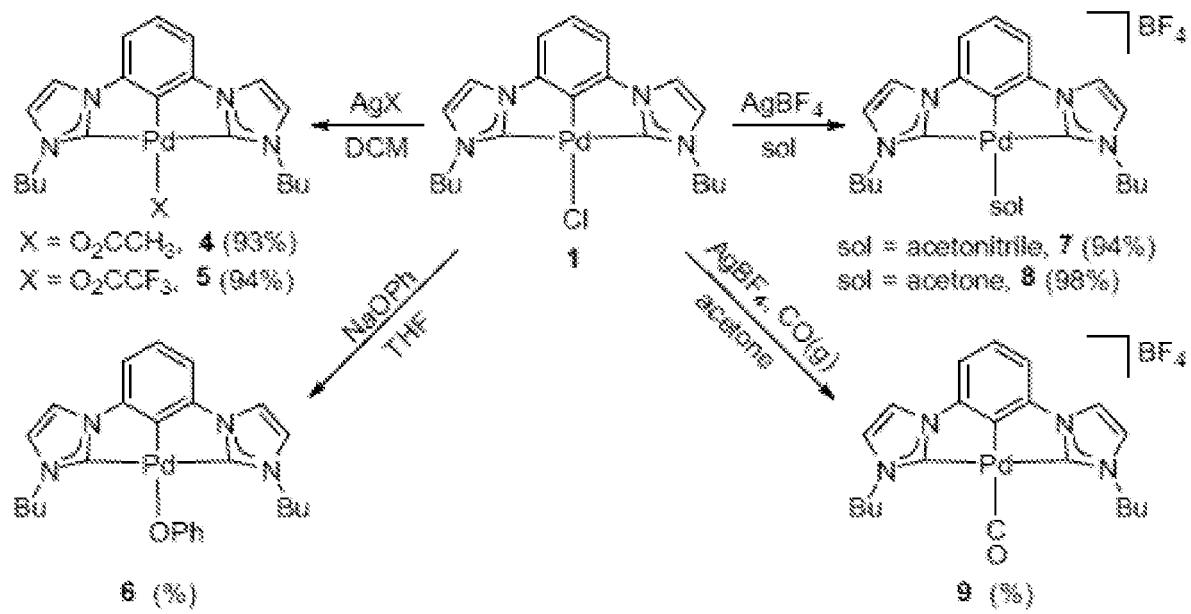
FIG. 15 shows a schematic view illustrating synthesis of CCC—Pd-L/X derivatives.

The CCC—NHC pincer ligand precursor was synthesized according to the literature procedure. Activation of the three C—H bonds of the tridentate ligand precursor was achieved through the basicity and electrophilicity of $Zr(NMe_2)_4$. A Pd(II) source was added to the Zr reagent prepared in situ to achieve transmetallation (FIG. 14). Initially [$PdCl_2$(MeCN)$_2$] was employed as the Pd source yielding some desired product; however, significant amounts of $Pd^0$ black were observed. $Pd^0$ black generation was attributed to the formation of reducing species produced by deprotonation of acetonitrile under basic reaction conditions due to excess $Zr(NMe_2)_4$. Therefore, $Pd(COD)X_2$ or $PdX_2(PhCN)_2$, which does not contain acidic protons, was evaluated and found to provide better yields and only traces of $Pd^0$ black. The products of 1 or 2 were obtained as white solids in yields of 37% and 33%, respectively. $^1$H NMR spectra showed the disappearance of the signals for the imidazolium protons (11.27 ppm, 2H) and an aryl H (8.96 ppm). In the $^{13}$C NMR spectra the carbene chemical shifts of 1 (δ=174.8 ppm) and 2 (δ=177.5 ppm) were observed in the range indicative of these complexes. The synthesis of complexes 4-9 is shown in FIG. 15.

Figure 16:
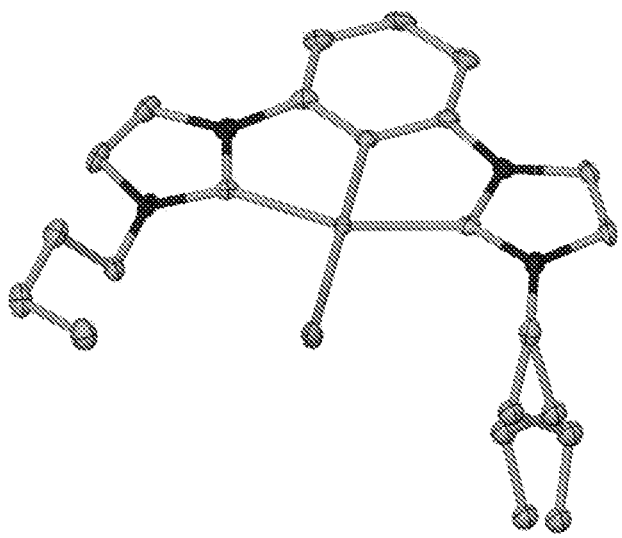
FIG. 16 shows an image illustrating ORTEP® diagram (50% thermal ellipsoids) of CCC$^{Bu}$—NHC—Pd(II)—Br 2, Pd—C7=1.937(8), Pd—C2=2.042(8), Pd—C13=2.043(8) and Pd—Br=2.4551(15) A. CCC$^{Bu}$—NHC—Pd(II)—Cl, Pd—C7=1.951(4), Pd—C2=2.061(4), Pd—C13=2.055(4), Pd—Cl=2.4079(10). Hydrogen atoms omitted for clarity.

X-ray quality crystals were obtained by slow diffusion of $Et_2O$ into a $CH_2Cl_2$ solution. The molecular structures of complexes 1 and 2 exhibit square planar Pd centers, FIG. 16. The C13-Pd—X angles are linear (1 179.2(2)°); 2 179.0(1)°) and the C5-Pd—C14 angles are less than linear due to ligand constraints (1: 156.2(3)° 2: 156.7(1)°). The Pd—C(NHC) bonds (Pd—C5 and Pd—C14) are about 5% longer than the Pd—C(aryl) bond. These bond angles and bond lengths are very similar to the CCC—Pt(II)—Cl complexes previously synthesized by our group. All the Pd—C bond lengths fall into the typical range of reported structures.

Raman Spectroscopy

Palladium halide vibrational normal modes have been studied in a number of organometallic compounds. In 1966, Perry and co-workers probed four tetrahalopalladium (II) complexes containing either chlorine or bromine as the respective halogen with a goal to analyze the far infrared absorption spectra of these bonds. These complexes had the structure $M_2PdX_4$ where M=$NH_4^+$, $K^+$, $Rb^+$, or $Cs^+$. From the infrared spectra the Pd—Cl stretching region was assigned to the range of 327-336 cm$^{-1}$, Pd—Cl in-plane bending vibrations in the range 183-205 cm$^{-1}$, and Pd—Cl out-of-plane bending vibrations from 160 to 175 cm$^{-1}$. The same motions of Pd—Br in the ranges of 249-260 cm$^{-1}$, 130-169 cm$^{-1}$, and 114-140 cm$^{-1}$, respectively. In 1996, Romerosa and co-workers synthesized and characterized trans-[PdCl(L)(PPh$_3$)$_2$] and its infrared spectrum yielded a peak at 330 cm$^{-1}$ that the authors attributed to Pd—Cl stretching. In 2000 Omrani and coworkers analyzed the Raman and IR vibrational spectra of $K_2PdCl_4$ and $K_2PdBr_4$. These authors were able to assign symmetric Pd—Cl stretching modes at 303 cm$^{-1}$ in the Raman spectra and 335 cm$^{-1}$ in the infrared spectra. Similarly, symmetric Pd—Br stretching modes were reported at 189 cm$^{-1}$ in the Raman spectra and 225 cm$^{-1}$ in the infrared spectra.

More recently in 2006, Drozdzweksi and co-workers studied the vibrational spectra of the palladium (II) complexes, $PdCl_2(tch)_2$ and $PdBr_2(tch)_2$ [tch=2-thiophenacarboxylic hydrazide], by means of FT-IR, Raman, and theoretical calculations using B3LYP/LANL2DZ method and basis set combination. The Pd—Cl stretching frequency was reported at 341 cm$^{-1}$, while the Pd—Br stretch was reported at 266 cm$^{-1}$. This 75 cm$^{-1}$ downshift was recovered by a 70 cm$^{-1}$ downshift in the calculated vibrational modes. In 2012 Kesan and co-workers investigated a new Pd—Cl complex using FT-IR and FT-Raman spectroscopy; Pd—Cl stretches were reported at 348 cm$^{-1}$ and 322 cm$^{-1}$ in the IR spectrum and 344 cm$^{-1}$ and 293 cm$^{-1}$ in the Raman spectrum. Computationally, Pd—Cl stretches were predicted at 316 cm$^{-1}$ and 336 cm$^{-1}$ using the B3LYP/LANL2DZ method and basis set combination.

NHCs are stable molecules with the most characteristic component lying with the central metal atom and its interactions with the halide atom. Despite the growing interest of organometallic compounds, Pd—X (X=Br, Cl) carbene pincer complexes have yet to be extensively studied by means of vibrational spectroscopy. Here, a spectroscopic study of 1 and 2 was employed to elucidate the metal-halide vibrational frequencies in this system.

Figure 17:
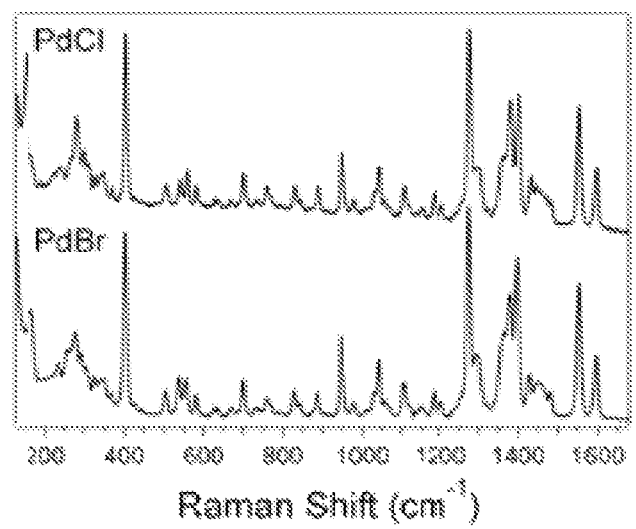
FIG. 17 shows the 120-1660 cm$^{-1}$ range of the solid state Raman spectra for Pd complexes 1 and 2.
Figure 18:
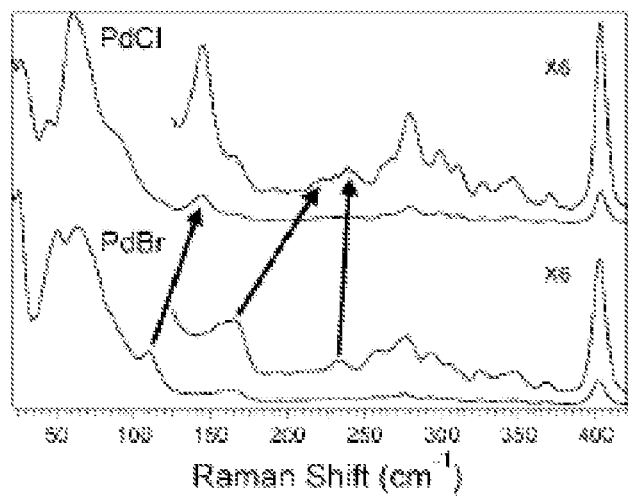
FIG. 18 shows the 20-420 cm$^{-1}$ range of the solid state Raman spectra for Pd complexes 1 and 2.

FIG. 17 shows a comparison of the Raman spectra of 1 and 2 in the solid state in the 120-1660 cm$^{-1}$ range. Above 400 cm$^{-1}$ the spectra are virtually identical and result from bending and stretching vibrations involving carbon and nitrogen atoms of the skeletal framework. Below 400 cm$^{-1}$, however, vibrations involving palladium and either chloride or bromide result in different spectral patterns. FIG. 17 highlights the low frequency range of 20-420 cm$^{-1}$. The clear shifts in peaks involving Cl and Br atoms due to mass differences are indicated with arrows, FIG. 18.

Figure 19:
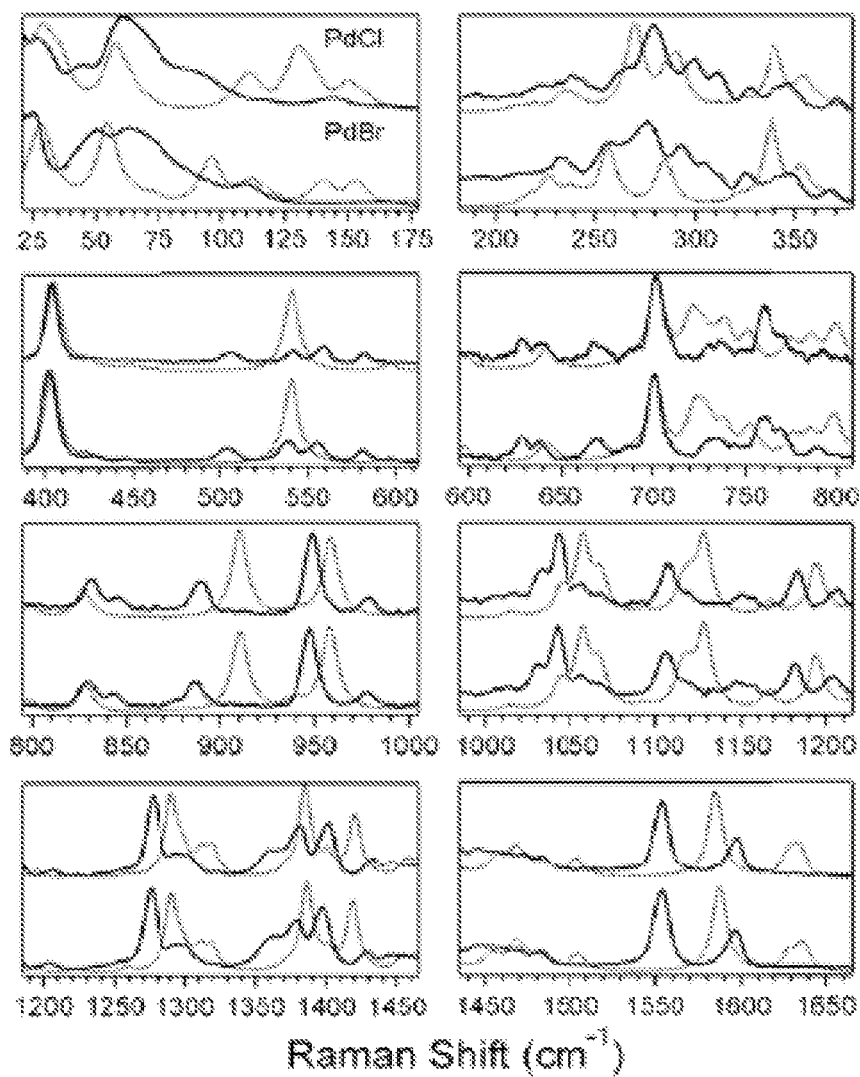
FIG. 19 shows experimental Raman spectra of Pd complexes 1 and 2 in the solid state (solid black line) compared to simulated spectra (dotted gray line) using the B3LYP method.
Figure 20:
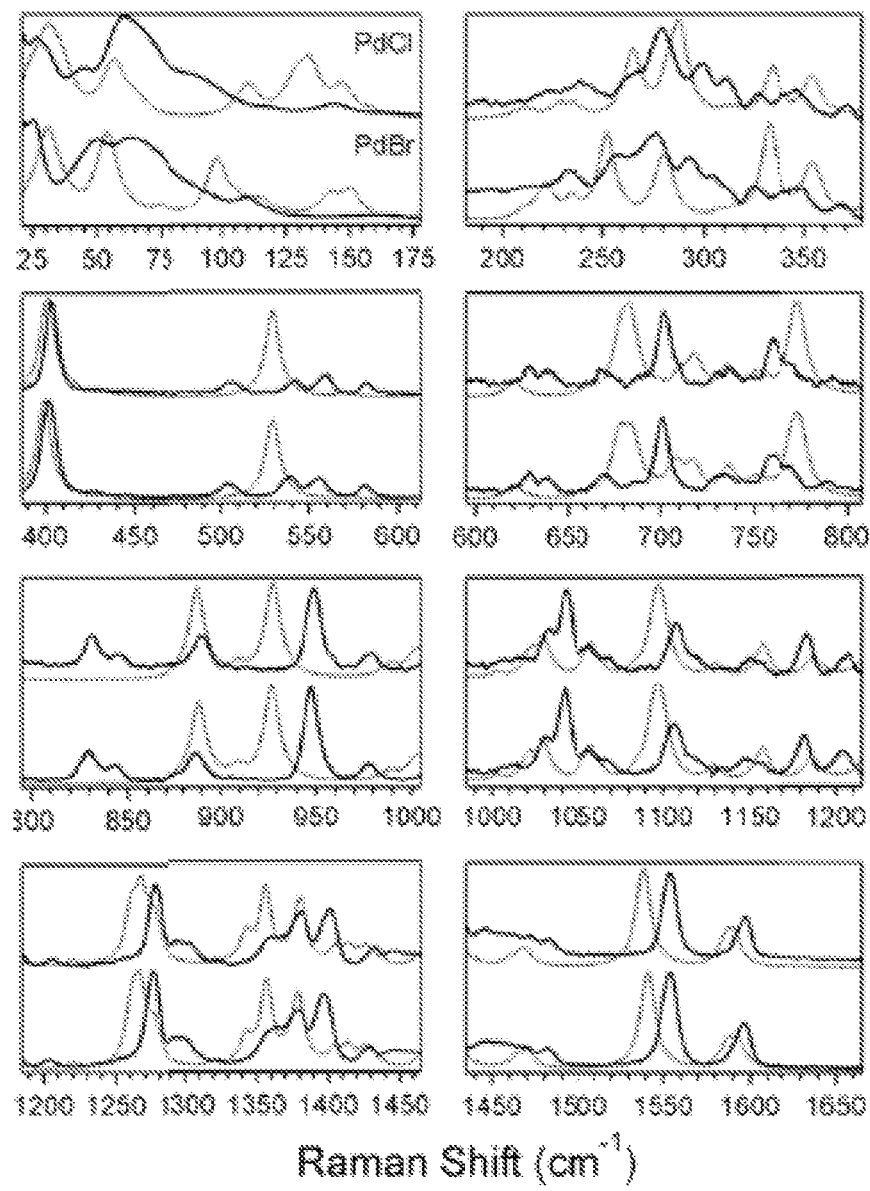
FIG. 20 shows experimental Raman spectra of Pd complexes 1 and 2 in the solid state (solid black line) compared to simulated spectra (dotted gray line) using the PBEPBE method.

Experimental Raman spectra were compared to simulated spectra in order to confirm assignments of normal modes. FIGS. 19 and 20 show a comparison to two different density functionals, B3LYP and PBEPBE, respectively. Overall agreement with B3LYP is better over the entire range and a significant dependence on the size of the basis set employed was observed. A detailed comparison of the theoretical shifts for Pd-halide bending, Pd-halide stretching, and torsional motions of the carbene ring with the halides with experimentally observed shifts allowed for the assignment of normal modes in the low frequency region. These are summarized in TABLE 6.

TABLE 6

Assignments of normal modes involving motions of Pd, Cl, and Br in Pd-X CCC-NHC pincer complexes, B3LYP.

| Vibrational Mode | Experimental (cm$^{-1}$) | Theory (cm$^{-1}$) | Deviation (cm$^{-1}$) | Deviation (%) |
|---|---|---|---|---|
| Pd—Cl in-plane bending | 144 | 130 | 14 | 10 |
| Pd—Br in-plane bending | 109 | 96 | 13 | 12 |
| Pd—Cl stretch | 222 | 209 | 13 | 6 |
| Pd—Br stretch | 156 | 140 | 16 | 10 |
| Pd—Cl stretch | 238 | 233 | 5 | 2 |
| Pd—Br stretch | 232 | 226 | 6 | 3 |

Figure 21A:
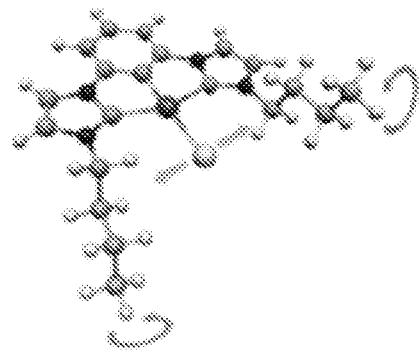
FIGS. 21A-B show motions of the Pd—X (A) bending and (B) stretching normal modes of Pd—X carbene pincer complexes.
Figure 21B:
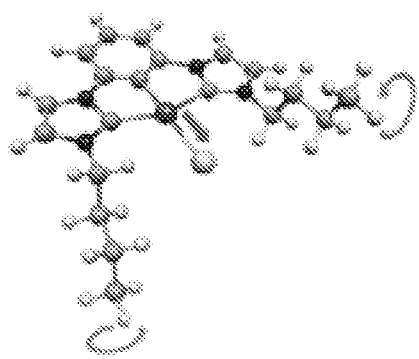

The Pd—Cl and Pd—Br out-of-plane bending modes are theoretically predicted to lie at 36 and 22 cm$^{-1}$, respectively. Although experimental Raman peaks are at 27 and 25 cm$^{-1}$ for complexes 1 and 2, respectively, a number of torsional motions involving bending of the carbene moiety are in this region making assignments difficult. These motions account for the large peaks between 30 and 100 cm$^{-1}$ seen in FIG. 18. In-plane bending modes are theoretically at 96 and 130 cm$^{-1}$ for Pd—Br and Pd—Cl and experimentally observed at 109 and 144 cm$^{-1}$ in the Raman spectra of 1 and 2. This results in a negative anharmonicity of 10 percent. Pd—Cl and Pd—Br stretching motions are predicted by theory to appear at 209 and 140 cm$^{-1}$, and are assigned to experimental peaks at 222 and 156 cm$^{-1}$. Additional Pd—Cl stretching frequencies are expected theoretically at 233 and 226 cm$^{-1}$ and are assigned to experimental peaks at 238 and 232 cm$^{-1}$. FIGS. 21A-B show the motions of the atoms involved in the Pd—X (A) bending and (B) stretching (b) normal modes. In each case, the alkyl chain exhibits a twisting motion. These assignments lie much lower in energy than the previous studies detailed in the introduction. This deviation is likely due to interactions with the alkyl chains and represent the lowest motions involving palladium and either chlorine or bromine to date.

In conclusion, this Example describes the synthesis, general characterization, and vibrational spectroscopy of two CCC—NHC pincer palladium (II) complexes. Also described are the photophysical properties of these palladium complexes which emit blue light in the solid state and in solution under UV irradiation. The solid state emissions are stable under ambient atmosphere ($O_2$ and $H_2O$) for extended periods.

EXPERIMENTAL

General Procedures

All starting materials were purchased from Sigma-Aldrich, Fisher Scientific, or Strem. The reagents were used as received unless otherwise mentioned. All solvents were dried and degassed by passing through a basic alumina column under Ar. All reactions involving organometallic reagents were carried out under an $N_2$ or Ar atmosphere using standard glovebox and Schlenk techniques. NMR spectra were collected using a Bruker Advance 300 or 600 spectrometer and were referenced to the residual solvent peak (δ in ppm, J in Hz).

Synthesis 1,3-bis(1-butylimidazolene-3-yl)benzenepalladium (II)chloride (1)

1,3-Bis(1-butylimidazolium-3-yl)benzene dichloride (0.261 g, 0.660 mmol), Zr(NMe$_2$)$_4$ (0.279 g, 1.044 mmol), and $CH_2Cl_2$ (8 mL) were stirred for 1 h at room temperature to yield a clear, pale yellow solution. PdCl$_2$(COD) (0.207 g, 0.724 mmol) was added with stirring to yield a clear, yellow solution. After 16 h, distilled water (0.3 mL) was added and the reaction mixture was stirred for 10 min. Filtration over Celite and removal of solvent afforded a yellow solid. The solid was dissolved in $CH_2Cl_2$ and filtered over a plug of silica and solvent removed in vacuo to yield an off-white powder. The solid was washed with acetone (2×1 mL) followed by precipitation from $CH_2Cl_2$ with hexanes. Filtration and drying in vacuo yielded a white solid (0.112 g, 0.242 mmol, 37%).

NMR (CD$_2$Cl$_2$): $^1$H (300 MHz): δ 7.38 (d, J=2.0 Hz, CH$_{imid}$, 2H), 7.15 (t, J=7.8 Hz, CH$_{aryl}$, 1H), 6.95 (d, J=2.0 Hz, CH$_{imid}$, 2H), 6.93 (d, J=7.9 Hz, CH$_{aryl}$, 2H), 4.68 (t, J=7.3 Hz, NCH$_2$, 4H), 1.84 (quintet, J=7.5 Hz, NCH$_2$CH$_2$, 4H), 1.44 (sextet, J=7.5 Hz, CH$_2$CH$_3$, 4H), 0.97 (t, J=7.4 Hz, CH$_2$CH$_3$, 6H). $^{13}$C{$^1$H} (75 MHz): δ 177.4, 146.6, 144.9, 125.3, 120.5, 114.8, 108.3, 49.7, 34.1, 20.1, 14.0. MS(EI): m/z=427.2 [M-Cl$^-$]$^+$ calcd. for C$_{20}$H$_{25}$N$_4$Pd. 427.11. Elem. Anal. Calcd. for $^{Bu}$C$^i$C$^i$C$^{Bu}$PdCl, C$_{20}$H$_{25}$N$_4$PdCl (found): C: 51.85 (51.66), H: 5.44 (5.44), N: 12.09 (12.09).

1,3-bis(1-butylimidazolene-3-yl)benzenepalladium (II)bromide (2)

1,3-Bis(1-butylimidazolium-3-yl)benzene dibromide (0.129 g, 0.267 mmol), Zr(NMe$_2$)$_4$ (0.118 g, 0.441 mmol), and THF (10 mL) were stirred for 3 h at room temperature to yield a bright yellow solution. PdBr$_2$(COD) (0.101 g, 0.270 mmol) was added with stirring to yield a cloudy orange suspension. After 16 h, stirring was halted and a grey precipitate was formed with a clear orange supernatant. Water (0.4 mL) was added and the mixture stirred for 1 hr. The mixture was filtered over Celite with $CH_2Cl_2$ (15 mL). The solvent was removed from the yellow filtrate. The solid was dissolved in a minimum of $CH_2Cl_2$ and filtered over a plug of silica and solvent removed in vacuo to yield a pale yellow solid. The solid was washed with acetone (2 mL) and dried to yield a white solid (0.045 g, 0.088 mmol, 33%). X-ray quality crystals were grown by slow diffusion of Et$_2$O and a saturated $CH_2Cl_2$ solution of 2.

NMR (CD$_2$Cl$_2$): $^1$H (500 MHz): δ 7.38 (d, J=1.8 Hz, CH$_{imid}$, 2H), 7.17 (t, J=7.8 Hz, CH$_{aryl}$, 1H), 6.96 (d, J=1.8 Hz, CH$_{imid}$, 2H), 6.94 (d, J=7.8 Hz, CH$_{aryl}$, 2H), 4.73 (t, J=7.4 Hz, NCH$_2$, 4H), 1.85 (quintet, J=7.5 Hz, NCH$_2$CH$_2$, 4H), 1.45 (sextet, J=7.6 Hz, CH$_2$CH$_3$, 4H), 0.97 (t, J=7.4 Hz, CH$_2$CH$_3$, 6H). $^{13}$C{$^1$H} (125 MHz): δ 176.8, 146.4, 145.3, 125.4, 120.7, 114.6, 108.3, 50.5, 34.3, 20.1, 14.1. MS(EI): m/z=427.2 [M-Br]$^+$ calcd. for C$_{20}$H$_{25}$N$_4$Pd. 427.11. Elem. Anal. Calcd. for $^{Bu}$C$^i$C$^i$C$^{Bu}$PdBr, C$_{20}$H$_{25}$N$_4$PdBr (found): C: 47.31 (47.25), H: 4.96 (5.08), N: 11.03 (11.01).

1,3-bis(1-butylimidazolene-3-yl)benzenepalladium (II)iodide/bromide (3)

1,3-Bis(1-butylimidazolium-3-yl)benzene diiodide (0.484 g, 1.0 mmol), Zr(NMe$_2$)$_4$ (0.321 g, 1.2 mmol), and THF (10 ml) were stirred for 1 h at room temperature to yield a cloudy suspension. Pd(COD)Br$_2$ (0.463 g, 1.0 mmol) was added with stirring to yield a cloudy yellow solution. After 8 h, stirring was halted and a yellow precipitate formed with a clear reddish supernatant liquid. The precipitate was collected and washed with toluene (3 mL×3) and dried to yield a yellow solid (0.242 g). Some of the solid was directly used for X-ray crystallography.

$^1$H NMR (CD$_2$Cl$_2$; 300.132 MHz): δ 7.40 & 7.01 (dd, 2H each, J=2 Hz, J=9 Hz, imi), 7.18 (t, 1H, J=7.8 Hz, p-Ph), 6.93 (dt, 2H, J=8 Hz, J$^4$Pt—H=8.6 Hz, m-Ph), 4.76 (t, 4H, J=7.3 Hz, NCH$_2$), 1.87 (quintet, 4H, J=7.5 Hz), 1.45 (sextet, 4H, J=7.7 Hz), 0.97 (t, 6H, J=7.4 Hz); $^{13}$C NMR (DMSO-d$_6$; 75.476 MHz, 350K): δ 170.5 (J$_{Pt-C}$=1166 Hz), 143.8, 134.0 (J Pt—C=953 Hz), 122.8, 121.3, 115.4, 107.5, 48.3, 32.8, 18.6, 13.1; ESI-MS: Calculated for C$_{20}$H$_{25}$BrN$_4$Pt [M+] (m/z): 595.1 Found: 595.0; Elemental analysis: Calculated: C, 40.28; H, 4.22; N, 9.39; Found: C, 40.74; H, 4.33; N, 9.39.

1,3-bis(1-butylimidazolene-3-yl)benzenepalladium (II)acetate (4)

Complex 1 (0.0783 g, 0.169 mmol), AgO$_2$CCH$_3$ (0.0298 g, 0.179 mmol), and CH$_2$Cl$_2$ (8 mL) were sonicated in a screw cap vial for 3 h, yielding a cloudy, white suspension. Filtration and concentration in vacuo resulted in a off-white powder. The powder was dissolved in a minimum of CH$_2$Cl$_2$, filtered, and concentrated a second time to yield a white powder (0.0762 g, 0.157 mmol, 93%). X-ray quality crystals were grown from layering hexanes on a DCM solution.

NMR (CD$_2$Cl$_2$): $^1$H (300 MHz): δ 7.38 (d, J=1.8 Hz, CH$_{imid}$, 2H), 7.11 (t, J=7.8 Hz, CH$_{aryl}$, 1H), 6.93 (d, J=1.9 Hz, CH$_{imid}$, 2H), 6.89 (d, J=7.8 Hz, CH$_{aryl}$, 2H), 4.18 (t, J=7.5 Hz, NCH$_2$, 4H), 1.98 (br, O$_2$CCH$_3$, 3H), 1.82 (quintet, J=7.6 Hz, NCH$_2$CH$_2$, 4H), 1.40 (sextet, J=7.6 Hz, CH$_2$CH$_3$, 4H), 0.97 (t, J=7.4 Hz, CH$_2$CH$_3$, 6H). $^{13}$C{$^1$H} (125 MHz): δ 178.0, 177.1, 146.7, 143.3, 125.2, 120.1, 115.1, 108.4, 49.8, 33.8, 24.6, 20.3, 13.9. Elem. Anal. Calcd. for $^{Bu}$C$^i$C$^i$C$^{Bu}$PdO$_2$CCH$_3$, C$_{22}$H$_{28}$N$_4$O$_2$Pd (found): C: 54.27 (54.09), H: 5.80 (5.86), N: 11.51 (11.37).

1,3-bis(1-butylimidazolene-3-yl)benzenepalladium (II)trifluoroacetate (5)

Complex 1 (0.0295 g, 0.0637 mmol), AgO$_2$CCF$_3$ (0.0160 g, 0.0724 mmol), and CH$_2$Cl$_2$ (2 mL) were sonicated in a screw cap vial for 3 h, yielding a cloudy, white suspension. Filtration and concentration in vacuo resulted in a yellow powder. The powder was dissolved in a minimum of CH$_2$Cl$_2$, filtered, and concentrated a second time to yield a yellow powder (0.0325 g, 0.0601 mmol, 94%). X-ray quality crystals were grown from layering hexanes on a DCM solution.

NMR (CD$_2$Cl$_2$): $^1$H (300 MHz): δ 7.39 (d, J=2.0 Hz, CH$_{imid}$, 2H), 7.13 (t, J=7.9 Hz, CH$_{aryl}$, 1H), 6.95 (d, J=2.0 Hz, CH$_{imid}$, 2H), 6.89 (d, J=7.9 Hz, CH$_{aryl}$, 2H), 4.04 (t, J=7.4 Hz, NCH$_2$, 4H), 1.76 (quintet, J=7.6 Hz, NCH$_2$CH$_2$, 4H), 1.35 (sextet, J=7.5 Hz, CH$_2$CH$_3$, 4H), 0.94 (t, J=7.4 Hz, CH$_2$CH$_3$, 6H). $^{13}$C{$^1$H} (150 MHz): δ 176.6, 162.0 (quartet, $^2$J$_{C-F}$=35.0 Hz, C(O)O—Pt), 146.6, 140.5, 126.3, 120.5, 117.4 (quartet, $^1$J$_{C-F}$=292.0 Hz, CF$_3$), 115.5, 108.9, 49.9, 33.6, 19.9, 13.8. Elem. Anal. Calcd. for $^{Bu}$C$^i$C$^i$C$^{Bu}$PdO$_2$CCH$_3$, C$_{22}$H$_{25}$N$_4$O$_2$F$_3$Pd (found): C: 48.85 (48.57), H: 4.66 (4.75), N: 10.36 (10.26).

1,3-bis(1-butylimidazolene-3-yl)benzenepalladium (II)phenoxide (6)

Complex 1 (0.020 g, 0.044 mmol), NaOPh (0.011 g, 0.058 mmol), and THF (10 mL) were combined in a 20 mL scintillation vial and sonicated for 3 hr. The mixture was concentrated in vacuo, filtered over Celite, and solvent removed to yield a white waxy solid. The solid was triturated with hexanes (2×5 mL) to wash and dried in vacuo to yield a white powder. Crystals were growing by layering a concentrated CH$_2$Cl$_2$ solution of 4 with hexanes.

NMR (CD$_2$Cl$_2$): $^1$H (600 MHz): δ 7.39 (d, J=1.9 Hz, CH$_{imid}$, 2H), 7.15 (t, J=7.8 Hz, CH$_{aryl}$, 1H), 6.93 (m, CH$_{aryl}$ and CH$_{imid}$, 6H), 6.82 (d, J=7.9 Hz, CH$_{aryl}$, 2H), 6.29 (t, J=7.1 Hz, CH$_{aryl}$, 1H), 4.15 (t, J=7.7 Hz, NCH$_2$, 4H), 1.62 (quintet, J=7.7 Hz, NCH$_2$CH$_2$, 4H), 1.11 (sextet, J=7.6 Hz, CH$_2$CH$_3$, 4H), 0.77 (t, J=7.4 Hz, CH$_2$CH$_3$, 6H). $^{13}$C{$^1$H} (150 MHz): δ 178.3, 171.3, 147.0, 144.8, 128.9, 125.1, 120.0, 119.9, 115.1, 111.8, 108.3, 49.6, 34.1, 20.0, 13.9.

1,3-bis(1-butylimidazolene-3-yl)benzenepalladium (II)acetonitrile tetrafluoroborate (7)

Complex 1 (0.133 g, 0.287 mmol), AgBF$_4$ (0.069 g, 0.356 mmol), and MeCN (10 mL) were combined in a 20 mL scintillation vial and sonicated for 3 hr. The mixture was concentrated in vacuo, filtered over Celite, and solvent removed to yield an off-white waxy solid. The solid was triturated with hexanes (2×5 mL) to wash and dried in vacuo to yield an off-white powder (0.149 g, 0.269 mmol, 94%). Crystals were grown by layering a concentrated CH$_2$Cl$_2$ solution of 7 with hexanes.

NMR (CD$_2$Cl$_2$): $^1$H (600 MHz): δ 7.46 (d, J=2.0 Hz, CH$_{imid}$, 2H), 7.20 (t, J=7.9 Hz, CH$_{aryl}$, 1H), 7.04 (d, J=2.0 Hz, CH$_{imid}$, 2H), 6.96 (d, J=7.9 Hz, CH$_{aryl}$, 2H), 4.14 (t, J=7.2 Hz, NCH$_2$, 4H), 2.39 (br, NCCH$_3$, 3H), 1.85 (quintet, J=7.5 Hz, NCH$_2$CH$_2$, 4H), 1.39 (sextet, J=7.6 Hz, CH$_2$CH$_3$, 4H), 0.99 (t, J=7.4 Hz, CH$_2$CH$_3$, 6H). NMR (acetone-d$_6$): $^1$H (600 MHz): δ 7.96 (d, J=1.9 Hz, CH$_{imid}$, 2H), 7.49 (d, J=1.9 Hz, CH$_{imid}$, 2H), 7.27 (m, CH$_{aryl}$, 3H), 4.20 (t, J=7.0 Hz, NCH$_2$, 4H), 2.37 (br, NCCH$_3$, 3H), 1.90 (quintet, J=7.5 Hz, NCH$_2$CH$_2$, 4H), 1.42 (sextet, J=7.6 Hz, CH$_2$CH$_3$, 4H), 0.97 (t, J=7.4 Hz, CH$_2$CH$_3$, 6H). $^{13}$C{$^1$H} (150 MHz): δ 176.3, 147.2, 141.7, 127.8, 122.4, 116.8, 110.2, 50.6, 34.3, 20.4, 14.0, 2.1. Elem. Anal. Calcd. for [$^{Bu}$C$^i$C$^i$C$^{Bu}$PdNCCH$_3$][BF$_4$], C$_{22}$H$_{28}$N$_5$BF$_4$Pd (found): C: 47.55 (47.66), H: 5.08 (5.15), N: 12.60 (12.48).

1,3-bis(1-butylimidazolene-3-yl)benzenepalladium (II)acetone tetrafluoroborate (8)

Complex 1 (0.129 g, 0.279 mmol), AgBF$_4$ (0.071 g, 0.362 mmol), and acetone (10 mL) were sonicated in a 20 mL scintillation vial for 2 hr, yielding a yellow suspension. Filtration over Celite and concentration in vacuo resulted in a pale yellow waxy solid. The solid was triturated with hexanes (2×5 mL) to wash and dried in vacuo to yield a pale yellow powder (0.158 g, 0.278 mmol, 98%). Crystals were grown at room temperature from a concentrated acetone-d$_6$ solution of 8.

NMR (CD$_2$Cl$_2$): $^1$H (300 MHz): δ 7.44 (d, J=2.0 Hz, CH$_{imid}$, 2H), 7.17 (t, J=8.0 Hz, CH$_{aryl}$, 1H), 7.02 (d, J=2.0

Hz, CH$_{imid}$, 2H), 6.90 (d, J=8.0 Hz, CH$_{aryl}$, 2H), 4.05 (t, J=7.4 Hz, NCH$_2$, 4H), 2.43 (s, O=C(CH$_3$)$_2$, 6H), 1.78 (quintet, J=7.4 Hz, NCH$_2$CH$_2$, 4H), 1.38 (sextet, J=7.5 Hz, CH$_2$CH$_3$, 4H), 0.96 (t, J=7.4 Hz, CH$_2$CH$_3$, 6H). NMR (acetone-d$_6$): $^1$H (300 MHz): δ 7.97 (d, J=2.0 Hz, CH$_{imid}$, 2H), 7.49 (d, J=2.0 Hz, CH$_{imid}$, 2H), 7.27 (m, CH$_{aryl}$, 3H), 4.00 (t, J=7.3 Hz, NCH$_2$, 4H), 2.09 (s, O=C(CH$_3$)$_2$, 6H), 1.84 (quintet, J=7.5 Hz, NCH$_2$CH$_2$, 4H), 1.39 (sextet, J=7.5 Hz, CH$_2$CH$_3$, 4H), 0.96 (t, J=7.4 Hz, CH$_2$CH$_3$, 6H). $^{13}$C{$^1$H} (150 MHz): δ 205.9, 176.5, 146.9, 139.9, 127.7, 122.3, 117.0, 110.3, 50.3, 34.0, 30.6, 20.4, 13.9. Elem. Anal. Calcd. for [$^{Bu}$C$^i$C$^i$C$^{Bu}$PdOC(CH$_3$)$_2$][BF$_4$], C$_{23}$H$_{31}$N$_4$BOF$_4$Pd (found): C: 48.23 (47.96), H: 5.46 (5.45), N: 9.78 (9.81).

X-Ray Crystallography

The single crystals of 1, 4, 6, 7, and 8 were measured using a Bruker Venture X-ray diffractometer with Mo-Iµs X-ray tube (Kα=0.71073 Å) or Cu-Iµs X-ray tube (Kα=1.5418 Å). The single crystals of 2 were measured using an Oxford Gemini X-ray diffractometer with Mo X-ray tube (Kα=0.71073 Å). All crystals were coated in paraffin oil, mounted on a MiTeGen MicroLoop, and placed under streaming N$_2$ (100 K) except 2 (300 K). The space groups were determined by systematic absences and intensity statistics, and structures were solved by direct methods and refined by full-matrix least-squares on F$^2$. Anisotropic displacement parameters were employed for all non-hydrogen atoms; H atoms were placed at idealized positions and refined with fixed isotropic displacement parameters. The following programs were used: data collection, APEX3; data reduction, SAINT; absorption correction, SADABS; structure solutions and refinements, SHELXT/XS within OLEX. The final data presentation and structure plots were generated in X-Seed Version 2.0. Complex 2 differed in data collection and reduction by using CrysAlis. Crystallographic data for the complexes are deposited in the Cambridge Crystallographic Data Centre; their numbers are: CCDC 1534356 (1), CCDC 1016511 (2), CCDC 1542458 (4), CCDC 1546705 (6), CCDC 1542457 (7), and CCDC 1544223 (8).

Photophysical Studies

UV-visible absorption spectra were collected using a HP 8453 UV-visible system. Emission spectra were collected using a PerkinElmer LS 55 fluorescence spectrometer. Photostability studies were carried out by exposing the solid sample to 355 nm radiation. The light source was a Xenon lamp, and the detector was a photodiode array placed behind a filter next to the sample chamber. Lifetime measurements were carried out using 10 Hz pulsed 355 nm Nd:YAG laser output as the pumping source and a photomultiplier tube as the detector.

Vibrational Studies

Raman spectra of the palladium carbenes were obtained using the 647.1 nm laser line from a Kr ion laser with an incident laser power of approximately 100 mW. A Labview-controlled Jobin-Yvon T64000 scanning Raman spectrometer coupled with photomultipler tube detection was employed to acquire the Raman spectra over the range 20-1660 cm$^{-1}$ with a 0.5 cm$^{-1}$ scan speed. Raman spectra were simulated by taking the sum of Lorentzian functions from calculated normal modes and intensities using a common peak width.

The presently-disclosed subject matter is further illustrated by the following specific but non-limiting examples. The following examples may include compilations of data that are representative of data gathered at various times during the course of development and experimentation related to the presently-disclosed subject matter.

While the disclosure is susceptible to various modifications and alternative forms, specific embodiments thereof have been shown by way of example in the drawings and are herein described below in detail. It should be understood, however, that the description of specific embodiments is not intended to limit the disclosure to cover all modifications, equivalents and alternatives falling within the spirit and scope of the disclosure as defined by the appended claims.

REFERENCES (1) W. Ayers, ed., *Catalytic activation of carbon dioxide*, American Chemical Society, Washington, D.C., 1988.

(2) R. L. House, N. Y. M. Iha, R. L. Coppo, L. Alibabaei, B. D. Sherman, P. Kang, M. K. Brennaman, P. G. Hoertz and T. J. Meyer, *J. Photochem. Photobiol., C*, 2015, 25, 32.

(3) D. Kim, K. K. Sakimoto, D. Hong and P. Yang, *Angew. Chem., Int. Ed.*, 2015, 54, 3259.

(4) A. Taheri and L. A. Berben, *Chem. Commun.*, 2016, 52, 1768.

(5) E. E. Benson, C. P. Kubiak, A. J. Sathrum and J. M. Smieja, *Chem. Soc. Rev.*, 2009, 38, 89.

(6) A. J. Morris, G. J. Meyer and E. Fujita, *Acc. Chem. Res.*, 2009, 42, 1983.

(7) M. L. Pegis, J. A. S. Roberts, D. J. Wasylenko, E. A. Mader, A. M. Appel and J. M. Mayer, *Inorg. Chem.*, 2015, 54, 11883.

(8) S. G. Bratsch, *J. Phys. Chem. Ref Data*, 1989, 18, 1.

(9) M. Aresta, A. Dibenedetto and A. Angelini, *Chem. Rev.*, 2014, 114, 1709.

(10) M. Mikkelsen, M. Jorgensen and F. C. Krebs, *Energy Environ. Sci.*, 2010, 3, 43.

(11) A. M. Appel, J. E. Bercaw, A. B. Bocarsly, H. Dobbek, D. L. DuBois, M. Dupuis, J. G. Ferry, E. Fujita, R. Hille, P. J. Kenis, C. A. Kerfeld, R. H. Morris, C. H. Peden, A. R. Portis, S. W. Ragsdale, T. B. Rauchfuss, J. N. Reek, L. C. Seefeldt, R. K. Thauer and G. L. Waldrop, *Chem. Rev.*, 2013, 113, 6621.

(12) B. Kumar, J. P. Brian, V. Atla, S. Kumari, K. A. Bertram, R. T. White and J. M. Spurgeon, *Catal. Today*, 2016, 270, 19.

(13) Z. Weng, J. Jiang, Y. Wu, Z. Wu, X. Guo, K. L. Materna, W. Liu, V. S. Batista, G. W. Brudvig and H. Wang, *J. Am. Chem. Soc.*, 2016, 138, 8076.

(14) V. R. Jupally, A. C. Dharmaratne, D. Crasto, A. J. Huckaba, C. Kumara, P. R. Nimmala, N. Kothalawala, J. H. Delcamp and A. Dass, *Chem. Commun.*, 2014, 50, 9895.

(15) X. Zhou, D. Micheroni, Z. Lin, C. Poon, Z. Li and W. Lin, *ACS Appl Mater Interfaces*, 2016, 8, 4192.

(16) J. Schneider, H. Jia, J. T. Muckerman and E. Fujita, *Chem. Soc. Rev.*, 2012, 41, 2036.

(17) M. R. DuBois and D. L. DuBois, *Acc. Chem. Res.*, 2009, 42, 1974.

(18) E. E. Benson, C. P. Kubiak, A. J. Sathrum and J. M. Smieja, *Chem. Soc. Rev.*, 2009, 38, 89.

(19) J. M. Saveant, *Chem. Rev.*, 2008, 108, 2348.

(20) C. Costentin, M. Robert and J. M. Saveant, *Chem. Soc. Rev.*, 2013, 42, 2423.

(21) C. Costentin, S. Drouet, M. Robert and J. M. Saveant, *Science*, 2012, 338, 90.

(22) M. Bourrez, F. Molton, S. Chardon-Noblat and A. Deronzier, *Angew. Chem., Int. Ed. Engl.*, 2011, 50, 9903.

(23) C. J. Stanton, 3rd, C. W. Machan, J. E. Vandezande, T. Jin, G. F. Majetich, H. F. Schaefer, 3rd, C. P. Kubiak, G. Li and J. Agarwal, *Inorg. Chem.*, 2016, 55, 3136.
(24) J. Agarwal, T. W. Shaw, C. J. Stanton, 3rd, G. F. Majetich, A. B. Bocarsly and H. F. Schaefer, 3rd, *Angew. Chem., Int. Ed. Engl.*, 2014, 53, 5152.
(25) J. Agarwal, T. W. Shaw, H. F. Schaefer III and A. B. Bocarsly, *Inorg. Chem.*, 2015, 54, 5285.
(26) N. P. Liyanage, H. A. Dulaney, A. J. Huckaba, J. W. Jurss and J. H. Delcamp, *Inorg. Chem.*, 2016, 55, 6085.
(27) J. D. Froehlich and C. P. Kubiak, *J. Am. Chem. Soc.*, 2015, 137, 3565.
(28) M. Sheng, N. Jiang, S. Gustafson, B. You, D. H. Ess and Y. Sun, *Dalton Trans.*, 2015, 44, 16247.
(29) V. S. Thoi, N. Kornienko, C. G. Margarit, P. Yang and C. J. Chang, *J. Am. Chem. Soc.*, 2013, 135, 14413.
(30) D. J. Morales-Morales, C. M., *The Chemistry of Pincer Complexes*, Elsevier Science, Amsterdam, 2007.
(31) T. K. Hollis and X. Zhang, U.S. Pat. No. 9,029,804, 2015.
(32) E. M. Matson, G. Espinosa Martinez, A. D. Ibrahim, B. J. Jackson, J. A. Bertke and A. R. Fout, *Organometallics*, 2015, 34, 399.
(33) E. G. Ha, J. A. Chang, S. M. Byun, C. Pac, D. M. Jang, J. Park and S. O. Kang, *Chem. Commun.*, 2014, 50, 4462.
(34) Y. Kou, S. Nakatani, G. Sunagawa, Y. Tachikawa, D. Masui, T. Shimada, S. Takagi, D. A. Tryk, Y. Nabetani, H. Tachibana and H. Inoue, *J. Catal.*, 2014, 310, 57.
(35) F. Li, K. Fan, B. Xu, E. Gabrielsson, Q. Daniel, L. Li and L. Sun, *J. Am. Chem. Soc.*, 2015, 137, 9153.
(36) M. Schreier, P. Gao, M. T. Mayer, J. Luo, T. Moehl, M. K. Nazeeruddin, S. D. Tilley and M. Grätzel, *Energy Environ. Sci.*, 2015, 8, 855.
(37) R. Kuriki, H. Matsunaga, T. Nakashima, K. Wada, A. Yamakata, O. Ishitani and K. Maeda, *J. Am. Chem. Soc.*, 2016, 138, 5159.
(38) A. Nayak, S. Roy, B. D. Sherman, L. Alibabaei, A. M. Lapides, M. K. Brennaman, K. R. Wee and T. J. Meyer, *ACS Appl Mater Interfaces*, 2016, 8, 3853.
(39) T. E. Rosser, C. D. Windle and E. Reisner, *Angew. Chem., Int. Ed. Engl.*, 2016, 55, 7388.
(40) M. Schreier, J. Luo, P. Gao, T. Moehl, M. T. Mayer and M. Gratzel, *J. Am. Chem. Soc.*, 2016, 138, 1938.
(41) D. I. Won, J. S. Lee, J. M. Ji, W. J. Jung, H. J. Son, C. Pac and S. O. Kang, *J. Am. Chem. Soc.*, 2015, 137, 13679.
(42) J. D. Froehlich and C. P. Kubiak, *Inorg. Chem.*, 2012, 51, 3932.
(43) J. Schneider, H. Jia, K. Kobiro, D. E. Cabelli, J. T. Muckerman and E. Fujita, *Energy Environ. Sci.*, 2012, 5, 9502.
(44) A. J. Huckaba, E. A. Sharpe and J. H. Delcamp, *Inorg. Chem.*, 2016, 55, 682.
(45) J. M. Smieja, M. D. Sampson, K. A. Grice, E. E. Benson, J. D. Froehlich and C. P. Kubiak, *Inorg. Chem.*, 2013, 52, 2484.
(46) V. S. Thoi and C. J. Chang, *Chem. Commun.*, 2011, 47, 6578.
(47) Values reported versus SCE or NHE in literature were converted to ferrocene by subtracting 0.40 V for SCE values or 0.64 V for NHE values. All values for literature reported complexes are estimated from the reported voltammograms. The TOF values are estimated catalytic rates from electrochemical cyclic voltammetry measurements for the purpose of a straight forward comparison to literature catalysts. As the values are estimates and the TOF equation used to derive them is intended to be applied to reversible waves, we stress that these are only estimates and as such, TOF values have only been reported to 1 significant figure.
(48) C. M. Zall, J. C. Linehan and A. M. Appel, *ACS Catalysis*, 2015, 5, 5301.
(49) Arduengo. III, A. J.; Harlow, R. L.; Kline, M. *Journal of the American Chemical Society* 1991, 113, 361.
(50) Bourissou, D.; Guerret, O.; Gabbaï, F. P.; Bertrand, G. *Chem. Rev.* 2000, 100, 39-91.
(51) Schwarz, J.; Bohm, V. P. M.; Gardiner, M. G.; Grosche, m.; Herrmann, W. A.; Hieringer, W.; Randaschl-Sieber, G. *Chem. Eur. J.* 2000, 6, 1773.
(52) Herrmann, W. A.; Reisinger, C.-P.; Spiegler, M. *Journal of Organometallic Chemistry* 1998, 557, 93.
(53) Zhang, C.; Trudell, M. L. *Tetrahedron Letters* 2000, 41, 595.
(54) Albrecht, M.; Crabtree, R. H.; Mata, J.; Peris, E. *Chemical communications* 2002, 32.
(55) Albrecht, M.; Miecznikowski, J. R.; Samuel, A.; Faller, J. W.; Crabtree, R. H. *Organometallics* 2002, 21, 3596.
(56) Poyatos, M.; Sanau, M.; Peris, E. *Inorganic chemistry* 2003, 42, 2572-2576.
(57) Miecznikowski, J. R.; Crabtree, R. H. *Organometallics* 2004, 23, 629.
(58) Poyatos, M.; Mas-Marza, E.; Peris, E.; Mata, J. A.; Sanau, M. *European Journal of Inorganic Chemistry* 2003, 1215.
(59) Mas-Marza, E.; Poyatos, M.; Sanau, M.; Peris, E. *Inorganic chemistry* 2004, 43, 2213-2219.
(60) Poyatos, M.; Mas-Marza, E.; Sanau, M.; Peris, E. *Inorganic chemistry* 2004, 43, 1793-1798.
(61) Faller, J. W.; D'Alliessi, D. G. *Organometallics* 2001, 21, 1743.
(62) Andrew, R. E.; Gonzalez-Sebastian, L.; Chaplin, A. B. *Dalton transactions* 2016, 45, 1299.
(63) Hollis, T. K.; Zhang, X.; Google Patents: 2015.
(64) Zhang, X.; Wright, A. M.; DeYonker, N. J.; Hollis, T. K.; Hammer, N. I.; Webster, C. E.; Valente, E. *J. Organometallics* 2012, 31, 1664.
(65) Zhang, X.; Cao, B.; Valente, E. J.; Hollis, T. K. *Organometallics* 2013, 32, 752.
(66) Huckaba, A. J.; Cao, B.; Hollis, T. K.; Valle, H. U.; Kelly, J. T.; Hammer, N. I.; Oliver, A. G.; Webster, C. E. *Dalton transactions* 2013, 42, 8820.
(67) Naziruddin, A. R.; Galstyan, A.; lordache, A.; Daniliuc, C. G.; Strassert, C. A.; De Cola, L. *Dalton transactions* 2015, 44, 8467.
(68) Hang, X. C.; Fleetham, T.; Turner, E.; Brooks, J.; Li, *J. Angewandte Chemie* 2013, 52, 6753.
(69) Fleetham, T.; Ecton, J.; Wang, Z.; Bakken, N.; Li, *J. Adv Mater* 2013, 25, 2573.
(70) Fleetham, T.; Wang, Z.; Li, J. *Organic Electronics* 2012, 13, 1430.
(71) Lee, C.-S.; Sabiah, S.; Wang, J.-C.; Hwang, W.-S.; Lin, I. J. B. *Organometallics* 2010, 29, 286.
(72) Lin, W. J.; Naziruddin, A. R.; Chen, Y. H.; Sun, B. J.; Chang, A. H.; Wang, W. J.; Hwang, W. S. *Chemistry, an Asian journal* 2015, 10, 728.
(73) Tabrizi, L.; Chiniforoshan, H. *Polyhedron* 2016, 117, 209.
(74) Tenne, M.; Metz, S.; Wagenblast, G.; Münster, I.; Strassner, T. *Organometallics* 2015, 34, 4433.
(75) Strassner, T. *Accounts of chemical research* 2016, 49, 2680.
(76) Leopold, H.; Tronnier, A.; Wagenblast, G.; Münster, I.; Strassner, T. *Organometallics* 2016, 35, 959.
(77) Leopold, H.; Strassner, T. *Organometallics* 2016, 35, 4050.

(78) Liao, J. L.; Chi, Y.; Wang, J. Y.; Chen, Z. N.; Tsai, Z. H.; Hung, W. Y.; Tseng, M. R.; Lee, G. H. *Inorganic chemistry* 2016, 55, 6394.

(79) Tseng, C.-H.; Fox, M. A.; Liao, J.-L.; Ku, C.-H.; Sie, Z.-T.; Chang, C.-H.; Wang, J.-Y.; Chen, Z.-N.; Leee, G.-H.; Chi, Y. *Journal of Materials Chemistry C* 2017.

(80) Kido, J.; Kimura, M.; Nagai, K. *Science* 1995, 267, 1332.

(81) Baldo, M. A.; O'Brien, D. F.; You, Y.; Shoustikov, A.; Sibley, S.; Thompson, M. E.; Forrest, S. R. *Nature* 1998, 395, 151.

(82) Dini, D. *Chem. Mater.* 2005, 17, 1933.

(83) Clark, W. D.; Tyson, G. E.; Hollis, T. K.; Valle, H. U.; Valente, E. J.; Oliver, A. G.; Dukes, M. P. *Dalton transactions* 2013, 42, 7338.

(84) Huckaba, A. J.; Hollis, T. K.; Howell, T. O.; Valle, H. U.; Wu, Y. *Organometallics* 2013, 32, 63.

(85) Ahrens, S.; Strassner, T. *Inorganica Chimica Acta* 2006, 359, 4789.

(86) Vargas, V. C.; Rubio, R. J.; Hollis, T. K.; Salcido, M. E. *Organic letters* 2003, 5, 4847.

(87) Helgert, T. R.; Hollis, T. K.; Valente, E. *J. Organometallics* 2012, 31, 3002.

(88) Hohlein, I. M.; Angi, A.; Sinelnikov, R.; Veinot, J. G.; Rieger, B. *Chemistry-A European Journal* 2015, 21, 2755.

(89) Zhang, C.; Zhao, X.-F. *Synthesis* 2007, 2007, 551.

(90) Bruker In APEX2; Bruker AXS Inc.: Madison, W., USA, 2007.

(91) Bruker In SADABS; Bruker AXS Inc.: Madison, W., USA, 2007.

(92) Sheldrick, G. M. *Acta crystallographica. Section A, Foundations of crystallography* 2008, 64, 112.

(93) Dolomanov, O. V.; Bourhis, L. J.; Gildea, R. J.; Howard, J. A. K.; Puschmann, H. *Journal of Applied Crystallography* 2009, 42, 339.

(94) Barbour, L. J. *Journal of Supramolecular Chemistry* 2001, 1, 189.

(95) Oxford Diffraction (2006). CrysAlis. Oxford Diffraction Ltd, A., Oxfordshire, England.

(96) Arduengo, A. J.; Harlow, R. L.; Kline, M., A stable crystalline carbene. *JACS* 1991, 113, 361-363.

(97) Fevre, M.; Pinaud, J.; Gnanou, Y.; Vignolle, J.; Taton, D., N-Heterocyclic carbenes (NHCs) as organocatalysts and structural components in metal-free polymer synthesis. *Chem. Soc. Rev.* 2013, 42, 2142-2172.

(98) Díez-González, S.; Marion, N.; Nolan, S. P., N-Heterocyclic Carbenes in Late Transition Metal Catalysis. *Chem. Rev.* 2009, 109, 3612-3676.

(99) Herrmann, W. A., N-Heterocyclic Carbenes: A New Concept in Organometallic Catalysis. *Angew. Chem. Int. Ed.* 2002, 41, 1290-1309.

(100) Marion, N.; Díez-González, S.; Nolan, S. P., N-Heterocyclic Carbenes as Organocatalysts. *Angew. Chem. Int. Ed.* 2007, 46, 2988-3000.

(101) Hopkinson, M. N.; Richter, C.; Schedler, M.; Glorius, F., An overview of N-heterocyclic carbenes. *Nature* 2014, 510, 485-496.

(102) Crudden, C. M.; Allen, D. P., Stability and reactivity of N-heterocyclic carbene complexes. *Coord. Chem. Rev.* 2004, 248, 2247-2273.

(103) Morales-Morales, D.; Jensen, C. M., *The Chemistry of Pincer Compounds*. Elsevier: New York, 2007; p 466.

(104) Peris, E.; Crabtree Robert, H., 'Pincer'-carbene complexes. In *The Chemistry of Pincer Compounds*, Morales-Morales, D.; Jensen, C. M., Eds. Elsevier: New York, 2007; pp 107-124.

(105) Poyatos, M.; Mata, J. A.; Peris, E., Complexes with Poly(N-heterocyclic carbene) Ligands: Structural Features and Catalytic Applications. *Chem. Rev.* 2009, 109, 3677-3707.

(106) Andrew, R. E.; Gonzalez-Sebastian, L.; Chaplin, A. B., NHC-based pincer ligands: carbenes with a bite. *Dalton Trans.* 2016, 45, 1299-1305.

(107) Hahn, F. E.; Jahnke, M. C.; Pape, T., Synthesis of pincer-type bis(benzimidazolin-2-ylidene) palladium complexes and their application in C—C coupling reactions. *Organometallics* 2007, 26, 150-154.

(108) Danopoulos, A. A.; Tulloch, A. A. D.; Winston, S.; Eastham, G.; Hursthouse, M. B., Chelating and 'pincer' dicarbene complexes of palladium; synthesis and structural studies. *Dalton Trans.* 2003, 1009-1015.

(109) Cho, J.; Hollis, T. K.; Helgert, T. R.; Valente, E. J., An improved method for the synthesis of zirconium (CCC—N-heterocyclic carbene) pincer complexes and applications in hydroamination. *Chem. Commun.* 2008, 5001-5003.

(110) Bauer, E. B.; Andavan, G. T. S.; Hollis, T. K.; Rubio, R. J.; Cho, J.; Kuchenbeiser, G. R.; Helgert, T. R.; Letko, C. S.; Tham, F. S., Air- and Water-Stable Catalysts for Hydroamination/Cyclization. Synthesis and Application of CCC—NHC Pincer Complexes of Rh and Ir. *Org. Lett.* 2008, 10, 1175-1178.

(111) Rubio, R. J.; Andavan, G. T. S.; Bauer, E. B.; Hollis, T. K.; Cho, J.; Tham, F. S.; Donnadieu, B., Toward a general method for CCC N-heterocyclic carbene pincer synthesis: Metallation and transmetallation strategies for concurrent activation of three C—H bonds. *J. Organomet. Chem.* 2005, 690, 5353-5364.

(112) Pugh, D.; Boyle, A.; Danopoulos, A. A., 'Pincer' pyridine dicarbene complexes of nickel and their derivatives. Unusual ring opening of a coordinated imidazol-2-ylidene. *Dalton Trans.* 2008, 1087-1094.

(113) Danopoulos, A. A.; Pugh, D.; Wright, J. A., "Pincer" Pyridine-Dicarbene-Iridium Complexes: Facile C—H Activation and Unexpected eta(2)-Imidazol-2-ylidene Coordination. *Angewandte Chemie—International Edition* 2008, 47, 9765-9767.

(114) Hahn, F. E.; Jahnke, M. C.; Gomez-Benitez, V.; Morales-Morales, D.; Pape, T., Synthesis and catalytic activity of pincer-type bis(benzimidazolin-2-ylidene) palladium complexes. *Organometallics* 2005, 24, 6458-6463.

(115) Helgert, T. R.; Zhang, X.; Box, H. K.; Denny, J. A.; Valle, H. U.; Oliver, A. G.; Akurathi, G.; Webster, C. E.; Hollis, T. K., Extreme it-Loading as a Design Element for Accessing Imido Ligand Reactivity. A CCC—NHC Pincer Tantalum Bis(imido) Complex: Synthesis, Characterization, and Catalytic Oxidative Amination of Alkenes. *Organometallics* 2016, 35, 3452-3460.

(116) Zhang, X.; Wright, A. M.; DeYonker, N. J.; Hollis, T. K.; Hammer, N. I.; Webster, C. E.; Valente, E. J., Synthesis, Air Stability, Photobleaching, and DFT Modeling of Blue Light Emitting Platinum CCC—N-Heterocyclic Carbene Pincer Complexes. *Organometallics* 2012, 31, 1664-1672.

(117) Hollis, T. K.; Zhang, X., Air-stable, blue light emitting chemical compounds. Google Patents 2015.

(118) Raynal, M.; Pattacini, R.; Cazin, C. S. J.; Vallee, C.; Olivier-Bourbigou, H.; Braunstein, P., Reaction Intermediates in the Synthesis of New Hydrido, N-Heterocyclic Dicarbene Iridium(III) Pincer Complexes. *Organometallics* 2009, 28, 4028-4047.

(119) Singleton, J. T., The uses of pincer complexes in organic synthesis. *Tetrahedron* 2003, 59, 1837-1857.

(120) Selander, N.; J. Szabó, K., Catalysis by Palladium Pincer *Complexes. Chem. Rev.* 2011, 111, 2048-2076.

(121) Luo, Q.-L.; Tan, J.-P.; Li, Z.-F.; Nan, W.-H.; Xiao, D.-R., Suzuki-Miyaura Coupling of Aryl Iodides, Bromides, and Chlorides Catalyzed by Bis(thiazole) Pincer Palladium Complexes. *The Journal of Organic Chemistry* 2012, 77, 83328337.

(122) Therrien, J. A.; Wolf, M. O., The Influence of para Substituents in Bis(N-Heterocyclic Carbene) Palladium Pincer Complexes for Electrocatalytic CO2 Reduction. *Inorg. Chem.* 2017, 56, 1161-1172.

(123) Chakraborty, S.; Wadas, T. J.; Hester, H.; Schmehl, R.; Eisenberg, R., Platinum Chromophore-Based Systems for Photoinduced Charge Separation: A Molecular Design Approach for Artificial Photosynthesis. *Inorg. Chem.* 2005, 44, 68656878.

(124) Gust, D.; Moore, T. A.; Moore, A. L., Solar Fuels via Artificial Photosynthesis. *Acc. Chem. Res.* 2009, 42, 1890-1898.

(125) Karkas, M. D.; Verho, O.; Johnston, E. V.; Åkermark, B., Artificial Photosynthesis: Molecular Systems for Catalytic Water Oxidation. *Chem. Rev.* 2014, 114, 11863-12001.

(126) Jarosz, P.; Du, P. W.; Schneider, J.; Lee, S. H.; McCamant, D.; Eisenberg, R., Platinum(II) Terpyridyl Acetylide Complexes on Platinized TiO2: Toward the Photogeneration of H-2 in Aqueous Media. *Inorg. Chem.* 2009, 48, 9653-9663.

(127) Sherman, B. D.; Xie, Y.; Sheridan, M. V.; Wang, D.; Shaffer, D. W.; Meyer, T. J.; Concepcion, J. J., Light-Driven Water Splitting by a Covalently Linked Ruthenium-Based Chromophore-Catalyst Assembly. *ACS Energy Letters* 2017, 2, 124-128.

(128) Thomsen, J. M.; Huang, D. L.; Crabtree, R. H.; Brudvig, G. W., Iridium-based complexes for water oxidation. *Dalton Trans.* 2015, 44, 12452-12472.

(129) Klahn, M.; Beweries, T., Organometallic water splitting—from coordination chemistry to catalysis. In *Reviews in Inorganic Chemistry* 2014; Vol. 34, p 177.

(130) Kaufhold, S.; Petermann, L.; Staehle, R.; Rau, S., Transition metal complexes with N-heterocyclic carbene ligands: From organometallic hydrogenation reactions toward water splitting. *Coord. Chem. Rev.* 2015, 304-305, 73-87.

(131) Mayo, E. I.; Kilsa, K.; Tirrell, T.; Djurovich, P. I.; Tamayo, A.; Thompson, M. E.; Lewis, N. S.; Gray, H. B., Cyclometalated iridium(III)-sensitized titanium dioxide solar cells. *Photochemical & Photobiological Sciences* 2006, 5, 871-873.

(132) Wadman, S. H.; Kroon, J. M.; Bakker, K.; Havenith, R. W. A.; van Klink, G. P. M.; van Koten, G., Cyclometalated Organoruthenium Complexes for Application in Dye-Sensitized Solar Cells. *Organometallics* 2010, 29, 1569-1579.

(133) Wong, W.-Y., Metallopolyyne Polymers as New Functional Materials for Photovoltaic and Solar Cell Applications. *Macromol. Chem. Phys.* 2008, 209, 1424.

(134) Wong, W.-Y.; Ho, C.-L., Organometallic Photovoltaics: A New and Versatile Approach for Harvesting Solar Energy Using Conjugated Polymetallaynes. *Acc. Chem. Res.* 2010, 43, 1246-1256.

(135) Wu, K.-L.; Huckaba, A. J.; Clifford, J. N.; Yang, Y.-W.; Yella, A.; Palomares, E.; Grätzel, M.; Chi, Y.; Nazeeruddin, M. K., Molecularly Engineered Ru(II) Sensitizers Compatible with Cobalt(I/III) Redox Mediators for Dye-Sensitized Solar Cells. *Inorg. Chem.* 2016, 55, 7388-7395.

(136) Ashford, D. L.; Gish, M. K.; Vannucci, A. K.; Brennaman, M. K.; Templeton, J. L.; Papanikolas, J. M.; Meyer, T. J., Molecular Chromophore-Catalyst Assemblies for Solar Fuel Applications. *Chem. Rev.* 2015, 115, 13006-13049.

(137) Bauer, R.; Finkenzeller, W. J.; Bogner, U.; Thompson, M. E.; Yersin, H., Matrix influence on the OLED emitter Ir(btp)(2)(acac) in polymeric host materials—Studies by persistent spectral hole burning *Org. Electron.* 2008, 9, 641-648.

(138) Finkenzeller, W. J.; Hofbeck, T.; Thompson, M. E.; Yersin, H., Triplet state properties of the OLED emitter Ir(btp)(2)(acac): Characterization by site-selective spectroscopy and application of high magnetic fields. *Inorg. Chem.* 2007, 46, 5076-5083.

(139) Finkenzeller, W. J.; Thompson, M. E.; Yersin, H., Phosphorescence dynamics and spin-lattice relaxation of the OLED emitter Ir(btp)(2)(acac). *Chem. Phys. Lett.* 2007, 444, 273-279.

(140) Liu, D., Organometallic Phosphors for OLEDs Lighting. In *Organometallics and Related Molecules for Energy Conversion*, Wong, W.-Y., Ed. Springer Berlin Heidelberg: Berlin, Heidelberg, 2015; pp 241-284.

(141) Ho, C.-L.; Li, H.; Wong, W.-Y., Red to near-infrared organometallic phosphorescent dyes for OLED applications. *J. Organomet. Chem.* 2014, 751, 261-285.

(142) Thejo Kalyani, N.; Dhoble, S. J., Organic light emitting diodes: Energy saving lighting technology—A review. *Renewable and Sustainable Energy Reviews* 2012, 16, 2696-2723.

(143) Fleetham, T.; Li, G.; Li, J., Phosphorescent Pt(II) and Pd(II) Complexes for Efficient, High-Color-Quality, and Stable OLEDs. *Adv. Mater.* 2017, 29, 1601861-n/a.

(144) Hung, F.-F.; Wu, S.-X.; To, W.-P.; Kwong, W.-L.; Guan, X.; Lu, W.; Low, K.-H.; Che, C.-M., Palladium(II) Acetylide Complexes with Pincer-Type Ligands: Photophysical Properties, Intermolecular Interactions, and Photo-cytotoxicity. *Chemistry—An Asian Journal* 2017, 12, 145-158.

(145) Moudam, O.; Rowan, B. C.; Alamiry, M.; Richardson, P.; Richards, B. S.; Jones, A. C.; Robertson, N., Europium complexes with high total photoluminescence quantum yields in solution and in PMMA. *Chem. Commun.* 2009, 6649-6651.

(146) Schuster, O.; Yang, L.; Raubenheimer, H. G.; Albrecht, M., Beyond Conventional N-Heterocyclic Carbenes: Abnormal, Remote, and Other Classes of NHC Ligands with Reduced Heteroatom Stabilization. *Chem. Rev.* 2009, 109, 3445-3478.

(147) Tam, A. Y.-Y.; Wong, K. M.-C.; Yam, V. W.-W., Unusual Luminescence Enhancement of Metallogels of Alkyl Platinum(II) 2,6-Bis(N-alkylbenzimidazol-2'-yl) pyridine Complexes upon a Gel-to-Sol Phase Transition at Elevated Temperatures. *JACS* 2009, 131, 6253-6260.

(148) Zhao, Q.; Li, F.; Huang, C., Phosphorescent chemosensors based on heavy-metal complexes. *Chem. Soc. Rev.* 2010, 39, 3007-3030.

(149) Lee, C.-S.; Sabiah, S.; Wang, J.-C.; Hwang, W.-S.; Lin, I. J. B., Water-Induced Changes of Photoluminescence of a Pincer-Type N-Heterocyclic Carbene Platinum (II) Complex. *Organometallics* 2010, 29, 286-289.

(150) Bachmann, M.; Suter, D.; Blacque, O.; Venkatesan, K., Tunable and Efficient White Light Phosphorescent (150) Emission Based on Single Component N-Heterocyclic Carbene Platinum(II) Complexes. *Inorg. Chem.* 2016, 55, 47334745.

(151) Vargas, V. C.; Rubio, R. J.; Hollis, T. K.; Salcido, M. E., Efficient route to 1,3-Di-N-imidazolyl benzene. A comparison of monodentate vs bidentate carbenes in Pd-catalyzed cross coupling. *Org. Lett.* 2003, 5, 4847-4849.

(152) Spencer, L. P.; Winston, S.; Fryzuk, M. D., Tridentate amido carbene ligands in early-transition-metal coordination chemistry. *Organometallics* 2004, 23, 33723374.

(153) Mondal, P. C.; Chhatwal, M.; Jeyachandran, Y. L.; Zharnikov, M., Enhancement of Optical and Electrochemical Properties via Bottom-Up Assembly of Binary Oligomer System. *The Journal of Physical Chemistry C* 2014, 118, 9578-9587.

(154) Zucca, A.; Doppiu, A.; Cinellu, M. A.; Stoccoro, S.; Minghetti, G.; Manassero, M., Multiple C—H bond activation. Threefold-deprotonated 6-phenyl-2,2'-bipyridine as a bridging ligand in dinuclear platinum(II) derivatives. *Organometallics* 2002, 21, 783-785.

(155) Vanderploeg, A.; Vankoten, G.; Vrieze, K.; Spek, A. L., OXIDATIVE-ADDITION REACTIONS OF CYCLOMETALATED PLATINUM(II) COMPOUNDS WITH MERCURY(II) CARBOXYLATES—X-RAY CRYSTAL AND MOLECULAR-STRUCTURE OF RAC-A-(MU-MECO2)-CF,DE-(2-ME2NCH2C6H4) 2PTHG(O2CME). *Inorg. Chem.* 1982, 21, 2014-2026.

(156) Fantasia, S.; Petersen, J. L.; Jacobsen, H.; Cavallo, L.; Nolan, S. P., Electronic properties of n-heterocyclic carbene (NHC) ligands: Synthetic, structural, and spectroscopic studies of (NHC)Platinum(II) complexes. *Organometallics* 2007, 26, 5880-5889.

(157) Ahrens, S.; Strassner, T., Detour-free synthesis of platinum-bis-NHC chloride complexes, their structure and catalytic activity in the CH activation of methane. *Inorg. Chim. Acta* 2006, 359, 4789-4796.

(158) Grundemann, S.; Albrecht, M.; Loch, J. A.; Faller, J. W.; Crabtree, R. H., Tridentate carbene CCC and CNC pincer palladium(II) complexes: Structure, fluxionality, and catalytic activity. *Organometallics* 2001, 20, 5485-5488.

(159) Peris, E.; Loch, J. A.; Mata, J.; Crabtree, R. H., A Pd complex of a tridentate pincer CNC bis-carbene ligand as a robust homogenous Heck catalyst. *Chemical Communications* 2001, 201-202.

(160) Bohm, M. C.; Gleiter, R., ELECTRONIC-STRUCTURE OF ORGANOMETALLIC COMPOUNDS 0.24. HEAVY-ATOM EFFECT IN THE PHOTOELECTRON-SPECTRA OF TRANSITION-METAL COMPLEXES. *Angewandte Chemie—International Edition in English* 1983, 22, 329-330.

(161) S. K. Lower, M. A. E.-S., The Triplet State and Molecular Electronic Processes in Organic Molecules. *Chem. Rev.* 1966, 66, 199-241.

(162) Hung, L. S.; Chen, C. H., Recent progress of molecular organic electroluminescent materials and devices. *Materials Science and Engineering: R: Reports* 2002, 39, 143-222.

(163) Bulovi, V.; Burrows, P. E.; Forrest, S. R., Molecular Organic Light-Emitting Devices. In *Semiconductors and Semimetals*, Gerd, M., Ed. Elsevier: New York, 1999; Vol. 64, pp 255-306.

(164) Shinar, J., *Organic Light-Emitting Devices*. Springer: New York, 2004; p 309.

(165) Zhang, L. Y.; Li, B.; Shi, L. F.; Li, W. L., Synthesis, structures, and photophysical properties of fluorine-functionalized yellow-emitting iridium complexes. *Opt. Mater.* 2009, 31, 905-911.

(166) Evans, R. C.; Douglas, P.; Winscom, C. J., Coordination complexes exhibiting room-temperature phosphorescence: Evaluation of their suitability as triplet emitters in organic light emitting diodes. *Coord. Chem. Rev.* 2006, 250, 20932126.

(167) Au, V. K. M.; Wong, K. M. C.; Zhu, N. Y.; Yam, V. W. W., Luminescent Cyclometalated N-Heterocyclic Carbene-Containing Organogold(III) Complexes: Synthesis, Characterization, Electrochemistry, and Photophysical Studies. *JACS* 2009, 131, 9076-9085.

(168) Tronnier, A.; Metz, S.; Wagenblast, G.; Muenster, I.; Strassner, T., Blue phosphorescent nitrile containing C∧C* cyclometalated NHC platinum(ii) complexes. *Dalton Trans.* 2014, 43, 3297-3305.

(169) Tronnier, A.; Poethig, A.; Herdtweck, E.; Strassner, T., C∧C* Cyclometalated Platinum(II) NHC Complexes with β-Ketoimine Ligands. *Organometallics* 2014, 33, 898-908.

(170) Perry, C. H.; Fertel, J. H.; Parrish, J. F.; Young, E. F., Quarterly Progress Report No. 81, Research Laboratory of Electronics. 1966; pp 27-34.

(171) Romerosa, A.; Suarez-Varela, J.; Hidalgo, M. A.; Avila-Rosón, J. C.; Colacio, E., Synthesis and Molecular Structure of the First Metal Complex of an Analogue of Guanine with PdII-C(8) Binding. *Inorg. Chem.* 1997, 36, 3784-3786.

(172) Omrani, H.; Cavagnat, R.; Sourisseau, C., A vibrational study of various K2PdCl4-xBrx solid solutions. *Spectrochimica Acta Part A: Molecular and Biomolecular Spectroscopy* 2000, 56, 1645-1652.

(173) Drożdżewski, P.; Brożyna, A.; Kubiak, M.; Lis, T., Synthesis, structure and vibrational spectroscopy of palladium(II) complexes with 2-thiophenecarboxylic hydrazide (tch): Crystal structure of [PdCl2(tch)2].2dmf. *Vib. Spectrosc* 2006, 40, 118-126.

(174) Keşan, G.; Bağlayan, Ö.; Parlak, C.; Alver, Ö.; Şenyel, M., FT-IR and Raman spectroscopic and quantum chemical investigations of some metal halide complexes of 1-phenylpiperazine. *Spectrochimica Acta Part A: Molecular and Biomolecular Spectroscopy* 2012, 88, 144-155.

What is claimed is:

1. A method of catalyzing reduction of $CO_2$ comprising administering a complex having a structure according to Formula I:

wherein M is a transition metal;
wherein each N and N' is independently nitrogen;
wherein Z is selected from the group consisting of CH, C, and N;
wherein n is 0-3;
wherein each L is independently a neutral or charged ligand;

wherein each R is independently an alkyl, 3,3-dimethyl-butyl (Nx), or CH$_2$Si(CH$_3$)$_3$ (trimethylsilylmethyl); and wherein the dashed lines are independently a 6 membered ring including Z and the ortho C, N=CH, or HC=CH.

2. The method of claim 1, wherein at least one L is selected from the group consisting of monodentate, bidentate, and tridentate ligands.

3. The method of claim 1, wherein at least one L is selected from the group consisting of halogen, alkyl, aryl, biaryl, substituted aryl, aryloxy, acetate, trifluoroacetate, and alkoxy.

4. The method of claim 3, wherein at least one L is a halogen.

5. The method of claim 3, wherein the alkyl is selected from the group consisting of methyl, ethyl, propyl, butyl, pentyl, and hexyl.

6. The method of claim 3, wherein the substituted aryl is a fluoro substituted aryl.

7. The method of claim 1, wherein the alkyl of R is selected from the group consisting of methyl, ethyl, propyl, butyl, pentyl, and hexyl.

8. The method of claim 1, wherein M is Ni.

9. The method of claim 8, wherein the complex is selected from the group consisting of:

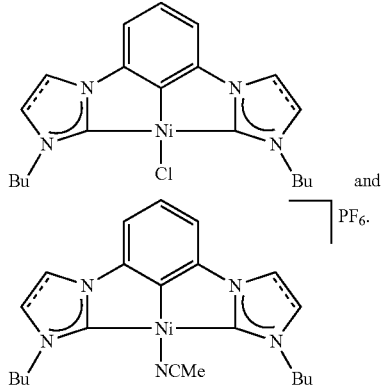
and

10. The method of claim 1, wherein M is Pt.

11. The method of claim 10, wherein the complex is selected from the group consisting of:

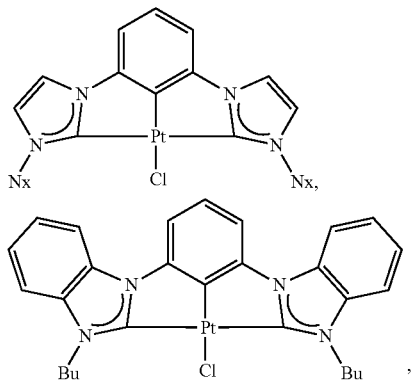

-continued

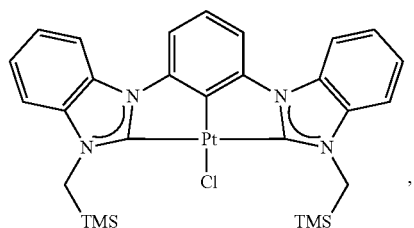

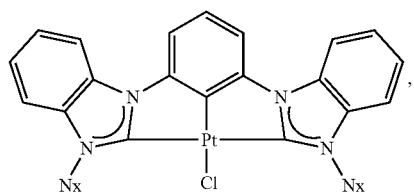

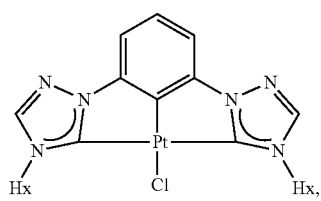

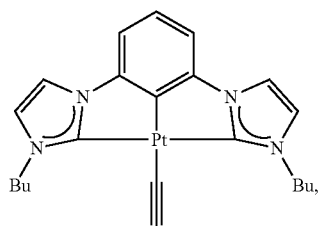

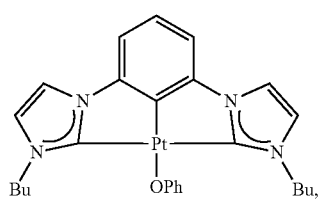

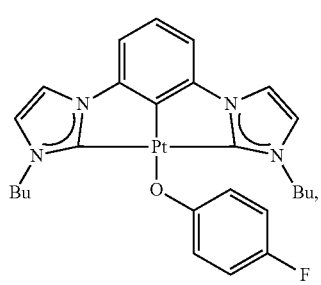

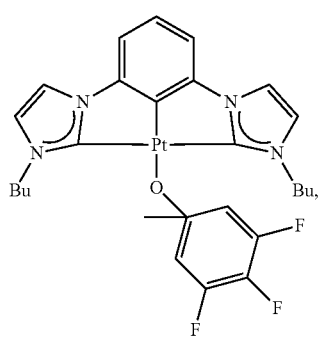

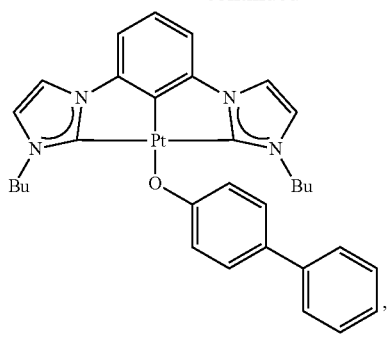
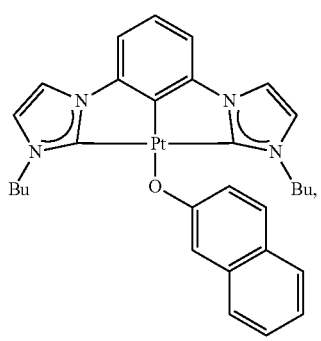
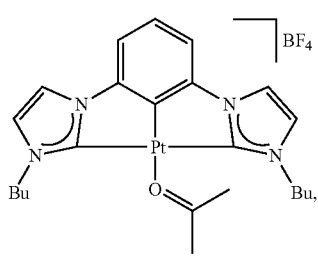
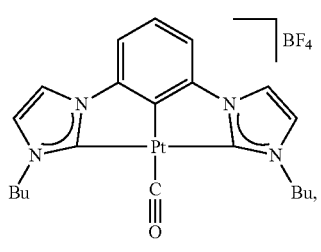
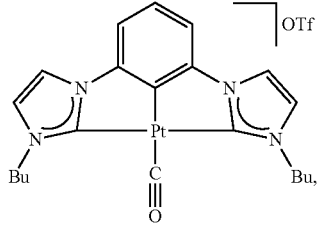
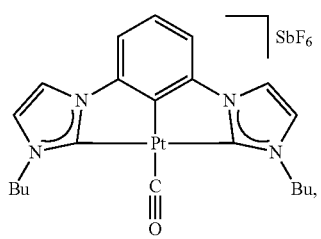
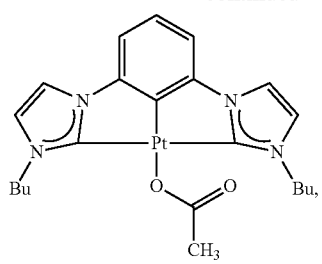
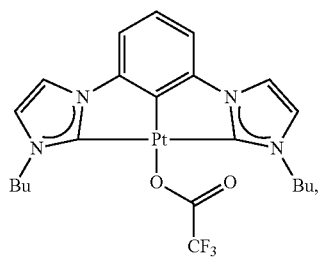
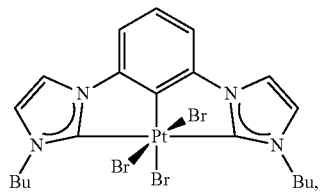
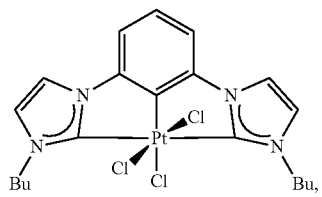
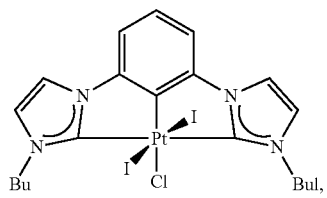
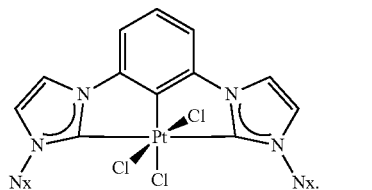
12. The method of claim 1, wherein M is Pd.
13. The method of claim 12, wherein the complex is selected from the group consisting of:
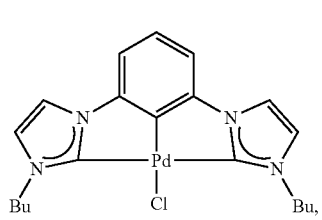

65
-continued
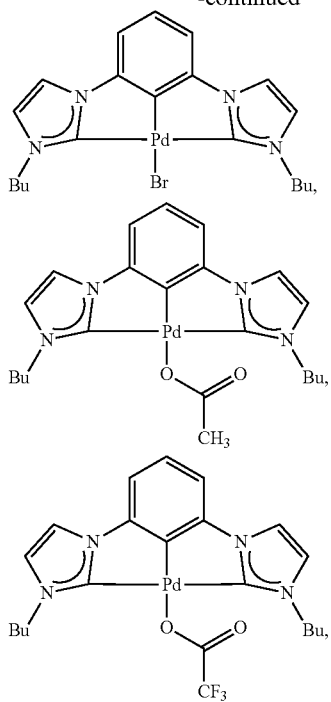
66
-continued
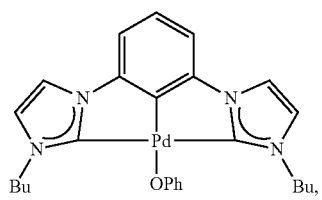
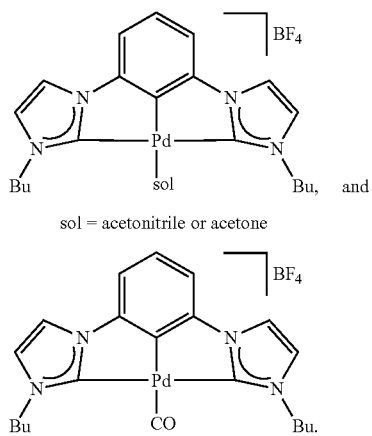
sol = acetonitrile or acetone
* * * * *